(12) United States Patent  
Yamatani et al.

(10) Patent No.: US 8,059,903 B2
(45) Date of Patent: Nov. 15, 2011

(54) DATA COMPRESSION-DECOMPRESSION METHOD, PROGRAM, AND ELECTRONIC DEVICE

(75) Inventors: Katsu Yamatani, Kani (JP); Naoki Saito, Davis, CA (US)

(73) Assignees: National University Corporation Shizuoka University, Shizuoka (JP); The Regents of The University of California, Oakland, CA (US)

(*) Notice: Subject to any disclaimer, the term of this patent is extended or adjusted under 35 U.S.C. 154(b) by 867 days.

(21) Appl. No.: 11/667,848

(22) PCT Filed: Nov. 17, 2005

(86) PCT No.: PCT/JP2005/021166
§ 371 (c)(1),
(2), (4) Date: Apr. 29, 2008

(87) PCT Pub. No.: WO2006/054667
PCT Pub. Date: May 26, 2006

(65) Prior Publication Data
US 2008/0260276 A1    Oct. 23, 2008

Related U.S. Application Data

(60) Provisional application No. 60/629,094, filed on Nov. 17, 2004.

(51) Int. Cl.
*G06K 9/36* (2006.01)
(52) U.S. Cl. ....................................... 382/249
(58) Field of Classification Search .......... 382/232–233, 382/235–240, 244–253; 348/384.1, 390.1–395.1, 348/400.1–404.1, 407.1–416.1, 420.1–421.1, 348/430.1–431.1; 375/240.03, 240.11–240.25, 375/240.27
See application file for complete search history.

(56) References Cited

U.S. PATENT DOCUMENTS

| 5,699,459 A | 12/1997 | Kawahara | |
|---|---|---|---|
| 2008/0044097 A1* | 2/2008 | Krishnan et al. | 382/251 |

FOREIGN PATENT DOCUMENTS

| JP | 2-62177 A | 3/1990 |
|---|---|---|
| JP | 8-181984 A | 7/1996 |
| JP | 11-501472 | 2/1999 |
| JP | 2002-247374 A | 8/2002 |
| JP | 2003-52042 A | 2/2003 |
| WO | WO 96-27262 | 9/1996 |

* cited by examiner

*Primary Examiner* — Jose Couso
(74) *Attorney, Agent, or Firm* — NDQ&M Watchstone LLP

(57) ABSTRACT

An electronic device includes: a PHLCT circuit (15), which includes an input signal DCT coefficient computation module configured to compute DCT coefficients of an input signal of a subject block region in a plurality of block regions and block regions adjacent to the subject block region, respectively, an offset function DCT coefficient computation module configured to compute DCT coefficients of a gradient offset function, which offsets the gradient of the input signal at a block boundary between each subject block region and its adjacent block regions from the DCT coefficients of the input signal, and a residual computation module configured to compute a residual of the DCT coefficients of the input signal and the DCT coefficients of the gradient offset function; a quantization circuit configured to quantize the residual to obtain compressed data; and an entropy coding circuit (17) configured to encode the compressed data.

19 Claims, 31 Drawing Sheets

FIG. 20
(a)
(b)

FIG. 21
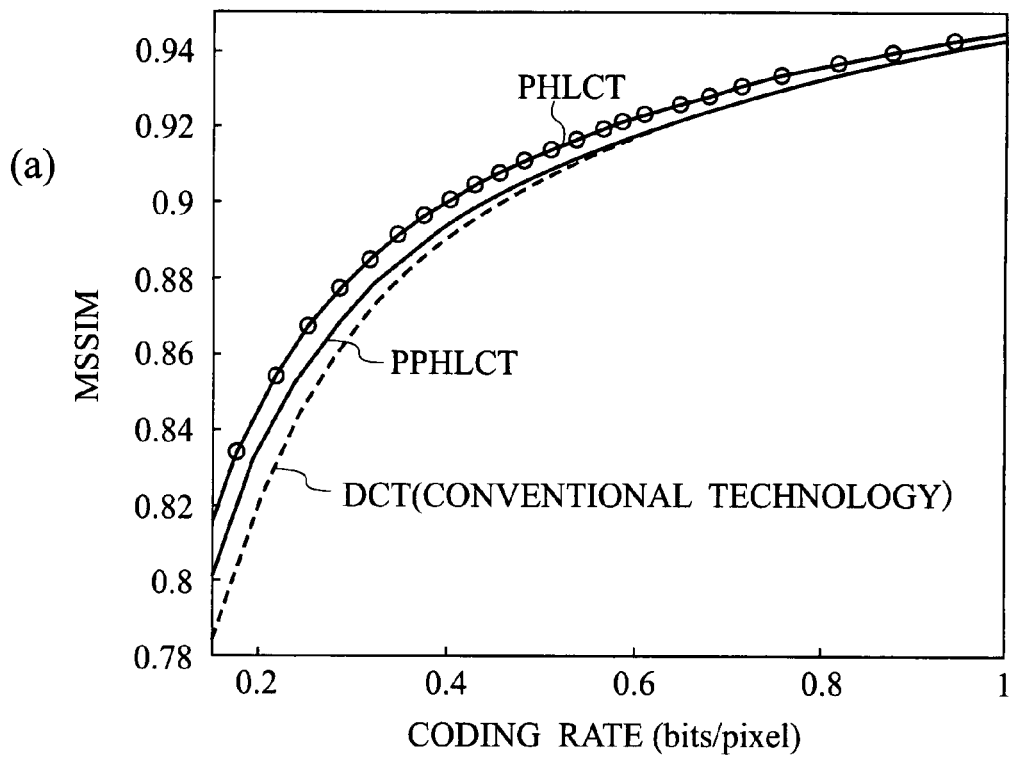
(a)
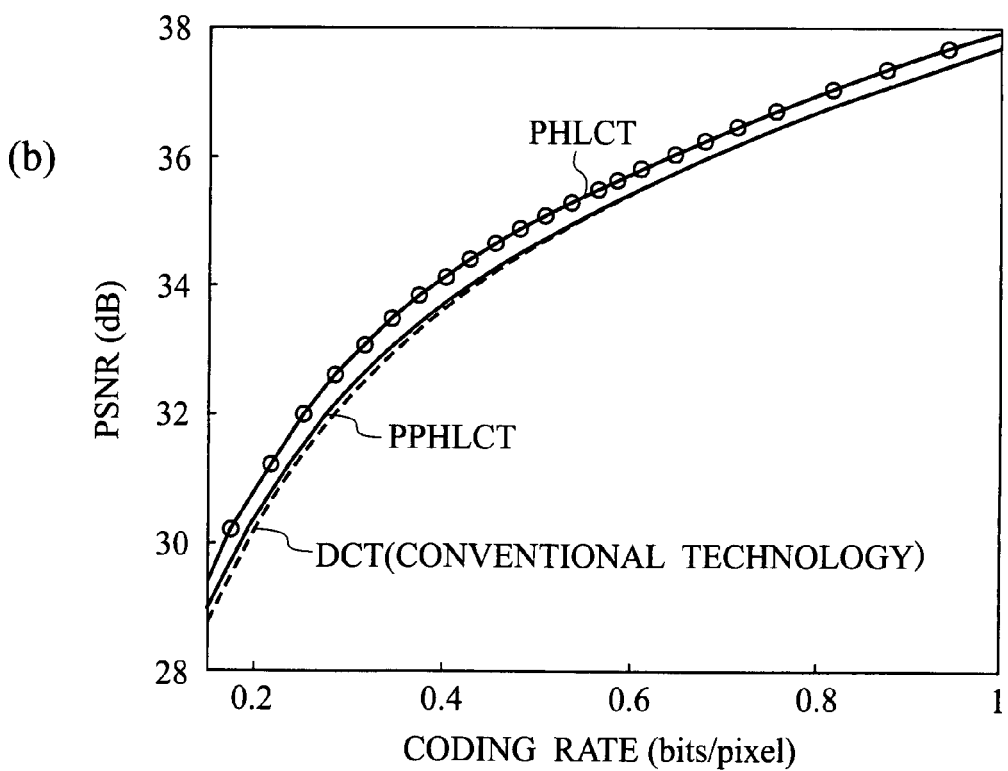
(b)

FIG. 22
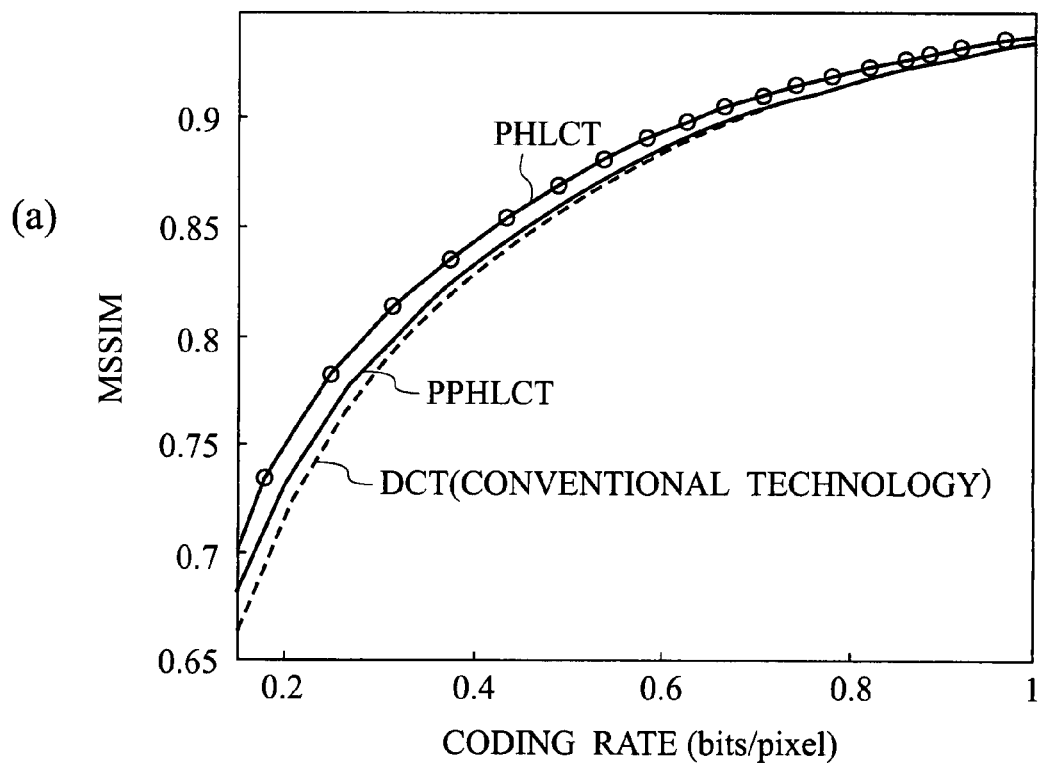
(a)
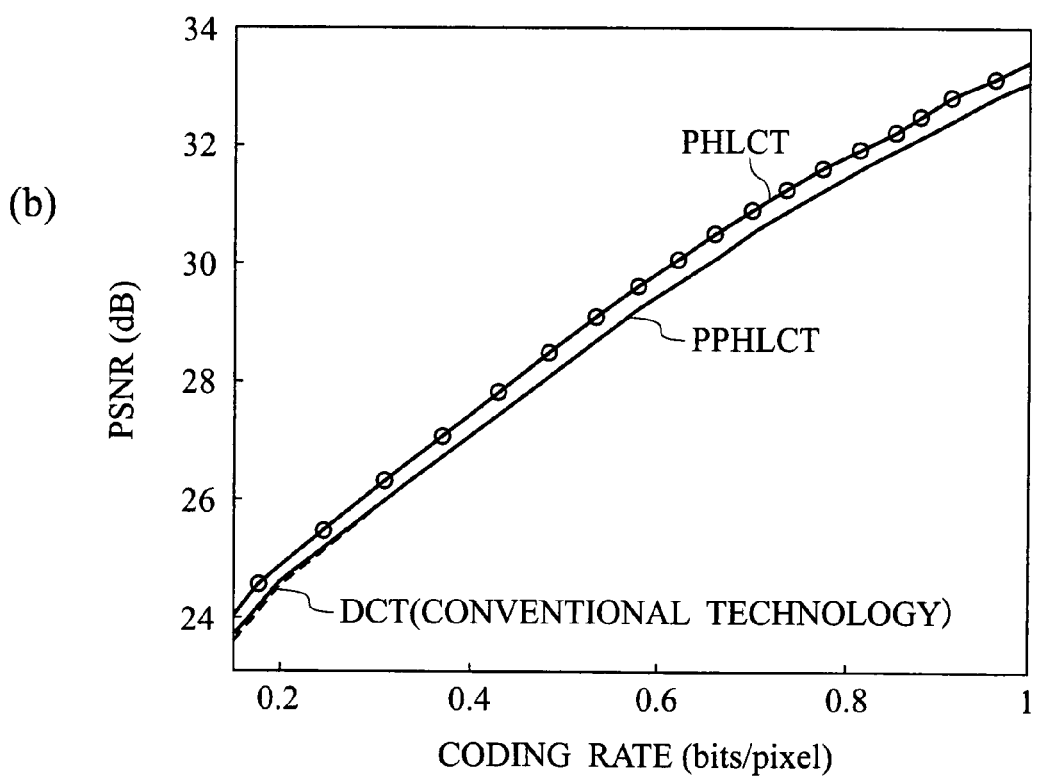
(b)

FIG. 23
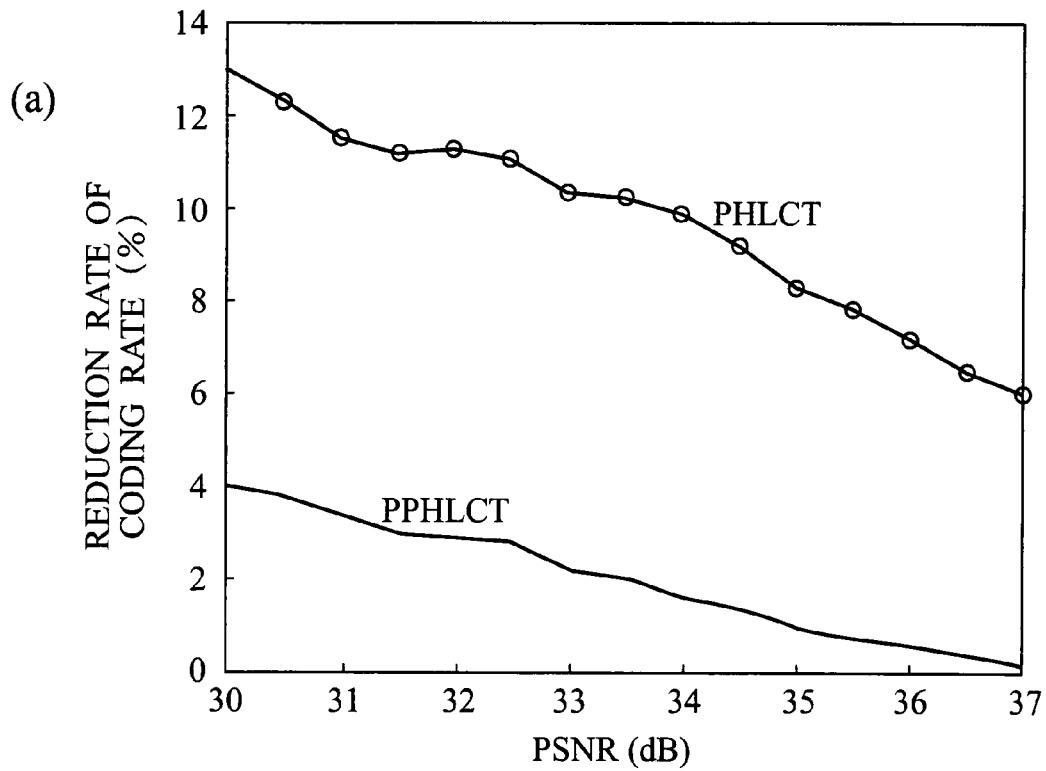
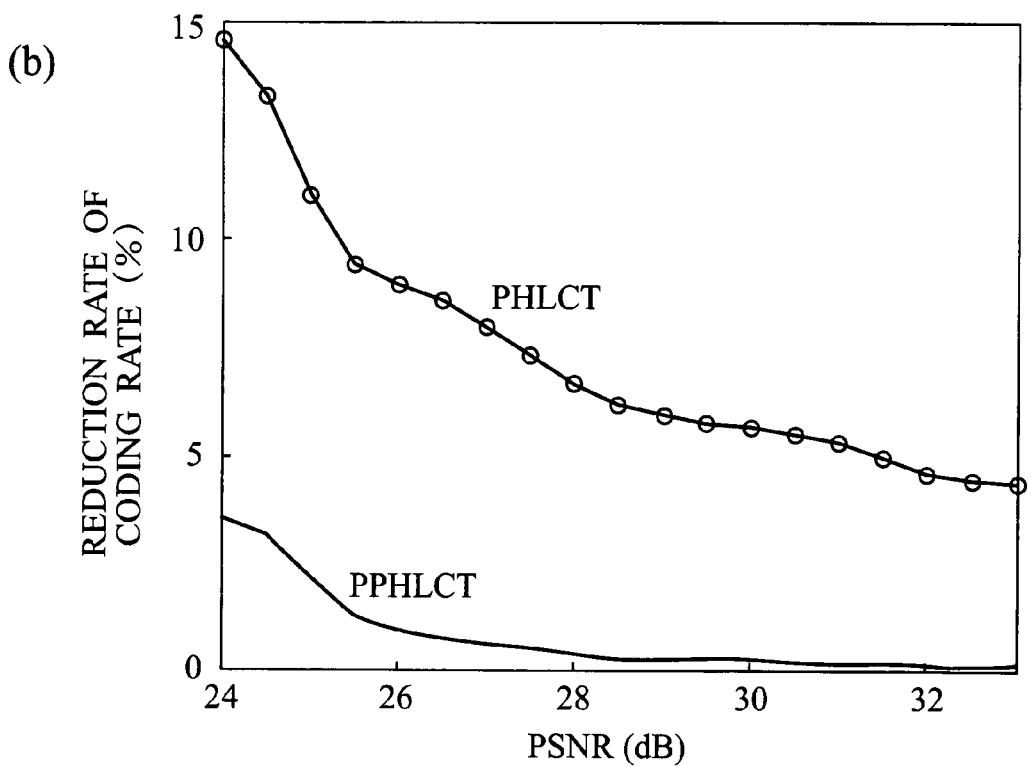

FIG. 25

FIG. 27
(a)
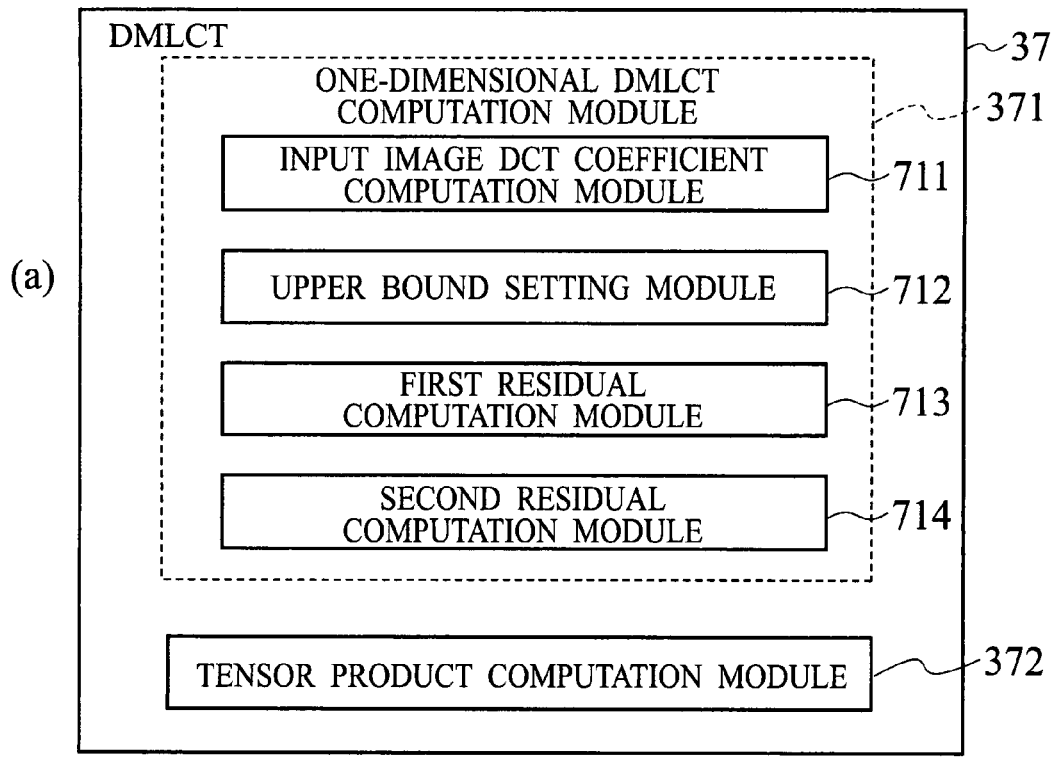
(b)
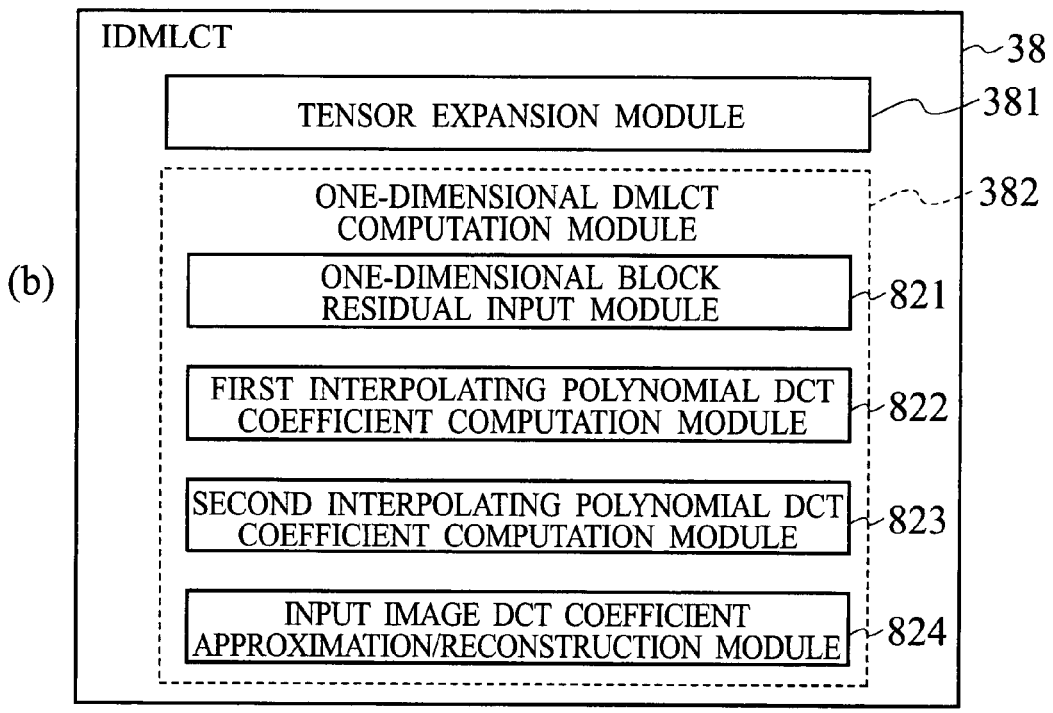

FIG. 32
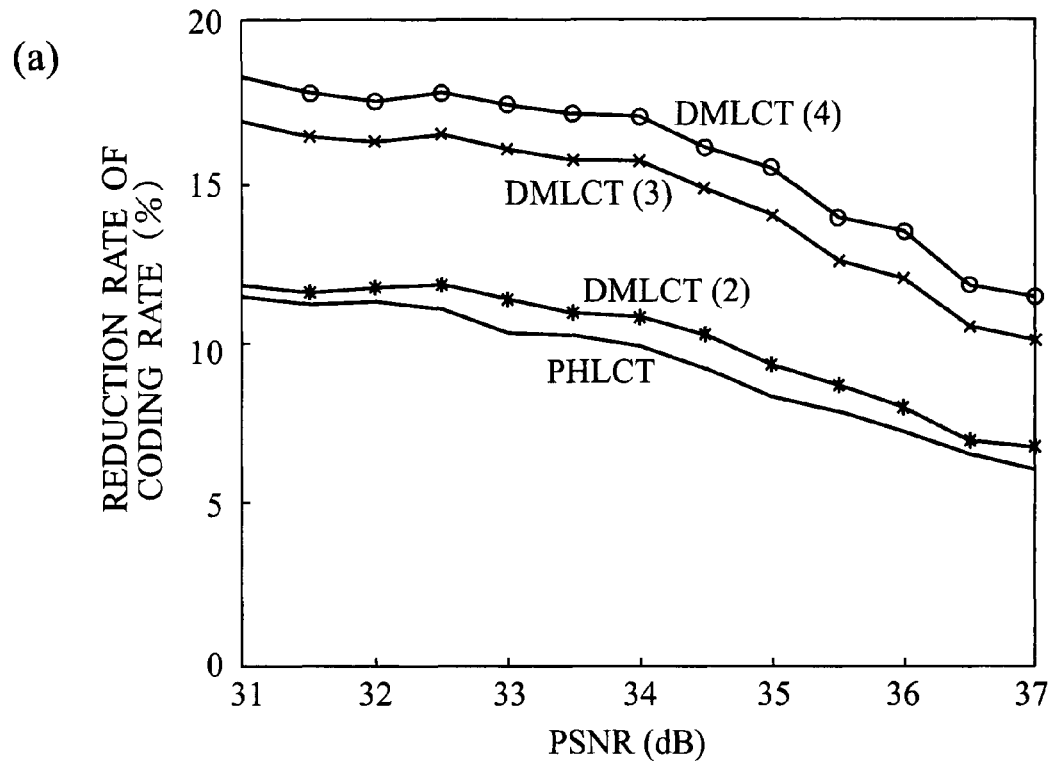
(a)
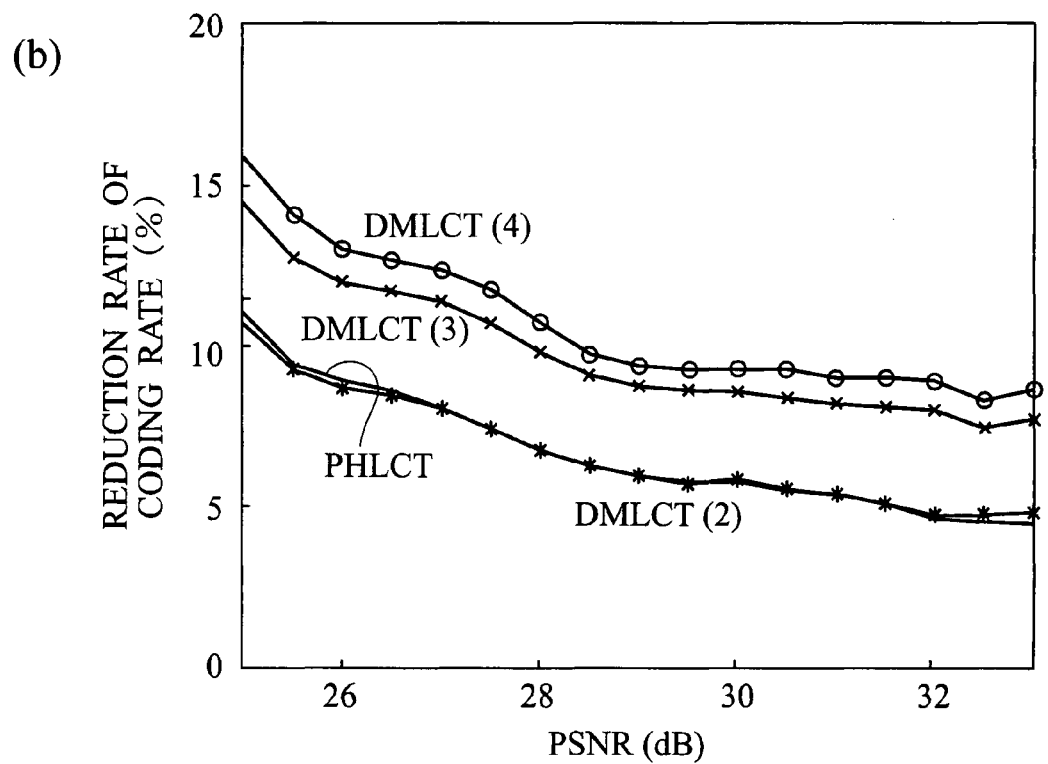
(b)

DATA COMPRESSION-DECOMPRESSION METHOD, PROGRAM, AND ELECTRONIC DEVICE

BACKGROUND OF THE INVENTION

1. Field of the Invention

The present invention relates to electronic devices such as a data compression apparatus and a data decompression apparatus, which are used for compressing and decompressing data including various data such as image data and audio data, and an electronic device and system including at least one of these data compression apparatus and data decompression apparatus. Furthermore, the present invention pertains to a data compression method and a data decompression method using the electronic devices and the system, and a data compression program and a data decompression program for controlling the electronic devices and the system.

2. Background-Art

The Joint Photographic Expert Group (JPEG) standard is the international standard for image compression technology that compresses still images. JPEG algorithms can be largely divided into two compression methodologies. The first methodology is based on the discrete cosine transform (DCT), and the second methodology is a spatial domain method performing the differential PCM (DPCM) in the two-dimensional image space.

The DCT is the basis for an algorithm adapted for the present invention and can acquire sufficient decoded image quality even with a small number of bits although it has a lossy coding characteristic of generally not perfectly reconstructing an original image. On the other hand, the spatial domain method is a function added as a standard for implementing a lossless coding characteristic of perfectly reconstructing an original image with low compressibility. The DCT is further divided into a baseline process (baseline system), which is an essential function, and an extended DCT process (extended system), which is an optional function. The baseline process is an algorithm based on the adaptive discrete cosine transform coding (ADCT), and is the required minimum function for all coders/decoders implementing the DCT. Image compression in the baseline process is carried out for each image data block of 8×8 pixels.

Currently, as such, most of the standard digital image compression formats are based on DCT in block units. Compressibility by definition is dependent on convergence rate of DCT coefficients since these methods are based on the cosine series approximation. In general, compressibility decreases when the convergence of DCT coefficients is slow. Furthermore, quantization error of the DCT coefficients increases as coding rate (bit rate) decreases, and deterioration of reconstructed images such as blocking artifact cannot be ignored.

SUMMARY OF THE INVENTION

An object of the present invention is to provide an electronic device, a data compression method, a data decompression method, a data compression program, and a data decompression program, which are capable of compressing digital image with improved compressibility based on DCT in block units and eliminating blocking artifact just by adding a simple configuration to the conventional devices.

The first aspect of the present invention inheres in a data compression method, which divides input data equally into a plurality of block regions and compresses the input data. Namely, the data compression method according to the first aspect includes the steps of (a) computing the DCT coefficients of an input signal in each subject block region and its adjacent block regions in the plurality of block regions; (b) computing DCT coefficients of a gradient offset function, which offsets the gradient of the input signal at a block boundary between each subject block region and its adjacent block regions from the DCT coefficients of the input signal; (c) computing a residual of the DCT coefficients of the input signal and the DCT coefficients of the gradient offset function; and (d) obtaining compressed data by quantizing and encoding the residual.

The second aspect of the present invention inheres in a data decompression method, which divides input data equally into a plurality of block regions, decompresses compressed data, which results from compressing the input data of each block region, and reconstructs the input data. Namely, the data decompression method according to the second aspect includes the steps of (a) executing decoding and dequantization of the compressed data, and obtaining dequantized DCT coefficients of each block region; (b) computing DCT coefficients of a gradient offset function, which offsets the gradient of an input signal at a block boundary between each subject block region and its adjacent block regions, using the dequantized DCT coefficients; (c) adding the DCT coefficients of the gradient offset function to the dequantized DCT coefficients and approximately reconstructing the DCT coefficients of the input signal; (d) recovering an input signal for each of the respective block regions using the approximately reconstructed DCT coefficients of the input signal; and (e) joining together the input signal for each of the respective block regions to reconstruct input data.

A third aspect of the present invention inheres in a data decompression method, which divides input data equally into a plurality of block regions, decompresses compressed data, which results from compressing the input data of each of the block regions, and estimates the input data. Namely, the data decompression method according to the third aspect includes the steps of (a) executing decoding and dequantization of the compressed data, and obtaining dequantized DCT coefficients of each of the respective block regions; (b) computing DCT coefficients of a gradient offset function, which offsets the gradient of an input signal at a block boundary between each subject block region and its adjacent block regions, using the dequantized DCT coefficients; (c) computing a quantization error using the DCT coefficients of the gradient offset function; (d) correcting the dequantized DCT coefficients using the quantization error, and making an approximate estimation of the DCT coefficients of the input signal; (e) recovering an input signal for each of the respective block regions from the approximately reconstructed DCT coefficients of the input signal; and (f) joining together the input signal for each of the respective block regions to reconstruct input data.

The fourth aspect of the present invention inheres in a data decompression method, which divides input data equally into a plurality of block regions, decompresses compressed data, which results from compressing the input data of each of the respective block regions, and estimates the input data. Namely, the data decompression method according to the fourth aspect includes the steps of (a) executing decoding and dequantization of the compressed data, and obtaining dequantized DCT coefficients of each of the respective block regions; (b) computing DCT coefficients of a gradient offset function, which offsets the gradient of an input signal of the subject block region, at a block boundary between each subject block region and its adjacent block regions, using the dequantized DCT coefficients; (c) computing a quantization error using the DCT coefficients of the gradient offset function; (d) adding a quadratic surface, which reduces blocking artifact, to adjacent block regions and computing DCT coefficients of the quadratic surface; (e) correcting the dequantized DCT coefficients using the quantization error and the DCT coefficients of the quadratic surface, and approximately reconstructing the DCT coefficients of the input signal; (f) recovering an input signal for each of the block regions using the approximately reconstructed DCT coefficients of the input signal; and (g) joining together the input signal for each of the respective block regions to reconstruct input data.

The fifth aspect of the present invention inheres in an electronic device, which divides input data equally into a plurality of block regions and compresses the input data. Namely, the electronic device according to the fifth aspect includes: (a) an input signal DCT coefficient computation module, which computes the DCT coefficients of an input signal in each subject block region and its adjacent block regions in the plurality of block regions; (b) an offset function DCT coefficient computation module, which computes the DCT coefficients of a gradient offset function, which offsets the gradient of the input signal at a block boundary between each subject block region and its adjacent block regions using the DCT coefficients of the input signal; (c) a residual computation module, which computes a residual of the DCT coefficients of the input signal and the DCT coefficients of the gradient offset function; (d) a quantization circuit, which obtains compressed data by quantizing and encoding the residual; and (e) a coding circuit, which encodes the compressed data.

The sixth aspect of the present invention inheres in an electronic device, which divides input data equally into a plurality of block regions, and decompresses compressed data, which results from compressing the input data of each of the block regions, and reconstructs the input data. Namely, the electronic device according to the sixth aspect includes: (a) a decoding circuit, which decodes the compressed data; (b) a dequantization circuit, which executes the dequantization of the decoded compressed data, and obtains the dequantized DCT coefficients in each block region; (c) a DCT coefficient input module, which inputs the dequantized DCT coefficients to a subject block region and its adjacent block regions, respectively; (d) an offset function DCT coefficient computation module, which computes the DCT coefficients of a gradient offset function, which offsets the gradient of an input signal in the subject block region, at a block boundary between each subject block region and the adjacent block regions, using the dequantized DCT coefficients; (e) an input signal DCT coefficient approximation/reconstruction module, which adds the DCT coefficients of the gradient offset function to the dequantized DCT coefficients and approximately reconstructs DCT coefficients of the input signal; and (f) a block joining circuit, which obtains an input signal in each of the block regions using the approximately reconstructed DCT coefficients of the input signal, and joins together the input signal in each block regions to reconstruct the input data.

The seventh aspect of the present invention inheres in an electronic device, which divides input data equally into plurality of block regions, and decompresses compressed data, which results from compressing the input data of each of the block regions, and estimates the input data. Namely, the electronic device according to the seventh aspect includes: (a) a decoding circuit, which decodes the compressed data; (b) a dequantization circuit, which executes the dequantization of the decoded compressed data, and obtains the dequantized DCT coefficients of each of the respective block regions; (c) a DCT coefficient input module, which receives the dequantized DCT coefficients to a subject block region and its adjacent block regions, respectively; (d) an offset function DCT coefficient computation module, which computes the DCT coefficients of a gradient offset function, which offsets the gradient of an input signal in the subject block region, at a block boundary between the subject block region and its adjacent block regions, using the dequantized DCT coefficients; (e) a quantization error computation module, which computes a quantization error using the DCT coefficients of the gradient offset function; (f) a quantization error correction module, which corrects the dequantized DCT coefficients using the quantization error, and making an approximate estimation of DCT coefficients of the input signal; and (g) a block joining circuit, which obtains an input signal for each of the block regions using the approximately estimated DCT coefficients of the input signal, and joins together the input signal in each block region to estimate the input data.

The eighth aspect of the present invention inheres in an electronic device, which divides input data equally into plurality of block regions, and decompresses compressed data, which results from compressing the input data of each of the block regions, and estimates the input data. Namely, the electronic device according to the eighth aspect includes: (a) a decoding circuit, which decodes the compressed data; (b) a dequantization circuit, which executes the dequantization of the decoded compressed data, and obtains the dequantized DCT coefficients of each of the respective block regions; (c) a DCT coefficient input module, which inputs the dequantized DCT coefficients to a subject block region and its adjacent block regions, respectively; (d) an offset function DCT coefficient computation module, which computes the DCT coefficients of a gradient offset function, which offsets the gradient of an input signal in the subject block region, at a block boundary between each subject block region and its adjacent block regions, using the dequantized DCT coefficients; (e) a quantization error computation module, which computes a quantization error using the DCT coefficients of the gradient offset function; (f) a quadratic surface DCT coefficient computation module, which adds a quadratic surface reducing blocking artifact to the adjacent block regions and computes the DCT coefficients of the quadratic surface; (g) a quadratic surface quantization error correction module, which corrects the dequantized DCT coefficients using the quantization error and the DCT coefficients of the quadratic surface, and approximately estimates DCT coefficients of the input signal; (h) a module recovering an input signal for each of the respective block regions from the approximately estimated DCT coefficients of the input signal; and (i) a block joining circuit, which recovers an input signal for each of the block regions using the approximately estimated DCT coefficients of the input signal, and joins together the input signal for each of the respective block regions to estimate the input data.

The ninth aspect of the present invention inheres in an electronic device including: (a) a first memory unit, which stores input data; (b) a block dividing circuit, which divides input data read out from the first memory unit equally into plurality of block regions; (c) an input signal DCT coefficient computation module, which computes the DCT coefficients of an input signal in each subject block region and its adjacent block regions in the plurality of block regions; (d) an offset function DCT coefficient computation module, which computes the DCT coefficients of a gradient offset function, which offsets the gradient of the input signal at a block boundary between each subject block region and its adjacent block regions from the DCT coefficients of the input signal; (e) a residual computation module, which computes a residual of the DCT coefficients of the input signal and the DCT coefficients of the gradient offset function; (f) a quantization circuit, which obtains compressed data by quantizing and encoding the residual; (g) a coding circuit, which encodes the compressed data; (h) a second memory unit, which stores the encoded, compressed data; (i) a decoding circuit, which decodes the compressed data read out from the second memory unit; (j) a dequantization circuit, which executes the dequantization of the decoded compressed data, and obtains the dequantized DCT coefficients of each of the respective block regions; (k) a DCT coefficient input module, which inputs the dequantized DCT coefficients to a subject block region and its adjacent block regions, respectively; (l) an offset function DCT coefficient computation module, which computes the DCT coefficients of a gradient offset function, which offsets the gradient of the input signal in the subject block region, at a block boundary between each subject block region and its adjacent block regions, using the dequantized DCT coefficients; (m) an input signal DCT coefficient approximation/reconstruction module, which adds the DCT coefficients of the gradient offset function to the dequantized DCT coefficients and approximately reconstructs DCT coefficients of the input signal; and (n) a block joining circuit, which recovers an input signal for each of the block regions from the approximately reconstructed DCT coefficients of the input signal, and joins together the input signal for each of the respective block regions to reconstruct the input data.

The tenth aspect of the present invention inheres in a data compression program for executing a series of instructions on an encoder, which divides input data equally into plurality of block regions and compresses the input data, including: (a) an instruction to compute DCT coefficients of an input signal in each subject block region and its adjacent block regions in the plurality of block regions; (b) an instruction to compute DCT coefficients of a gradient offset function, which offsets the gradient of the input signal at a block boundary between each subject block region and its adjacent block regions using the DCT coefficients of the input signal; (c) an instruction to compute a residual of the DCT coefficients of the input signal and the DCT coefficients of the gradient offset function; and (d) an instruction to obtain compressed data by quantizing and encoding the residual.

The eleventh aspect of the present invention inheres in a data decompression program for executing a series of instructions on a decoder, which divides input data equally into plurality of block regions, and decompresses the input data, including: (a) an instruction to execute decoding and dequantization of the compressed data, and obtain dequantized DCT coefficients of each of the respective block regions; (b) an instruction to compute DCT coefficients of a gradient offset function, which offsets a gradient of an input signal in the subject block region, at a block boundary between each subject block region and its adjacent block regions, using the dequantized DCT coefficients; (c) an instruction to add the DCT coefficients of the gradient offset function to the dequantized DCT coefficients and approximately reconstruct DCT coefficients of the input signal; (d) an instruction to recover an input signal for each of the respective block regions from the approximately reconstructed DCT coefficients of the input signal; and (e) an instruction to join together the input signal in each of the respective block regions to reconstruct input data.

The twelfth aspect of the present invention inheres in a data decompression program for executing a series of instructions on a decoder, which divides input data equally into plurality of block regions, and estimates the input data, including: (a) an instruction to execute decoding and dequantization of the compressed data, and obtain dequantized DCT coefficients of each of the respective block regions; (b) an instruction to compute DCT coefficients of a gradient offset function, which offsets the gradient of an input signal in the subject block region, at a block boundary between the subject block region and its adjacent block regions, using the dequantized DCT coefficients; (c) an instruction to compute a quantization error from the DCT coefficients $U^Q$ of the gradient offset function; (d) n instruction to correct the dequantized DCT coefficients using the quantization error, and make an approximate estimation of DCT coefficients of the input signal; (e) an instruction to recover an input signal for each of the respective block regions from the approximately estimated DCT coefficients of the input signal; and (f) an instruction to join together the input signal in each of the respective block regions to estimate the input data.

The thirteenth aspect of the present invention inheres in a data decompression program for executing a series of instructions on a decoder, which divides input data equally into plurality of block regions, and estimates the input data, including: (a) an instruction to execute decoding and dequantization of the compressed data, and obtain dequantized DCT coefficients of each of the respective block regions; (b) an instruction to compute DCT coefficients of a gradient offset function, which offsets the gradient of an input signal in the subject block region, at a block boundary between each subject block region and its adjacent block regions, using the dequantized DCT coefficients; (c) an instruction to compute a quantization error from the DCT coefficients $U^Q$ of the gradient offset function; (d) an instruction to add a quadratic surface, which reduces blocking artifact, to adjacent block regions, and compute DCT coefficients of the quadratic surface; (e) an instruction to correct the dequantized DCT coefficients using the quantization error and the DCT coefficients of the quadratic surface, and approximately estimate DCT coefficients of the input signal; (f) an instruction to recover an input signal for each of the respective block regions from the approximately estimated DCT coefficients of the input signal; and (g) an instruction to join together the input signal in each of the respective block regions to estimate the input data.

BRIEF DESCRIPTION OF THE DRAWINGS

FIG. 20(a) is a diagram illustrating a standard test original Lenna image used when visually evaluating the performance of a data compression/decompression system; FIG. 20(b) is a diagram illustrating a standard original Barbara image used when visually evaluating the performance of a data compression/decompression system;

FIG. 21(a) is a graph where abscissa represents coding rate (bit rate) while ordinate represents values of MSSIM for the original Lenna image, comparing the performance of the conventional technology (DCT) to those of the first embodiment (PHLCT) and the modified example of the second embodiment (PPHLCT); FIG. 21(b) is a graph where abscissa represents coding rate and ordinate represents values of PSNR when using the original Lenna image, comparing the performance of the conventional technology (DCT) to those of the first embodiment (PHLCT) and the modified example of the second embodiment (PPHLCT);

FIG. 22(a) is a graph where abscissa represents coding rate (bit rate) while ordinate represents values of MSSIM when using the original Barbara image, comparing the performance of the conventional technology (DCT) to those of the first embodiment (PHLCT) and the modified example of the second embodiment (PPHLCT); FIG. 22(b) is a graph where abscissa represents coding rate while ordinate represents values of PSNR when using the original Barbara image, comparing the performance the conventional technology (DCT) to those of the first embodiment (PHLCT) and the modified example of the second embodiment (PPHLCT);

FIG. 23(a) is a graph where abscissa represents values of PSNR while ordinate represents reduction rate of coding rate (compression rate) for DCT (JPEG standard) when using the original Lenna image, comparing the performance of the conventional technology (DCT) to those of the first embodiment (PHLCT) and the modified example of the second embodiment (PPHLCT); FIG. 23(b) is a graph where abscissa represents values of PSNR while ordinate represents reduction rate of coding rate (compression rate) for DCT (JPEG standard) when using the original Barbara image, comparing the performance of the conventional technology (DCT) to those of the first embodiment (PHLCT) and the modified example of the second embodiment (PPHLCT);

FIG. 24(a) is a reconstructed image in the case of applying DCT based on the JPEG standard according to the conventional technology; FIG. 24(b) is a reconstructed image in the case of applying the modified example of the second embodiment (PPHLCT) when using the original Lenna image; FIG. 24(c) is a reconstructed image in the case of applying the first embodiment (PHLCT) when using the original Lenna image; FIG. 24(d) is a reconstructed image in the case of applying normal DCT (JPEG standard) when using the original Barbara image; FIG. 24(e) is a reconstructed image in the case of applying the modified example of the second embodiment (PPHLCT) when using the original Barbara image; and FIG. 24(f) is a reconstructed image in the case of applying the first embodiment (PHLCT) when using the original Barbara image;

FIG. 25 shows examples of reconstructed images at a coding rate (compression rate) of 0.3 bpp; FIG. 25(a) is a reconstructed image in the case of applying DCT based on the JPEG standard according to the conventional technology; FIG. 25(b) is a reconstructed image in the case of applying the modified example of the second embodiment (PPHLCT) when using the original Lenna image; FIG. 25(c) is a reconstructed image in the case of applying the first embodiment (PHLCT) when using the original Lenna image; FIG. 25(d) is a reconstructed image in the case of applying normal DCT (JPEG standard) when using the original Barbara image; FIG. 25(e) is a reconstructed image in the case of applying the modified example of the second embodiment (PPHLCT) when using the original Barbara image; and FIG. 25(f) is a reconstructed image in the case of applying the first embodiment (PHLCT) when using the original Barbara image;

FIG. 27(a) is a block diagram illustrating a logical configuration of a derivative matching local cosine transform (DMLCT) circuit in the data compression/decompression system according to the third embodiment of the present invention, and FIG. 27(b) is a block diagram illustrating a logical configuration of an inverse derivative matching local cosine transform (IDMLCT) circuit in the data compression/decompression system according to the third embodiment of the present invention;

FIG. 32(a) is a graph where ordinate represents PSNR while abscissa represents reduction rate of coding rate (compression rate) for the data compression/decompression system according to the first embodiment (PHLCT) and the compression/decompression system according to the third embodiment (DMLCT) when using the original Lenna image; and FIG. 32(b) is a graph where ordinate represents PSNR while abscissa represents reduction rate of coding rate (compression rate) for the data compression/decompression system according to the first embodiment (PHLCT) and the compression/decompression system according to the third embodiment (DMLCT) when using the original Barbara image;

DETAILED DESCRIPTION OF THE INVENTION

First through third embodiments of the present invention are described forthwith while referencing the diagrams. The same or similar symbols are applied to the same or similar parts throughout the appended drawings. In addition, the first through third embodiments given forthwith illustrate devices, methods, and programs for embodying the technical idea of the present invention, and that technical idea of the present invention is not limited to the following materials, shapes, structures, arrangements or the like. The technical idea of the present invention may be modified into various modifications within the scope of the appended claims.

First Embodiment

Figure 1:
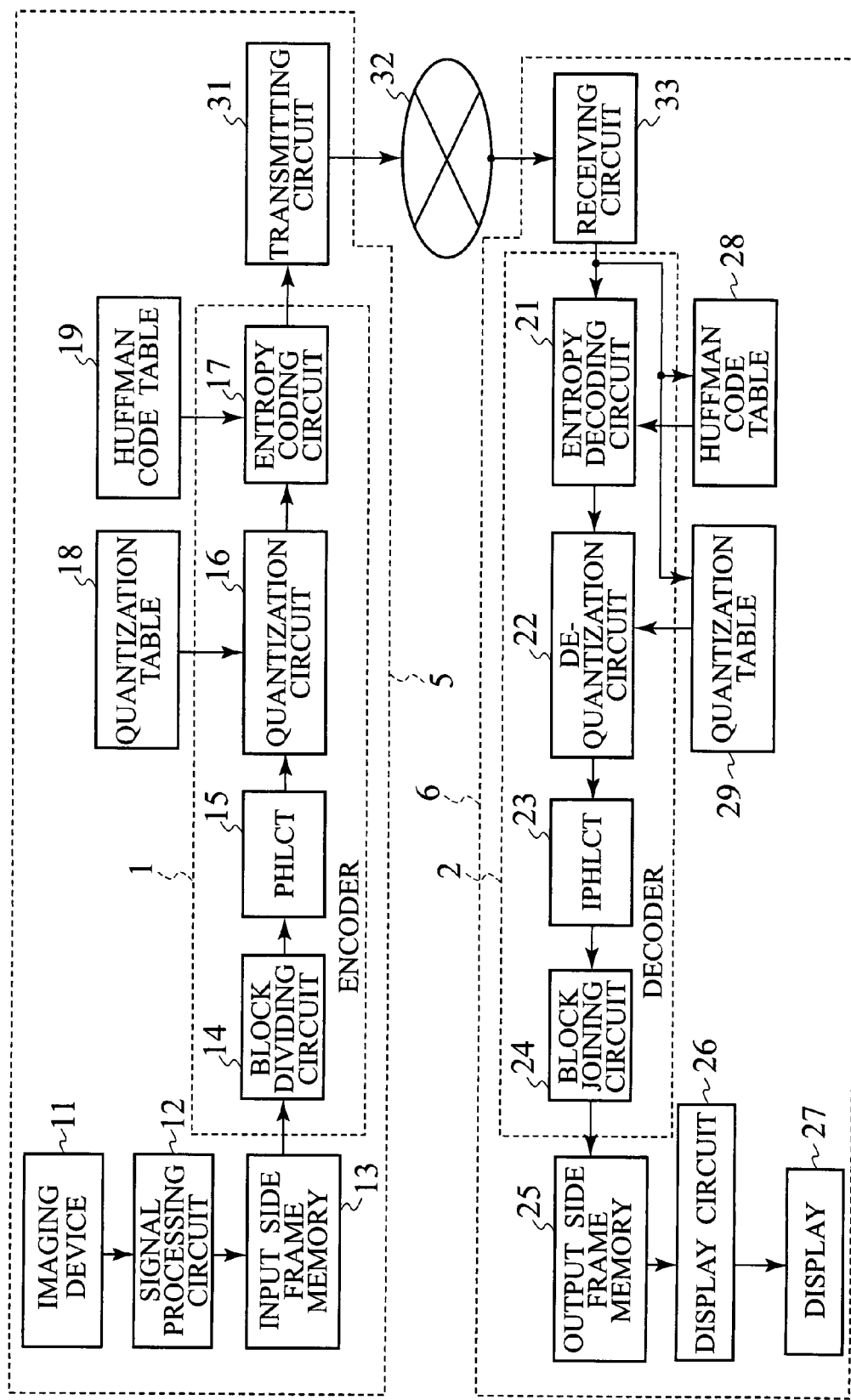
FIG. 1 is a block diagram schematically illustrating a data compression/decompression system according to a first embodiment of the present invention.

A data compression/decompression system according to a first embodiment of the present invention includes a transmitting terminal 5, a transmission channel 32, which transmits compressed image data (hereafter referred to as 'compressed data') sent from the transmitting terminal 5, and a receiving terminal 6, which receives the compressed data sent from the transmitting terminal 5 via the transmission channel 32, decompresses this compressed data, and then displays the decompressed image data, as shown in FIG. 1. The transmission channel 32 includes an information network (computer network) such as LAN, WAN, the Internet, and an intranet, but it may be a wireless transmission channel.

The transmitting terminal 5 includes an encoder 1, an imaging device 11, a signal processing circuit 12, an input side frame memory 13, a transmitting circuit 31, a transmitting side quantization table storage unit 18, and a transmitting side Huffman code table storage unit 19. The encoder 1 includes a block dividing circuit 14, a polyharmonic local cosine transform (PHLCT) circuit 15, a quantization circuit 16, and an entropy coding circuit 17. In the case where the transmission channel 32 is an information network such as the Internet, the transmitting circuit 31 corresponds to a data circuit-terminating device such as a MODEM, a digital service unit (DSU), a network control unit (NCU), a communication control unit (CCU), and a communication control processor (CCP). On the other hand, if the transmission channel 32 is a wireless transmission channel, the transmitting circuit 31 may be constituted by a low noise amplifier connected to an antenna (receiving antenna) 3, a mixer connected to this low noise amplifier, an intermediate frequency (IF) amplifier connected to the mixer, and a demodulator connected to the intermediate frequency amplifier.

The receiving terminal 6 includes a decoder 2, an output side frame memory 25, a display 27, a display circuit 26, a receiving circuit 33, a receiving side quantization table storage unit 29, and a receiving side Huffman code table storage unit 28. The decoder 2 includes an entropy decoding circuit 21, a dequantization circuit 22, an inverse PHLCT (IPHLCT) circuit 23, and a block joining circuit 24. In the case where the transmission channel 32 is an information network such as the Internet, the receiving circuit 33 corresponds to a data circuit-terminating device such as a MODEM, a DSU, an NCU, a CCU, and a CCP.

The imaging device 11 of the transmitting terminal 5 is constituted by a CCD, and generates an output signal by photographing a subject image. The signal processing circuit 12 generates image data for each frame from the output signal of the imaging device 11. Each frame image data generated by the signal processing circuit 12 is transferred to the input side frame memory 13.

The display circuit 26 of the receiving terminal 6 generates an image signal from each frame image data transferred from the decoder 2. The display 27 displays the image signal generated by the display circuit 26 as the subject image.

The input side frame memory 13 and the output side frame memory 25 may be constituted by rewritable semiconductor memory such as SDRAM, DRAM, and random DRAM and write in and store the transferred image data for each frame, then reading out the stored image data frame by frame.

Figure 2:
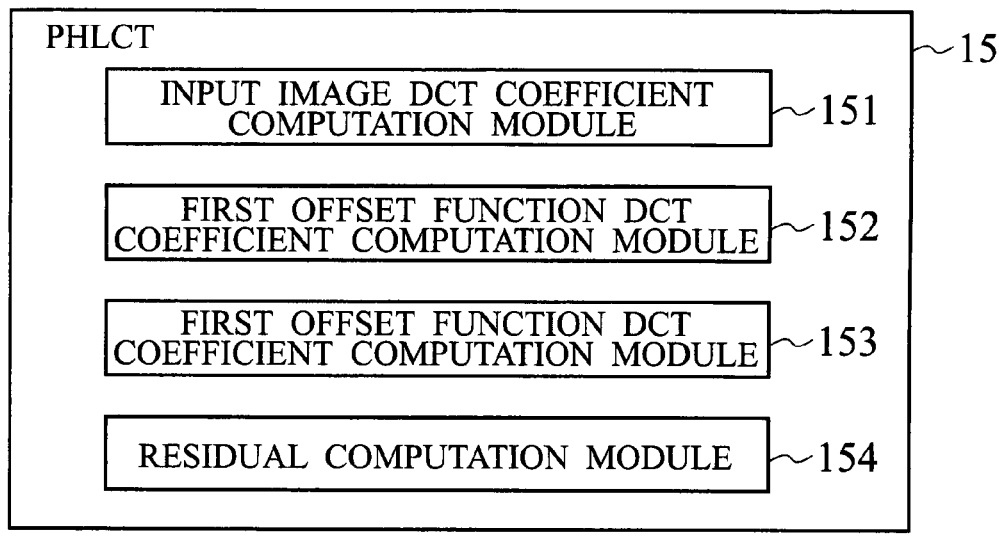
FIG. 2 is a block diagram illustrating a logical configuration of a PHLCT circuit in the data compression/decompression system according to the first embodiment of the present invention.
Figure 3:
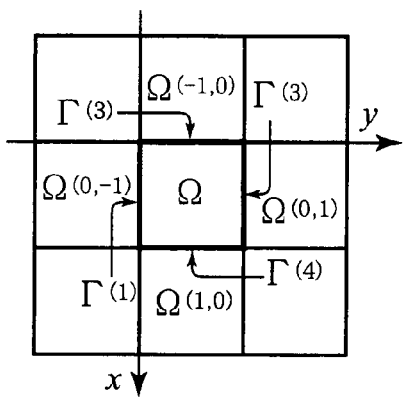
FIG. 3 is a diagram schematically illustrating image data blocks, which are divided by a block dividing circuit in a data compression/decompression system according to first through third embodiments of the present invention.

In FIG. 1, each frame image data read out from the input side frame memory 13 is transferred to the encoder 1. In the encoder 1, the block dividing circuit 14 divides the image data of a single frame into a plurality of blocks of 8×8 pixels according to the JPEG standard (see FIG. 4), and the PHLCT circuit 15 compresses multivalued image data of each block. In other words, as shown in FIG. 2, the PHLCT circuit 15 includes an input image DCT coefficient computation module (input signal DCT coefficient computation module) 151, a first offset function DCT coefficient computation module 152, a second offset function DCT coefficient computation module 153, and a residual computation module 154, captures the image data of each single frame block as shown in FIG. 3 from the block dividing circuit 14, and executes PHLCT on that image data (details of the PHLCT circuit 15 are given later.)

The quantization circuit 16 quantizes DCT coefficients for a residual V=F−U, which are supplied from the PHLCT circuit 15 by referencing quantization thresholds stored in the transmitting side quantization table storage unit 18. Namely, the quantization circuit 16 divides the DCT coefficients by the quantization thresholds shown in Table 2, resulting in quantization coefficients as quotients. As the aforementioned quantization thresholds, large values are set for high frequency components, and small values are set for low frequency components. Note that there are few high frequency components for common images of scenes from nature and the like. As a result, the quantization coefficients after quantization of most of the high frequency components are zero. The quantization thresholds stored in the transmitting side quantization table storage unit 18 are used to determine image quality for the compression rate for the compressed data.

The quantization coefficients obtained in this way are retrieved in a scanning order called the zigzag scan, and input to the entropy coding circuit 17. The entropy coding circuit 17 converts the DCT coefficients quantized by the quantization circuit 16 to variable length codes by referencing Huffman codes stored in the transmitting side Huffman code table storage unit 19, generating compressed data in block units. With the entropy coding circuit 17, DC components in the upper left corner of the blocks and remaining AC components are divided and encoded, and the AC components are grouped into a zero run length or continuous number of coefficients of zero (invalid coefficients) and a coefficient other than zero (valid coefficient), and the resulting groups are encoded according to a Huffman code table. The Huffman codes stored in the transmitting side Huffman code table storage unit 19 are variable length codes allocated to the quantized DCT coefficients according to pre-computed occurrence rates, where short ones are allocated to codes with a high occurrence rate.

The compressed data in block units generated by the entropy coding circuit 17 is transferred to the transmission channel 32 via the transmitting circuit 31. The compressed data sent from the transmitting terminal 5 via the transmission channel 32 is received by the receiving circuit 33 of the receiving terminal 6. The compressed data input via the receiving circuit 33 is transferred to the entropy decoding circuit 21 of the decoder 2.

The entropy decoding circuit 21 converts the compressed data in block units transferred via the receiving circuit 33 to variable length codes by referencing the Huffman codes stored in the receiving side Huffman code table storage unit 28, thereby generating decompressed image data (hereafter referred to as 'decompressed data') in block units. The Huffman codes stored in the receiving side Huffman code table storage unit 28 are variable length codes allocated to the decompressed data according to pre-computed occurrence rates, where short ones are allocated to codes with a high occurrence rate. The dequantization circuit 22 dequantizes the decompressed data in block units generated by the entropy decoding circuit 21 by referencing the quantization thresholds stored in the transmitting side quantization table storage unit 29, thereby generating the DCT coefficients. The quantization thresholds stored in the receiving side quantization table storage unit 29 determine image quality of the recovered image, which results from decompressing the compressed data.

Figure 10:
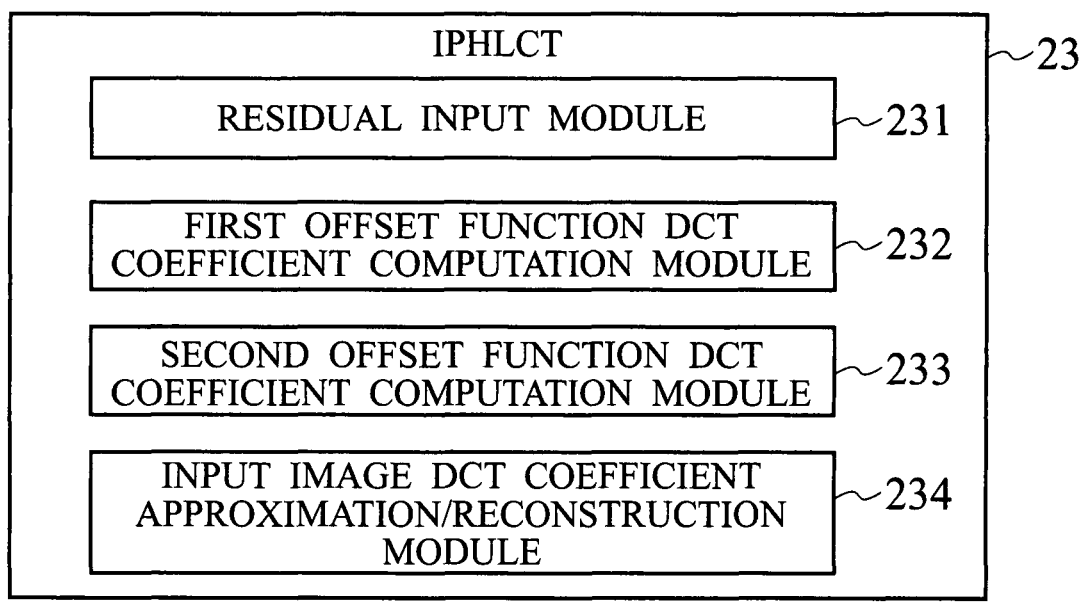
FIG. 10 is a block diagram illustrating a logical configuration of an inverse PHLCT (IPHLCT) circuit in the data compression/decompression system according to the first embodiment of the present invention.

As shown in FIG. 10, the inverse PHLCT circuit 23 includes a residual input module 231, a first offset function DCT coefficient computation module 232, a second offset function DCT coefficient computation module 233, and an input image DCT coefficient approximation/reconstruction module 234, and subjects the DCT coefficients generated by the dequantization circuit 22 to inverse PHLCT (details of the inverse PHLCT circuit 23 are given later.) The decompressed data in block units having been subjected to inverse polyharmonic local cosine transform by the inverse PHLCT circuit 23 is joined together by the block joining circuit 24, becoming frame data.

Each frame data joined together by the block joining circuit 24 is transferred to the output side frame memory 25. The output side frame memory 25 writes and stores each frame image data transferred from the decoder 2. The display circuit 26 generates an image signal from the frame image data transferred from the decoder 2, and then displays that image signal as the subject image on the display 27.

<Polyharmonic Local Cosine Transform (PHLCT) Circuit>

Figure 4:
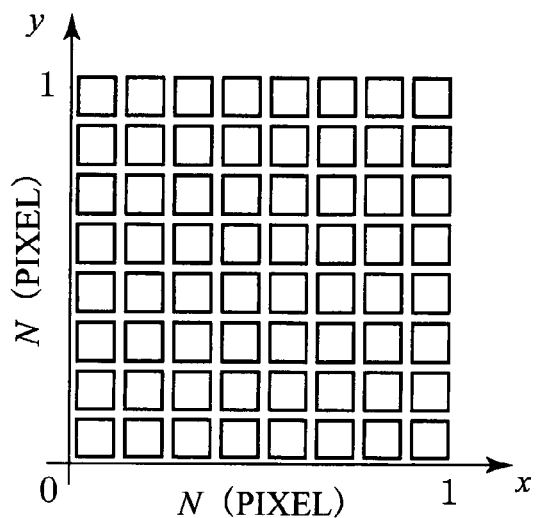
FIG. 4 is a diagram illustrating that a block unit shown in FIG. 3 is implemented by 8×8 (more generally N×N) pixels.

Before we explain the PHLCT circuit 15, let us consider the input signal function f for the two-dimensional block regions Ω shown in FIG. 3. The input signal function f on the actual image processing unit is provided only for nondiscrete data, but for illustrative purposes, f(x) is treated as a continuous signal. The two-dimensional block region Ω shown in FIG. 3 consists of 8×8 pixels as shown in FIG. 4.

Figure 5:
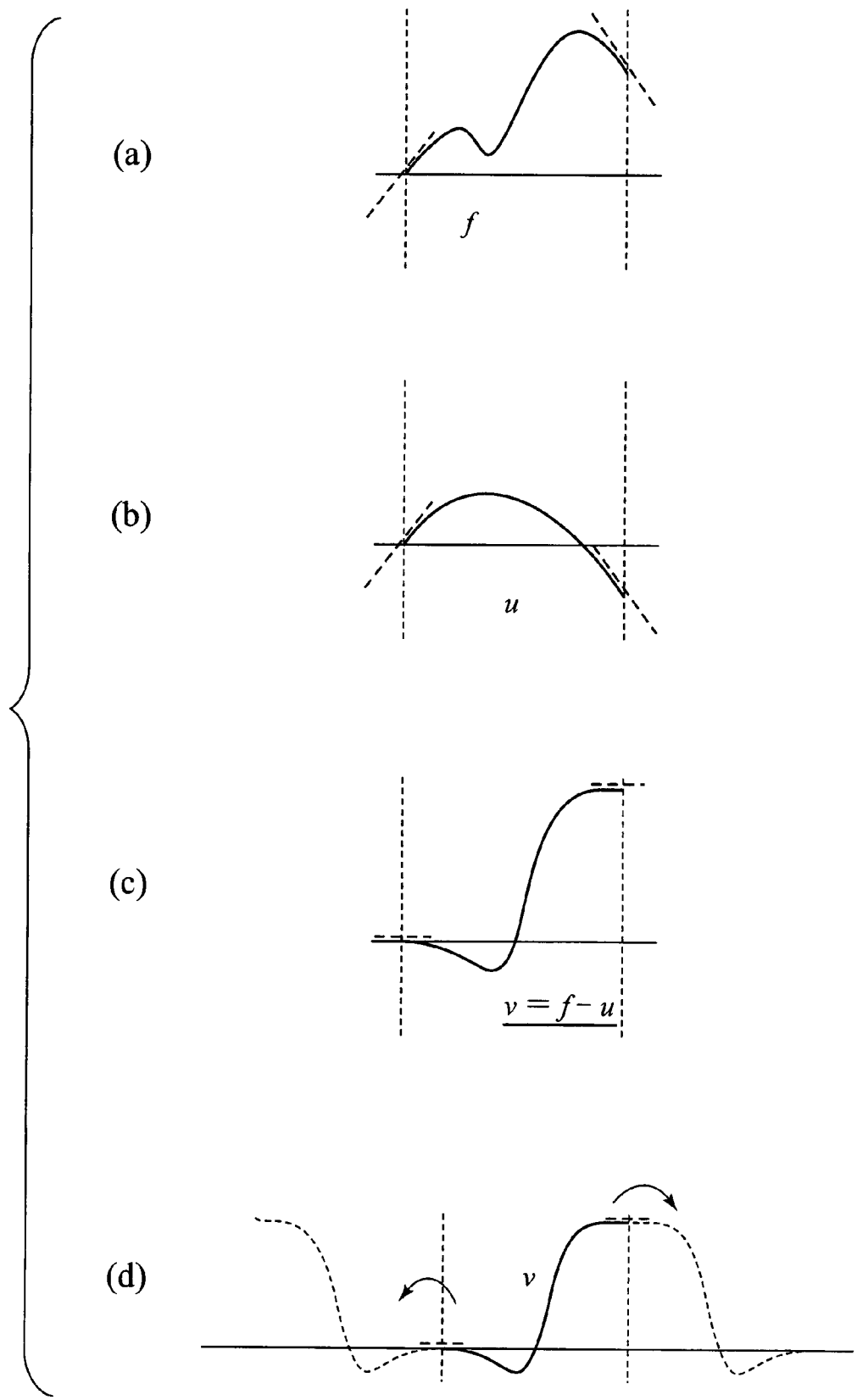
FIG. 5(a) illustrates mathematical background for the data compression/decompression system according to the first embodiment of the present invention, such that an input signal, which is essentially discrete multivalued data, is schematically represented as a continuous input signal function f(x) for convenience of explanation.
FIG. 5(b) illustrates mathematical background for the data compression/decompression system according to the first embodiment of the present invention, where a 'gradient offset function' u(x), which off sets a gradient of the input signal function f(x) is schematically represented.
FIG. 5(c) is a diagram schematically illustrating that gradient (first derivative) of a residual v(x)=f(x)−u(x) is zero at a boundary along the x direction of a two-dimensional block region Ω indicated by dotted lines.
FIG. 5(d) is a diagram schematically illustrating that the residual v(x)=f(x)−u(x) continues into the adjacent two-dimensional block regions Ω since the gradient of the residual v(x)=f(x)−u(x) is zero at a boundary along the x direction of the two-dimensional block region Ω indicated by dotted lines.

With the data compression/decompression system according to the first embodiment of the present invention, a function u(x) as shown in FIG. 5(b) is focused on as a function offsetting a gradient of the input signal function f(x) (hereafter referred to as 'gradient offset function') shown in FIG. 5(a). FIGS. 5(a) through 5(d) respectively show a boundary of the two-dimensional block region Ω along the x direction with two longitudinal dotted lines. Convergence of the DCT coefficients is improved using a residual v(x)=f(x)−u(x) as shown in FIG. 5(c). For the gradient offset function u, a solution u to the following Neumann boundary value problem of Poisson's equation is employed,

[Eq. 1]

$$\begin{cases} \Delta u = K & \text{in } \Omega, \\ \frac{\partial u}{\partial v} = \frac{\partial f}{\partial v} & \text{on } \partial\Omega, \end{cases} \quad (1)$$

where

[Eq. 2]

$$K := \frac{1}{|\Omega|} \int_{\partial\Omega} \partial f / \partial v \, d\sigma(x),$$

|Ω| represents the area of a block. The function u is the minimizer of the mean squared curvature integral of the class $C^2$ functions offsetting a gradient of an input signal at the block boundary, as indicated by the following theorem: "Suppose that a function p is of class $C^2$ in a closed region Ω (bar) and that M(p) is the mean squared curvature integral of p on Ω (bar),

[Eq. 3]

$$M(p) := \int_{\Omega} (\Delta p)^2 \, dx \quad \quad \quad \quad \quad \quad \quad \quad \quad \quad \quad \quad \quad \quad \quad \quad \quad \quad \quad \quad \quad \quad \quad \quad \quad \quad 5$$

then $M(u) \leq M(p)$ is satisfied for any p satisfying the Neumann boundary condition $\partial p/\partial \nu = \partial f/\partial \nu$ on $\partial \Omega"$. Note that in this specification, $\Omega$ (bar) means

[Eq. 4]

$$\bar{\Omega}$$

Normally, the convergence rate of DCT coefficients is known to follow $O(\|k\|^{-2})$ asymptotically. Here, $k=(k1, k2)$ is a spatial frequency index for each block. On the other hand, with the processing in the PHLCT circuit 15 of the data compression/decompression system according to the first embodiment, the convergence rate of DCT coefficients for a residual v follows $O(\|k\|^{-4})$.

Next, an image processing method for the data compression/decompression system according to the first embodiment regarding the input signal function f provided discretely is described. While 8×8 lattice points are exemplified in FIG. 4, sampling points of the input signal function f(x,y) are, more generally, arranged at N×N lattice points (xi, yj) on a unit square region;

$$\Omega = (0,1)^2 = \{(x,y) | 0 < x < 1, 0 < y < 1\}$$

where $$x_i = (0.5+i)/N, \; y_j = (0.5+j)/N, \; (i,j=0,1,\ldots,N-1)$$

A gradient of the input signal function f at the discrete points arranged around the region $\Omega$ is

[Eq. 5]

$$g_i^{(1)} := -f_y(\chi_i, 0), \; g_i^{(2)} := f_y(\chi_i, 1) \; g_j^{(3)} := -f_\chi(0, y_j),$$

$$g_j^{(4)} := f_\chi(1, y_j), \; i,j=0,1,\ldots,N-1, \quad \quad \quad \quad \quad \quad \quad \quad (2)$$

where $fx := \partial f(x,y)/\partial x$ and $fy := \partial f(x,y)/\partial y$.

The Neumann boundary condition for Poisson's equation (1) is approximated using a one-dimensional discrete cosine series:

[Eq. 6]

$$g^{(l)}(t) := \sqrt{\frac{2}{N}} \sum_{k=0}^{N-1} \lambda_k G_k^{(l)} \cos \pi k t, \quad \quad \quad (3)$$

$$= \sqrt{\frac{2}{N}} \left( \frac{G_0^{(l)}}{\sqrt{2}} + \sum_{k=1}^{N-1} G_k^{(l)} \cos \pi k t \right), 0 \leq t \leq 1,$$

$$l = 1, 2, 3, 4,$$

where $$\lambda_k := \begin{cases} 1/\sqrt{2} & \text{if } k = 0, \\ 1 & \text{otherwise,} \end{cases}$$

and $\{G_k^{(1)}\}_{0 \leq k \leq N-1}$ are one-dimensional DCT coefficients of gradients $g_0^{(1)}, g_1^{(1)}, \ldots,$ and $g_{N-1}^{(1)}$ of the function f at the boundary of $\Omega$. In this case, the gradient offset function u or solution to Poisson's equation (1) is

[Eq. 7]

$$u(x, y) = u^{(1)}(x, y) + u^{(2)}(x, y) + u^{(3)}(x, y) + u^{(4)}(x, y) \quad \quad (4)$$

$$= \sqrt{\frac{2}{N}} \sum_{k=0}^{N-1} \lambda_k \{ (G_k^{(1)} \psi_k(y-1) + G_k^{(2)} \psi_k(y)) \cos \pi k x +$$

$$(G_k^{(3)} \psi_k(x-1) + G_k^{(4)} \psi_k(x)) \cos \pi k y \} + c.$$

where c is an appropriate constant $$\psi_k(t) := \begin{cases} t^2/2 & \text{if } k = 0, \\ \cosh \pi k t / (\pi k \sinh \pi k) & \text{otherwise.} \end{cases}$$

Furthermore, DCT coefficients $U_{k_1, k_2}$ ($k_1, k_2 = 0, 1, \ldots, N-1$) in the solution u(x, y) are provided through the following equation:

[Eq. 8]

$$U_{k_1, k_2} = G_{k_1}^{(1)} \eta_{k_1, k_2} + G_{k_1}^{(2)} \eta_{k_1, k_2}^* + G_{k_2}^{(3)} \eta_{k_2, k_1} + G_{k_2}^{(4)} \eta_{k_2, k_1}^*, \quad \quad (5)$$

where $$\eta_{k,m} := \lambda_m \sqrt{\frac{2}{N}} \sum_{i=0}^{N-1} \psi_k(x_i - 1) \cos \pi m x_i, \quad \quad (6)$$

$$\eta_{k,m}^* := \lambda_m \sqrt{\frac{2}{N}} \sum_{i=0}^{N-1} \psi_k(x_i) \cos \pi m x_i.$$

Clearly, $\eta_{k,m}$ and $\eta_{k,m}^*$ can be computed independently of input signals. For reference, N=8, namely a value of $\eta_{k,m}$ in the case of an 8×8 pixel block size shown in FIG. 4 is given in Table 1.

TABLE 1

|  | m = 0 | m = 1 | m = 2 | m = 3 | m = 4 | m = 5 | m = 6 | m = 7 |
| --- | --- | --- | --- | --- | --- | --- | --- | --- |
| k = 0 | 0.6641 | 0.4026 | 0.0986 | 0.0421 | 0.0221 | 0.0126 | 0.0070 | 0.0032 |
| k = 1 | 0.4027 | 0.2000 | 0.0783 | 0.0376 | 0.0206 | 0.0120 | 0.0067 | 0.0031 |
| k = 2 | 0.0988 | 0.0785 | 0.0480 | 0.0283 | 0.0171 | 0.0104 | 0.0060 | 0.0028 |
| k = 3 | 0.0425 | 0.0380 | 0.0285 | 0.0197 | 0.0132 | 0.0085 | 0.0051 | 0.0024 |
| k = 4 | 0.0229 | 0.0214 | 0.0177 | 0.0135 | 0.0097 | 0.0066 | 0.0041 | 0.0020 |

TABLE 1-continued

|  | m = 0 | m = 1 | m = 2 | m = 3 | m = 4 | m = 5 | m = 6 | m = 7 |
|---|---|---|---|---|---|---|---|---|
| k = 5 | 0.0139 | 0.0132 | 0.0115 | 0.0093 | 0.0071 | 0.0051 | 0.0032 | 0.0016 |
| k = 6 | 0.0090 | 0.0087 | 0.0078 | 0.0066 | 0.0052 | 0.0038 | 0.0025 | 0.0012 |
| k = 7 | 0.0061 | 0.0060 | 0.0054 | 0.0047 | 0.0038 | 0.0028 | 0.0019 | 0.0009 |

The values of DCT coefficients $G_0^{(1)}, G_1^{(1)}, \ldots$, and $G_{N-1}^{(1)}$, for the gradients $g_0^{(1)}, g_1^{(1)}, \ldots$, and $g_{N-1}^{(1)}$ of input signals are necessary for actually computing DCT coefficients U of the gradient offset function u shown in Eq. (5), and these values are approximately computed in the manner as follows.

First, consider four block regions adjacent to the block region Ω being discussed on the left, right, top, and bottom as shown in FIG. 3. In respective regions $\Omega^{(s,t)}$ in FIG. 3, input data is expressed as $$f^{(s,t)}_{i,j} := f(x_i+s, y_j+t),$$

$$i,j = 0, 1, \ldots, N-1,$$

and $$\Omega^{(0,0)} = \Omega$$

and $$f^{(0,0)}_{i,j} = f(x_i, y_j).$$

The gradients $g_0^{(1)}, g_1^{(1)}, \ldots$, and $g_{N-1}^{(1)}$ of the input signals are approximated by:

[Eq. 9]

$$g_i^{(1)} \simeq X_i^{(-1)} - X_i^{(0)}, \quad g_i^{(2)} \simeq X_i^{(1)} - X_i^{(0)}, \quad (7)$$
$$g_j^{(3)} \simeq Y_j^{(-1)} - Y_j^{(0)}, \quad g_j^{(4)} \simeq Y_j^{(1)} - Y_j^{(0)},$$

where $$X_i^{(t)} := \frac{1}{N}\sum_{j=0}^{N-1} f_{i,j}^{(0,t)}, \quad Y_j^{(s)} := \frac{1}{N}\sum_{i=0}^{N-1} f_{i,j}^{(s,0)},$$

are mean values of the input signals in the row and column directions, respectively. Furthermore, by denoting the two-dimensional DCT coefficients of the input data $f^{(s,t)}$ in the respective block regions $\Omega^{(s,t)}$ by $F^{(s,t)} = (F^{(s,t)}_{k_1,k_2})$,

[Eq. 10]

$$G_k^{(1)} = \lambda_k \sqrt{\frac{2}{N}} \sum_{i=0}^{N-1} g_i^{(1)} \cos \pi k x_i$$

$$\simeq \lambda_k \sqrt{\frac{2}{N}} \sum_{i=0}^{N-1} \{X_i^{(-1)} - X_i^{(0)}\} \cos \pi k x_i$$

$$= \frac{1}{\sqrt{N}} (F_{k,0}^{(0,-1)} - F_{k,0}), \quad k = 0, 1, \ldots, N-1,$$

is obtained. The following equation is similarly obtained.

[Eq. 11]

$$G_k^{(2)} \simeq \frac{1}{\sqrt{N}} (F_{k,0}^{(0,1)} - F_{k,0}),$$

-continued $$G_k^{(3)} \simeq \frac{1}{\sqrt{N}} (F_{0,k}^{(-1,0)} - F_{0,k}),$$

$$G_k^{(4)} \simeq \frac{1}{\sqrt{N}} (F_{0,k}^{(1,0)} - F_{0,k}),$$

Therefore, the DCT coefficients $U_{k_1,k_2}$ ($k_1, k_2 = 0, 1, \ldots, N-1$) of the solution u(x, y) to Poisson's equation are given by the following equation:

[Eq. 12]

$$U_{k_1,k_2} = \frac{1}{\sqrt{N}} \{(F_{k_1,0}^{(0,-1)} - F_{k_1,0})\eta_{k_1,k_2} + (F_{k_1,0}^{(0,1)} - F_{k_1,0})\eta_{k_1,k_2}^* + \qquad (8)$$
$$(F_{0,k_2}^{(-1,0)} - F_{0,k_2})\eta_{k_2,k_1} + (F_{0,k_2}^{(1,0)} - F_{0,k_2})\eta_{k_2,k_1}^*\}.$$

Eq. (8) is computed by the second offset function DCT coefficient computation module 153 of the PHLCT circuit 15 and the second offset function DCT coefficient computation module 233 of the inverse PHLCT circuit 23. The DC components $U_{0,0}$ may be $$U_{0,0} = 0$$

without losing generality due to the arbitrariness of the constant c included in Eq. (4).

The data compression/decompression system according to the first embodiment improves compression efficiency by using residual V=F−U, which is computed from the DCT coefficients U of the gradient offset function u, instead of input image DCT coefficients (input signal DCT coefficients) F. This means that what is transferred from the encoder 1 after compression is the residual V=F−U and not input image DCT coefficients (input signal DCT coefficients) F, and image reconstruction from the residual V is attempted. Accordingly, the first offset function DCT coefficient computation module 152 of the PHLCT circuit 15 corrects the DCT coefficients U of the gradient offset function u in the following manner so as to allow reconstruction of the original input image DCT coefficients (input signal DCT coefficients) F from the residual V=F−U by the decoder 2:

[Ex. 13]

$$\tilde{U}_{k_1,k_2} := \begin{cases} 0 & \text{if } k_1 = k_2 = 0; \\ \frac{1}{\sqrt{N}}\{(F_{0,0}^{(-1,0)} - F_{0,0})\eta_{0,k_1} + (F_{0,0}^{(1,0)} - F_{0,0})\eta_{0,k_1}^*\} & \text{if } k_1 \neq 0 = k_2; \\ \frac{1}{\sqrt{N}}\{(F_{0,0}^{(0,-1)} - F_{0,0})\eta_{0,k_2} + (F_{0,0}^{(0,1)} - F_{0,0})\eta_{0,k_2}^*\} & \text{if } k_1 = 0 \neq k_2; \\ U_{k_1,k_2} & \text{otherwise,} \end{cases}$$

Clearly, the difference between U and U (tilde) is only on the first row and the first column, and these values of U (tilde) can be found from just the DC components in the subject block and the adjacent blocks. Accordingly, Eq. (9) may be used in computation by the first offset function DCT coefficient computation module 232 of the inverse PHLCT circuit 23. Note that in this specification, Ũ (tilde) means

[Eq. 14]

$$\tilde{U}$$

Similarly, if V (tilde) is taken to mean

[Eq. 15]

$$\tilde{V}$$

the corrected residual V (tilde):=F−U (tilde) is represented by the following equation:

[Eq. 16]

$$\tilde{V}_{k_1,k_2} := \begin{cases} F_{0,0} & \text{if } k_1 = k_2 = 0; \\ F_{k_1,0} - \frac{1}{\sqrt{N}}\{(F_{0,0}^{(-1,0)} - F_{0,0})\eta_{0,k_1} + \\ (F_{0,0}^{(1,0)} - F_{0,0})\eta_{0,k_1}^*\} & \text{if } k_1 \neq 0 = k_2; \\ F_{0,k_2} - \frac{1}{\sqrt{N}}\{(F_{0,0}^{(0,-1)} - F_{0,0})\eta_{0,k_2} + \\ (F_{0,0}^{(0,1)} - F_{0,0})\eta_{0,k_2}^*\} & \text{if } k_1 = 0 \neq k_2; \\ F_{k_1,k_2} - U_{k_1,k_2} & \text{otherwise.} \end{cases} \quad (10)$$

Computation of the residual V (tilde):=F−U (tilde) is performed by the residual computation module 154 of the PHLCT circuit 15. The residual V (tilde) computed by the residual computation module 154 is transferred as data for each of the respective block regions to the quantization circuit 16, and further transferred to the transmission channel 32 via the entropy coding circuit 17 and the transmitting circuit 31. The compressed data sent over the transmission channel 32 is received via the receiving circuit 33 of the receiving terminal 6, transferred to the entropy decoding circuit 21 of the decoder 2, and then enters the inverse PHLCT circuit 23 via the dequantization circuit 22. The inverse PHLCT circuit 23 then reconstructs the image using the V (tilde). Here, V (tilde)$_{0,0}$=F$_{0,0}$ should be confirmed. Hereafter, in this specification, U and V denote U (tilde) and V (tilde), respectively, to simplify notation of symbols.

Supposing that the quantization table stored in the transmitting side quantization table storage unit 18 of the transmitting terminal 5 is Q and that components thereof are $Q_k(\geq 1)$, the DCT coefficients F are quantized in the following manner by the quantization circuit 16 of the encoder 1:

[Eq. 17]

$$i_k := \text{round}(F_k/Q_k); F_k^Q := Q_k \times i_k, k \in \kappa \quad (11)$$

where $\kappa := \{k=(k_1,k_2)|k_1,k_2=0, 1, 2, \ldots, 7\}$.

The DCT coefficient sequence $\{i_k\}$ quantized by the quantization circuit 16 of the encoder 1 is encoded by the entropy coding circuit 17 of the encoder 1, transferred to the transmission channel 32 via the transmission circuit 31, and then transmitted via the transmission channel 32.

Figure 8:
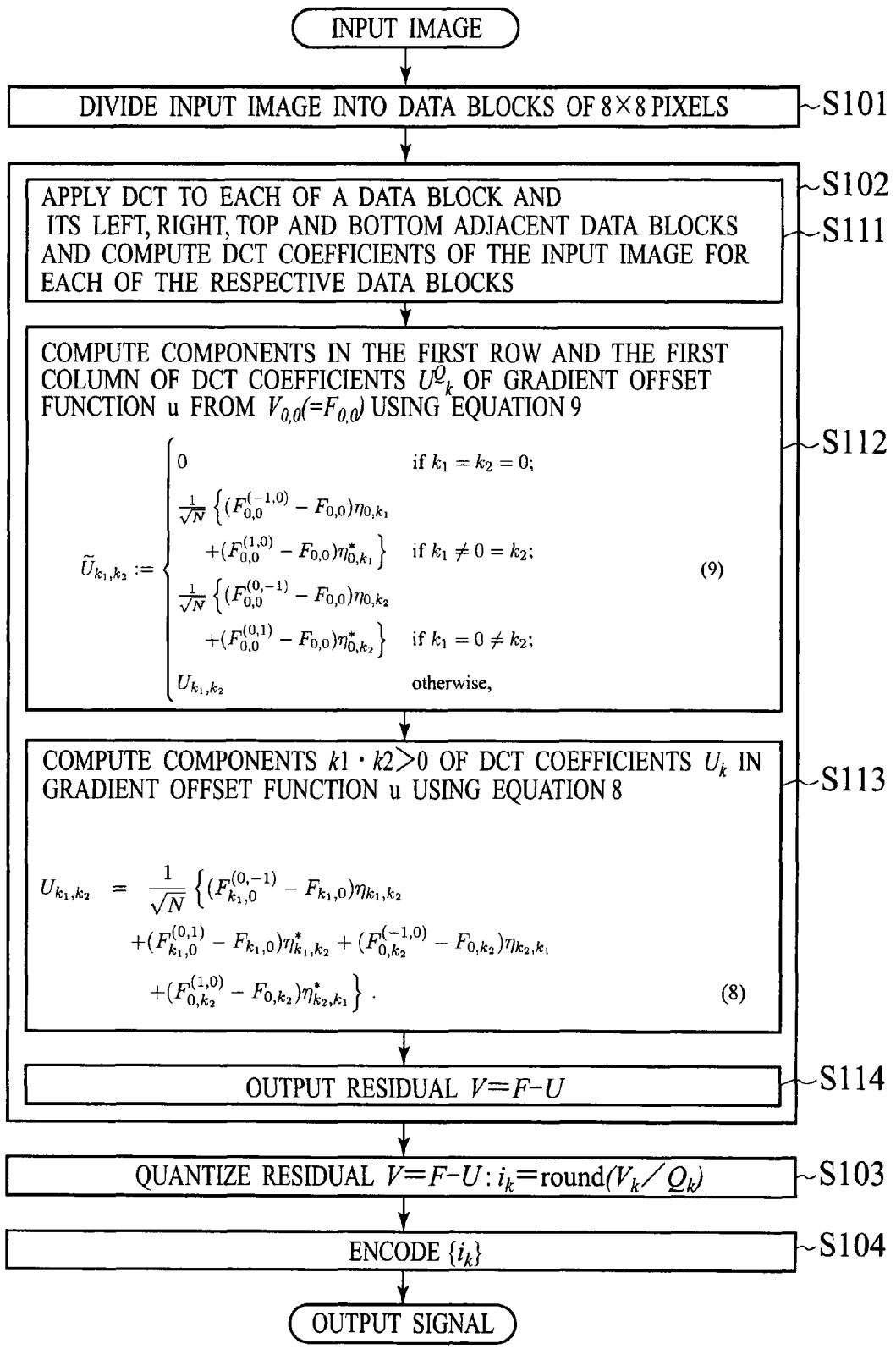
FIG. 8 is a flowchart illustrating a data compression method using the PHLCT circuit in the data compression/decompression system according to the first embodiment of the present invention.

A data compression method using the PHLCT circuit 1 according to the first embodiment of the present invention is described using the flowchart shown in FIG. 8. Note that the data compression method given below is merely an example, and needless to say, implementation is possible by other various methods including this modified example.

(a) In step S101, an input image transferred from the input side frame memory 13 is divided into data blocks, each made up of 8×8 pixels, as shown in FIG. 4 using the block dividing circuit 14 of the encoder 1. Data of the input image divided into data blocks is transferred to the PHLCT circuit 15 of the encoder 1.

Figure 9:
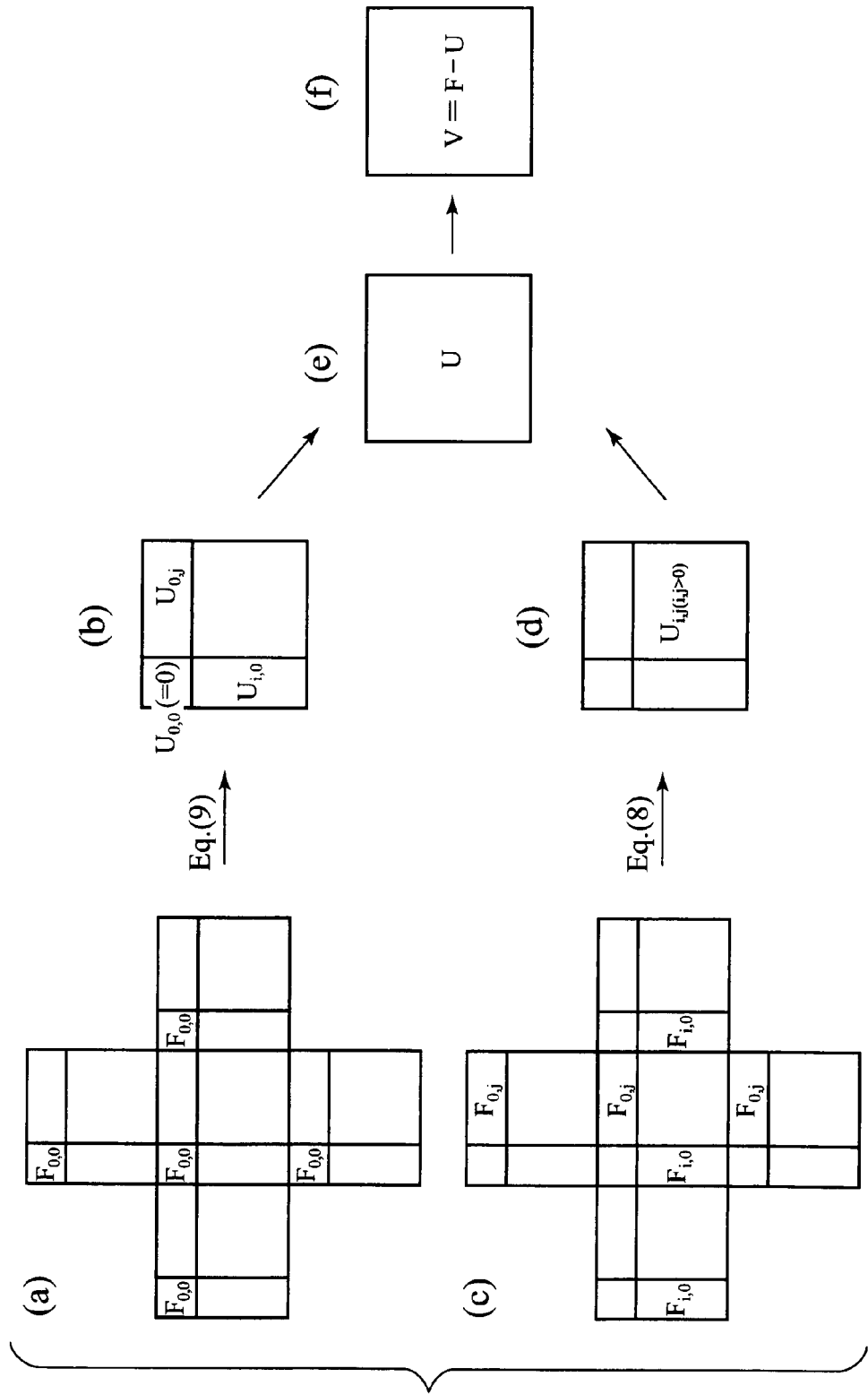
FIGS. 9(a) through 9(f) are schematic diagrams illustrating in detail the data compression method according to the first embodiment of the present invention using five data blocks in correspondence with the flowchart of FIG. 8.

(b) In step S111, the input image DCT coefficient computation module (input signal DCT coefficient computation module) 151 of the PHLCT circuit 15 applies DCT to a subject center data block and each of four data blocks adjacent to the subject center data block on the left, right, top, and bottom, as shown in FIGS. 9(a) and 9(c). This computes an input image DCT coefficients (input signal DCT coefficients) F for the respective data blocks.

Figure 6:
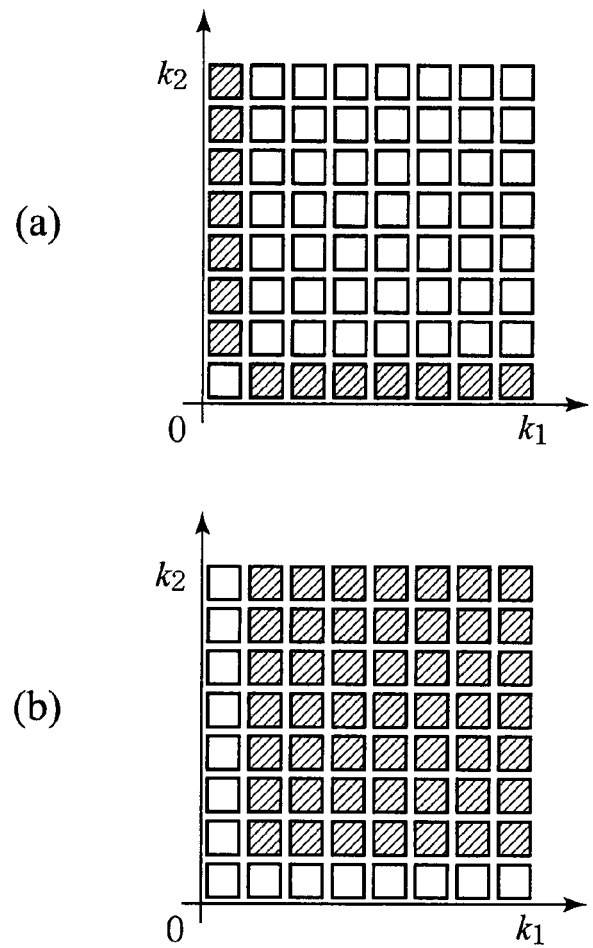
FIG. 6(a) is a diagram illustrating pixels or components in a first row and a first column of the two-dimensional block regions Ω implemented by 8×8 pixels shown in FIG. 3 by hatching slash marks.
FIG. 6(b) is a diagram illustrating pixels or components where $k_1 \cdot k_2 > 0$ in the two-dimensional block regions Ω implemented by 8×8 pixels shown in FIG. 3 by hatching slash marks.
Figure 7:
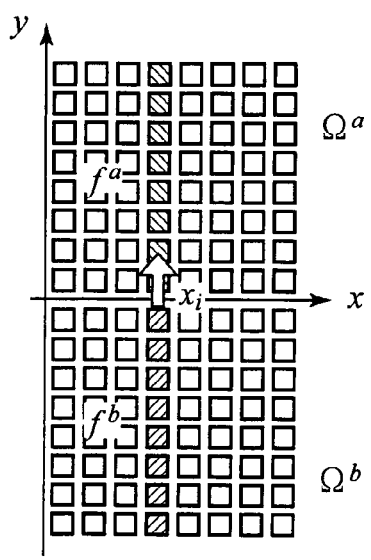
FIG. 7 schematically illustrates how to search for the gradient offset function u(x) in a direction along a coordinate $x_i$ with respect to input signal functions $f^a$ and $f^b$ in each of the adjacent two-dimensional block regions $\Omega^a$ and $\Omega^b$.

(c) In step S112, the first offset function DCT coefficient computation module 152 uses Eq. (9) to compute components in the first row and the first column of DCT coefficients $U_k$ of the gradient offset function u from $V_{0,0}$ (=$F_{0,0}$) as shown in FIG. 9(b) (pixels hatched in FIG. 6(a) correspond to the components in the first row and the first column.)

(d) In step S113, the second offset function DCT coefficient computation module 153 uses Eq. (8) for the input image DCT coefficients (input signal DCT coefficients) F shown in FIG. 9(c) to compute components $k_1-k_2>0$ of the DCT coefficients $U_k$ of the gradient offset function u as shown in FIG. 9(d) (pixels hatched in FIG. 6(b) correspond to the components k1−k2>0.) The components in the first row and the first column shown in FIG. 9(b) and the components $k_1-k_2>0$ shown in FIG. 9(d) can be integrated as shown in FIG. 9(e).

(e) In step S114, the residual computation module 154 computes a residual V=F−U from the DCT coefficients $U_k$ of the gradient offset function u in FIG. 9(e), as shown in FIG. 9(f). The residual V=F−U shown in FIG. 9(f) is supplied to the quantization circuit 16 of the encoder 1.

(f) In step S103, the quantization circuit 16 quantizes the residual V=F−U:

$$i_k = \text{round}(V_k/Q_k)$$

by referencing quantization thresholds $Q_k$ stored in the transmitting side quantization table storage unit 18, and then retrieves resulting integral parts of dividing $V_k$ by $Q_k$ as $\{i_k\}$ in a scanning order called the zigzag scan. $\{i_k\}$ is input to the entropy coding circuit 17 of the encoder 1.

(g) In step S104, the entropy coding circuit 17 encodes $\{i_k\}$ by referencing the Huffman codes stored in the transmitting side Huffman code table storage unit 19. The compressed data in block units generated by the entropy coding circuit 17 is transferred to the transmission channel 32 via the transmitting circuit 31.

While processing in steps S112 and S113 in the flowchart of FIG. 8 are added to the conventional JPEG standard, the rest is perfectly the same processing as the JPEG standard.

The series of data compression processing shown in FIG. 8 may be executed by controlling the encoder 1 shown in FIG. 1 using an equivalent algorithm program to that shown in FIG. 8. This program should be stored in a program storage unit (not shown in the drawing) of a computer system comprising the encoder 1 according to the first embodiment of the present invention. In addition, this program may be stored in a computer readable recording medium. This recording medium may then be read out and stored in the program storage unit of the encoder 1 so that the series of data compression processing according to the present invention can be carried out.

In other words, the data compression program according to the first embodiment of the present invention makes the encoder 1, which divides input data equally into plurality of block regions and compresses the input data, execute a series of instructions, including:

(a) An instruction to compute DCT coefficients F of an input signal in a subject block region and its adjacent block regions in the plurality of block regions, respectively;
(b) An instruction to compute DCT coefficients U of a gradient offset function, which offsets a gradient of the input signal at the block boundary between the subject block region and its adjacent block regions using the DCT coefficients F of the input signal;
(c) An instruction to compute a residual V between the DCT coefficients U of the gradient offset function and the DCT coefficients F of the input signal; and
(d) An instruction to obtain compressed data by quantizing and encoding the residual V.

Here, 'computer readable recording medium' means a medium capable of recording programs such as a computer external memory unit, semiconductor memory, a magnetic disk, an optical disk, a magnet-optical disk, and a magnetic tape. More specifically, a flexible disk, a CD-ROM, an MO disk, and a magnetic tape are included in the 'computer readable recording medium'. For example, the main unit of the encoder 1 may be structured so as to be connected internally or externally to a flexible disk apparatus (flexible disk drive) and an optical disk apparatus (optical disk drive). A flexible disk is loaded into the flexible disk drive, or a CD-ROM into an optical disk drive via a loading slot, and then a predetermined read-out operation is performed, thereby allowing installation of programs stored in these recording media into the program storage unit configuring the encoder 1. Alternatively, connection to a predetermined drive device allows use of a ROM as the memory unit utilized in a game pack or the like, or a cassette tape as the magnetic tape device. Furthermore, this program may be stored in the program storage unit via an information processing network such as the Internet.

<Inverse Polyharmonic Local Cosine Transform (IPHLCT) Circuit>

In the decoder 2, the receiving circuit 33 receives data transferred via the transmission channel 32, and the entropy decoding circuit 21 of the decoder 2 then decodes it. Afterwards, it is dequantized using the quantization table stored in the receiving side quantization table storage unit 29. The inverse PHLCT circuit 23 then subjects a DCT coefficient residual $V_k^Q$, which results from dequantization of the residual V, to inverse DCT (IDCT), resulting in a reconstructed image.

Figure 11:
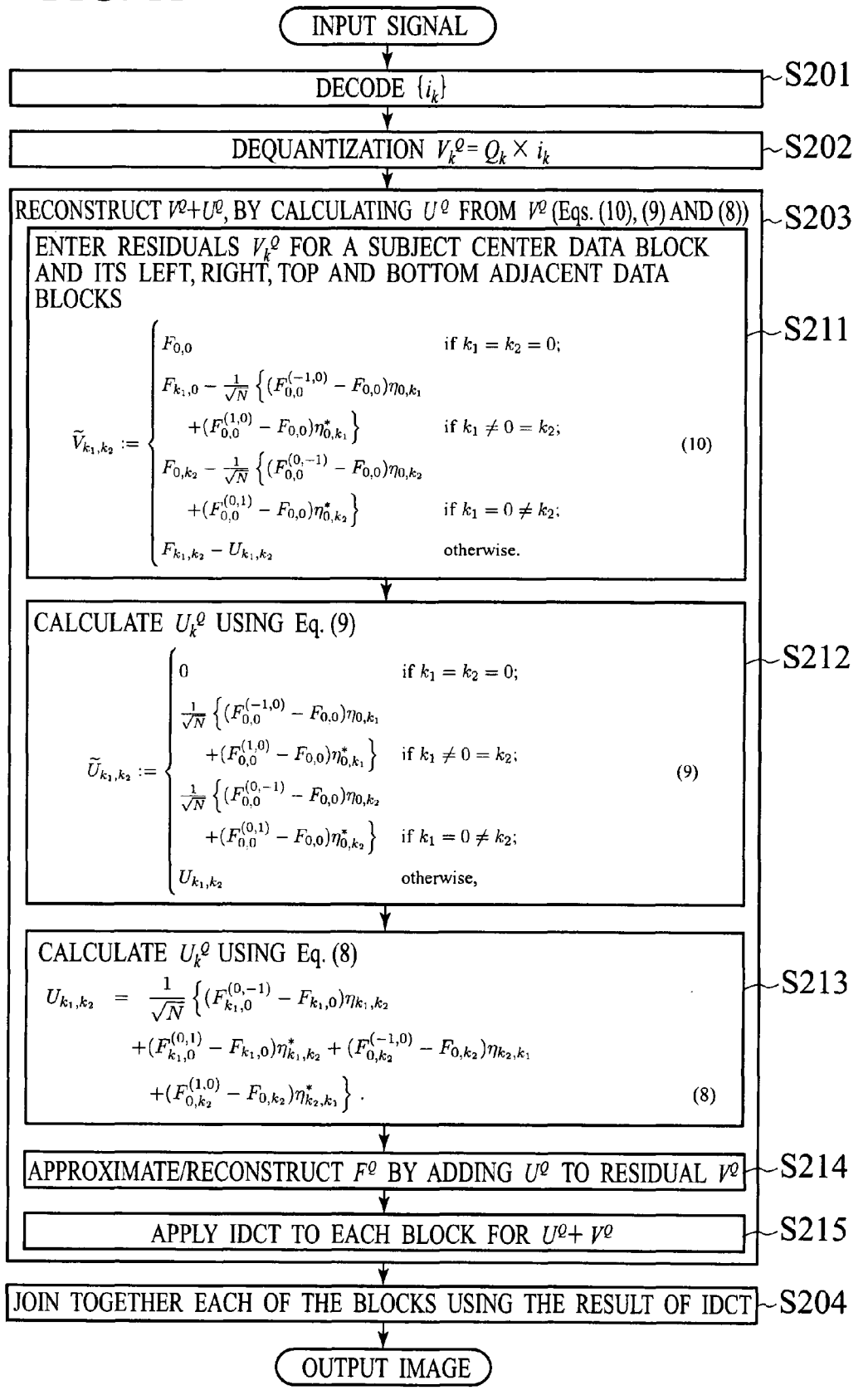
FIG. 11 is a flowchart illustrating a data decompression method using the IPHLCT circuit in the data compression/decompression system according to the first embodiment of the present invention.

A data decompression method using the inverse PHLCT circuit 23 according to the first embodiment of the present invention is described using the flowchart shown in FIG. 11. Note that the data decompression method given below is merely an example, and needless to say, implementation is possible by other various methods including this modified example.

(a) In step S201, the entropy decoding circuit 21 of the decoder 2 converts the compressed data in block units transferred via the receiving circuit 33 to variable length codes by referencing the Huffman codes stored in the receiving side Huffman code table storage unit 28. This generates decoded data in block units.

(b) In step S202, the dequantization circuit 22 of the decoder 2 dequantizes the decoded data in block units generated by the entropy decoding circuit 21 by referencing the quantization thresholds $Q_k$ stored in the transmitting side quantization table storage unit 29:

$$V_k^Q = Q_k \times i_k$$

thereby generating the approximate residual $V_k^Q$ of the residual V=F−U after quantization-dequantization process. The approximate residual $V_k^Q$ of the residual V after quantization-dequantization process is transferred to the residual input module 231 of the inverse PHLCT circuit 23.

Figure 12:
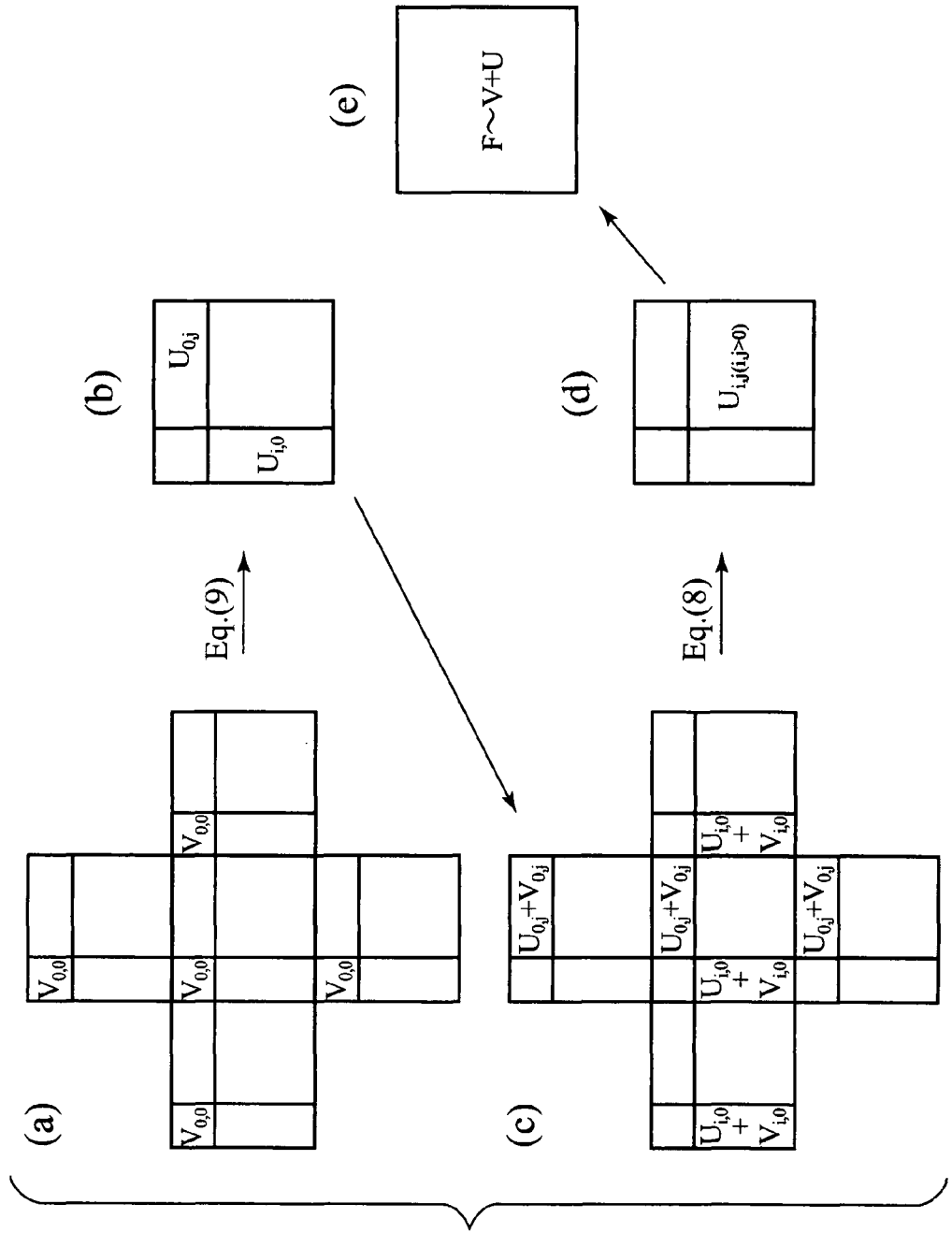
FIGS. 12(a) through 12(e) are schematic diagrams illustrating in detail the data decompression method according to the first embodiment of the present invention using five data blocks in correspondence with the flowchart of FIG. 11.

(c) In step S211, the residual input module 231 of the inverse PHLCT circuit 23 inputs the DCT coefficient residual $V_k^Q$ to a subject center data block and each of four data blocks adjacent to the subject center data block on the left, right, top, and bottom, as shown in FIGS. 12(a) and 12(c).

(d) In step S212, the first offset function DCT coefficient computation module 232 of the inverse PHLCT circuit 23 uses Eq. (9) to compute components in the first row and the first column of DCT coefficients $U_k^Q$ of the gradient offset function u from $V_{0,0}^Q$ (=$F_{0,0}^Q$) as shown in FIG. 12(b).

(e) In step S213, as shown in FIG. 12(c), the second offset function DCT coefficient computation module 233 of the inverse PHLCT 23 adds components in the first row and the first column of $V_k^Q$ to components in the first row and the first column of $U_k^Q$ computed by the first offset function DCT coefficient computation module 232 in step S212, and uses the resulting values as approximation of components in the first row and the first column of the input image DCT coefficients (input signal DCT coefficients) $F^Q$, and then computes components $k_1$–$k_2$>0 of the DCT coefficients $U_k^Q$ of the gradient offset function as shown in FIG. 12(d) using Eq. (8) for the input image DCT coefficients (input signal DCT coefficients) $F^Q$.

(f) In step S214, as shown in FIG. 12(e), the input image DCT coefficient approximation/reconstruction module 234 of the inverse PHLCT circuit 23 adds $U^Q$ to the approximate residual $V^Q$ after quantization-dequantization of the residual V, $$F_Q \approx V^Q + U^Q$$

and approximates and reconstructs it.

(g) Furthermore, in step S215, the input image DCT coefficient approximation/reconstruction module 234 applies IDCT to each block for $U^Q + V^Q$, to reconstruct multivalued image data.

(h) In step S204, the block joining circuit 24 of the decoder 2 joins together each of the blocks as shown in FIG. 3 using the multivalued image data obtained as a result of IDCT. Each frame data joined together by the block joining circuit 24 is transferred to the output side frame memory 25.

While processing in steps S211 through S214 in the flowchart of FIG. 11 are added to the conventional JPEG standard, the rest is perfectly the same processing as the JPEG standard. Increase in computational cost for the original JPEG standard consists in cost mainly regarding U or $U^Q$, and may be evaluated as approximately $3C_1N^2 + 4C_2N^2$ per N×N pixel data block. Here, $C_1$ and $C_2$ are unit costs necessary for addition, subtraction, and integration thereof.

The series of data decompression processing shown in FIG. 11 may be executed by controlling the decoder 2 shown in FIG. 1 using an equivalent algorithm program to that shown in FIG. 11. This program should be stored in a program storage unit (not shown in the drawing) of a computer system comprising the decoder 2 according to the present invention. In addition, this program may be stored in a computer readable recording medium, and read out from this recording medium and then stored in the program storage unit of the decoder 2 so that the series of data decompression processing of the present invention can be carried out.

In other words, the data decompression program according to the first embodiment of the present invention makes the decoder 2, which divides input data equally into a plurality of block regions, decompresses the compressed data, which results from compressing the data input to each block region, and reconstructs the input data, execute a series of instructions including:

(a) An instruction to execute decoding and dequantization of the compressed data, and obtain a dequantized approximate residual $V^Q$ for each block region;

(b) An instruction to compute DCT coefficients $U^Q$ of the gradient offset function, which offsets the gradient of an input signal in the subject block region at the block boundaries between the subject block region and its adjacent block regions, using the dequantized approximate residual $V^Q$;

(c) An instruction to add the DCT coefficients $U^Q$ of the gradient offset function to the dequantized approximate residual $V^Q$, and approximately reconstruct DCT coefficients $F^Q$ of the input signal;

(d) An instruction to obtain an input signal for each block region from the approximately reconstructed DCT coefficients $F^Q$ of the input signal; and (e) An instruction to join together the input signal for each block and reconstruct the input data.

Here, 'computer readable recording medium' means a medium capable of recording programs such as a computer external memory unit, semiconductor memory, a magnetic disk, an optical disk, a magnet-optical disk, and a magnetic tape, as described with the data compression program according to the first embodiment. For example, the main unit of the decoder 2 may be structured so as to be connected internally or externally to a flexible disk apparatus (flexible disk drive) and an optical disk apparatus (optical disk drive). A flexible disk is loaded into the flexible disk drive, or a CD-ROM into an optical disk drive via a loading slot, and then a predetermined read-out operation is performed, thereby allowing installation of programs stored in these recording media into the program storage unit configuring the decoder 2. Furthermore, this program may be stored in the program storage unit via an information processing network such as the Internet.

Second Embodiment

Figure 13:
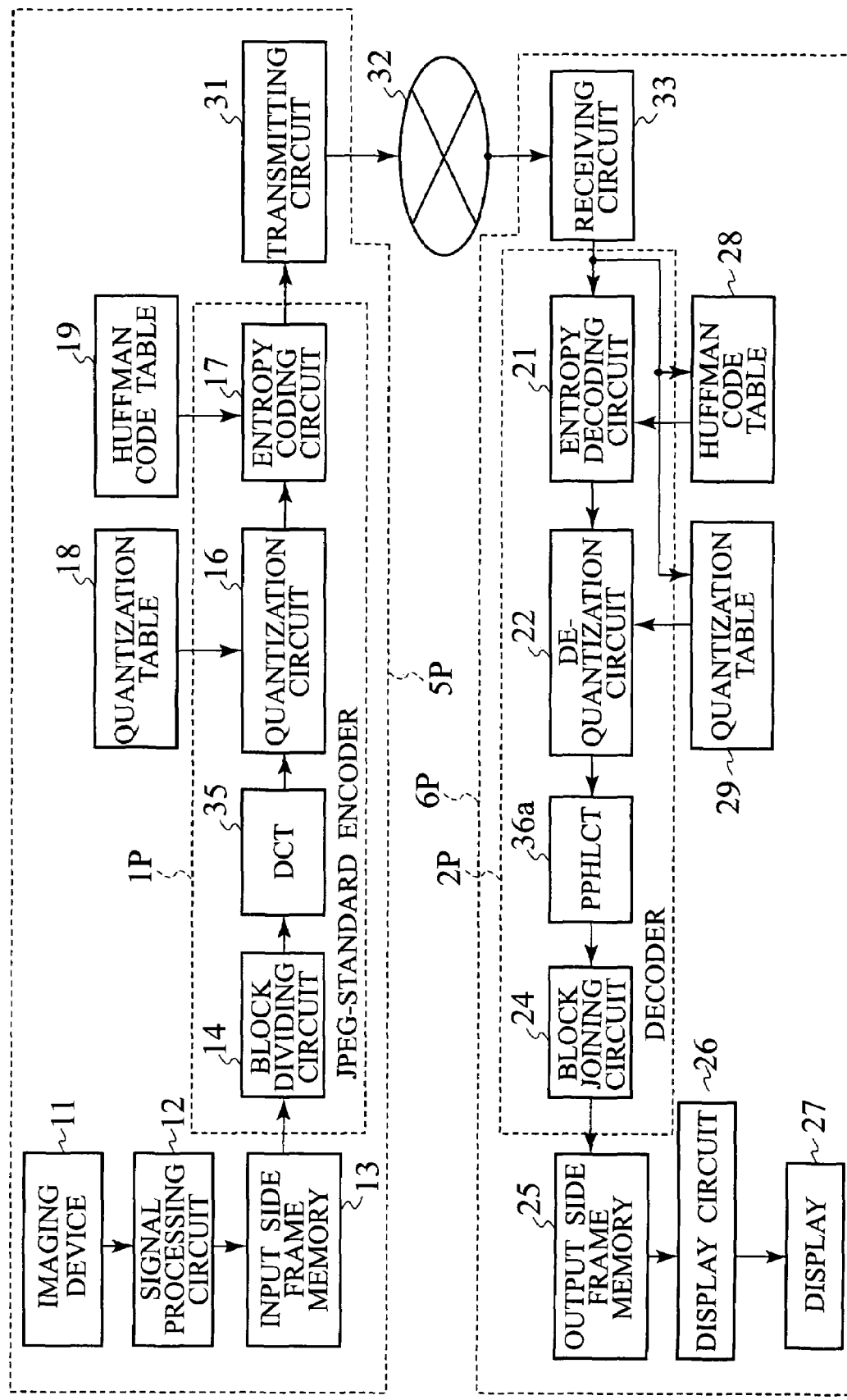
FIG. 13 is a block diagram schematically illustrating a data compression/decompression system according to a second embodiment of the present invention.

A data compression/decompression system according to a second embodiment of the present invention, as with the data compression/decompression system according to the first embodiment, includes a transmitting terminal 5P, a transmission channel 32, which transfers compressed data sent from the transmitting terminal 5P, and a receiving terminal 6P, which receives the compressed data sent from the transmitting terminal 5P via the transmission channel 32, decompresses this compressed data, and then displays the decompressed image data, as shown in FIG. 13.

With the data compression/decompression system according to the second embodiment, a 'partial mode' data compression/decompression system, which implements a method of estimating data lost through quantization by the transmitting terminal 5P transmitting compressed data, which is encoded according to the JPEG standard, to the receiving terminal 6P via the transmission channel 32, and applying inverse polyharmonic local cosine transform to only the receiving terminal 6P, or namely, improving a reconstructed image just by modifying processing on the decoder side. In this specification, opposed to the partial mode data compression/decompression system defined in the second embodiment, the data compression/decompression system according to the first embodiment is in a mode of executing polyharmonic local cosine transform by the encoder 1 of the transmitting terminal 5 and inverse polyharmonic local cosine transform by the decoder 2 of the receiving terminal 6, and is thus defined as a 'full mode compression/decompression system'.

In other words, the transmitting terminal 5P of the partial mode data compression/decompression system according to the second embodiment includes an encoder 1P according to the JPEG standard, an imaging device 11, a signal processing circuit 12, an input side frame memory 13, a transmitting circuit 31, a transmitting side quantization table storage unit 18, and a transmitting side Huffman code table storage unit 19. The encoder 1P according to the JPEG standard differs from the data compression/decompression system according to the first embodiment in that it includes a DCT circuit 35 according to the JPEG standard, a quantization circuit 16, and an entropy coding circuit 17.

On the other hand, the transmitting terminal 6P of the partial mode data compression/decompression system according to the second embodiment includes a decoder 2P, which applies inverse polyharmonic local cosine transform, an output side frame memory 25, a display 27, a display circuit 26, a receiving circuit 33, a receiving side quantization table storage unit 29, and a receiving side Huffman code table storage unit 28. The decoder 2P, which applies inverse polyharmonic local cosine transform, includes an entropy decoding circuit 21, a dequantization circuit 22, a partial mode polyharmonic local cosine transform (PPHLCT) circuit 36a, and a block joining circuit 24.

The imaging device 11, the signal processing circuit 12, and the input side frame memory 13 of the transmitting terminal 5P, and the display circuit 26, the display 27, and the output side frame memory 25 of the receiving terminal 6P can be the same as in the data compression/decompression system according to the first embodiment, and thus duplicate descriptions are omitted.

In FIG. 13, each frame image data read out from the input side frame memory 13 is transferred to the encoder 1P. In the encoder 1P, the block dividing circuit 14 divides the image data of a single frame into a plurality of blocks of 8×8 pixels defined by the JPEG method (see FIG. 4), and the DCT circuit 35 according to the JPEG standard compresses multivalued image data of each block. The quantization circuit 16 quantizes DCT coefficients of an input image F, which is provided from the DCT circuit 35 by referencing quantization thresholds stored in the transmitting side quantization table storage unit 18. Namely, dividing the DCT coefficients by the quantization thresholds shown in Table 2 by the quantization circuit 16 gives quantization coefficients as quotients. The quantization coefficients obtained in this way are retrieved in a scanning order called a zigzag scan, and supplied to the entropy coding circuit 17. The entropy coding circuit 17 converts the DCT coefficients of the input image F quantized by the quantization circuit 16 to variable length codes by referencing Huffman codes stored in the transmitting side Huffman code table storage unit 19, generating compressed data in block units. The compressed data in block units generated by the entropy coding circuit 17 is transferred to the transmission channel 32 via the transmitting circuit 31. The compressed data sent from the transmitting terminal 5P via the transmission channel 32 is received by the receiving circuit 33 of the receiving terminal 6P. The compressed data received via the receiving circuit 33 is transferred to the entropy decoding circuit 21 of the decoder 2P.

Data compression according to the JPEG standard is implemented mainly by discarding high frequency components of the input image DCT coefficients (input signal DCT coefficients) $F_k$ through a quantization operation. As in the discussion of the data compression/decompression system according to the first embodiment, asymptotic behaviors of the input image DCT coefficients (input signal DCT coefficients) $F_k$ and the residual $V_k$ during polyharmonic local cosine transform for a high frequency index k are represented as follows:

[Eq. 18]

$$F_k=O(\|k\|^{-2}), V_k=O(\|k\|^{-4}) \text{ as } \|k\|\to\infty.$$

In other words, with $\|k\|\to\infty$, the input image DCT coefficients (input signal DCT coefficients) $F_k \approx U_k$, allowing estimation of the DCT coefficients $F_k$ in a high frequency band discarded through quantization using a DCT coefficients $U_k$ of a gradient offset function u. In practice, $U_k^Q$, which is computed using quantized $F_k^{(s,t)Q}$, is used instead of $F_k^{(s,t)}$ in Eqs (8) and (9); however, error between $U_k^Q$ and $U_k$ is evaluated by the following equation:

[Eq. 19]

$$|U_k - U_k^Q| \le$$
$$\frac{1}{\sqrt{N}}(2E_{k_1,0}|\eta_{k_1,k_2}| + 2E_{k_1,0}|\eta^*_{k_1,k_2}| + 2E_{0,k_2}|\eta_{k_2,k_1}| + 2E_{0,k_2}|\eta^*_{k_2,k_1}|) =$$
$$\frac{4}{\sqrt{N}}(E_{k_1,0}|\eta_{k_1,k_2}| + E_{0,k_2}|\eta_{k_2,k_1}|)$$

where $E_k$ is an evaluation of the quantization error included in $F_k^{(s,t)Q}$ as follows:

[Eq. 20]

$$\max_{s,t\in\{-1,0,1\}} |F_k^{(s,t)} - F_k^{(s,t)Q}|.$$

Clearly, the error between $U_k^Q$ and $U_k$ is solely dependent on the quantization error included in the components of the first row and the first column of the DCT coefficients $F_k^{(s,t)Q}$. Based on the above-given discussion, the fundamental method of the partial mode data compression/decompression system according to the second embodiment is provided as follows:

[Eq. 21]

$$\text{Replace } F_k^Q \text{ by } F_k^Q + d_k, d_k := \begin{cases} U_k^Q & \text{if } k \in \mathcal{K}_t, \\ 0 & \text{if } k \in \mathcal{K}\setminus\mathcal{K}_t, \end{cases} \quad (12)$$

where

[Eq. 22]

$$\mathcal{K}_t := \{k \in \mathcal{K} \mid F_k^Q = 0 \text{ and } |U_k^Q| < Q_k/2\}.$$

The entropy decoding circuit 21, which accommodates the decoder 2P of the partial mode data compression/decompression system according to the second embodiment, converts the compressed data in block units transferred via the receiving circuit 33 to variable length codes by referencing the Huffman codes stored in the receiving side Huffman code table storage unit 28, thereby generating decoded data in block units. The Huffman codes stored in the receiving side Huffman code table storage unit 28 are variable length codes allocated to the decoded data according to pre-computed occurrence rates, where short ones are allocated to codes with a high occurrence rate. The dequantization circuit 22 dequantizes the decoded data in block units generated by the entropy decoding circuit 21 by referencing the quantization thresholds stored in the transmitting side quantization table storage unit 29, thereby generating the DCT coefficients. The quantization thresholds stored in the receiving side quantization table storage unit 29 determine image quality of the recovered image, which results from decompressing the compressed data.

Figure 14:
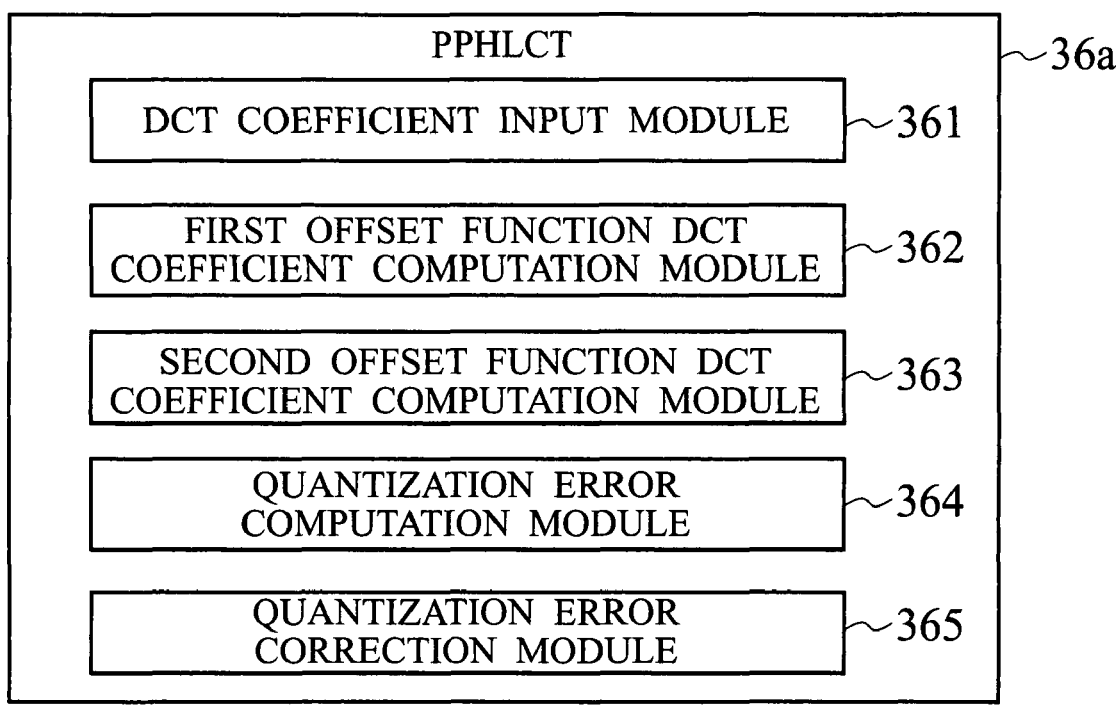
FIG. 14 is a block diagram illustrating a logical configuration of a partial mode PHLCT (PPHLCT) circuit in the data compression/decompression system according to the second embodiment of the present invention.

As shown in FIG. 14, the PPHLCT circuit 36a of the decoder 2 includes a DCT coefficient input module 361, a first offset function DCT coefficient computation module 362, a second offset function DCT coefficient computation module 363, a quantization error computation module 364, and a quantization error correction module 365, and subjects the DCT coefficients generated by the dequantization circuit 22 to inverse polyharmonic local cosine transform (details of the PPHLCT circuit 36a are given later.) The decoded data in block units having been subjected to inverse polyharmonic local cosine transform by the PPHLCT circuit 36a is joined together by the block joining circuit 24, providing each frame data.

Each frame data joined together by the block joining circuit 24 is transferred to the output side frame memory 25. The output side frame memory 25 writes and stores each frame image data transferred from the decoder 2P. The display circuit 26 generates an image signal from each frame image data transferred from the decoder 2P, and then displays that image signal as the subject image on the display 27.

Figure 15:
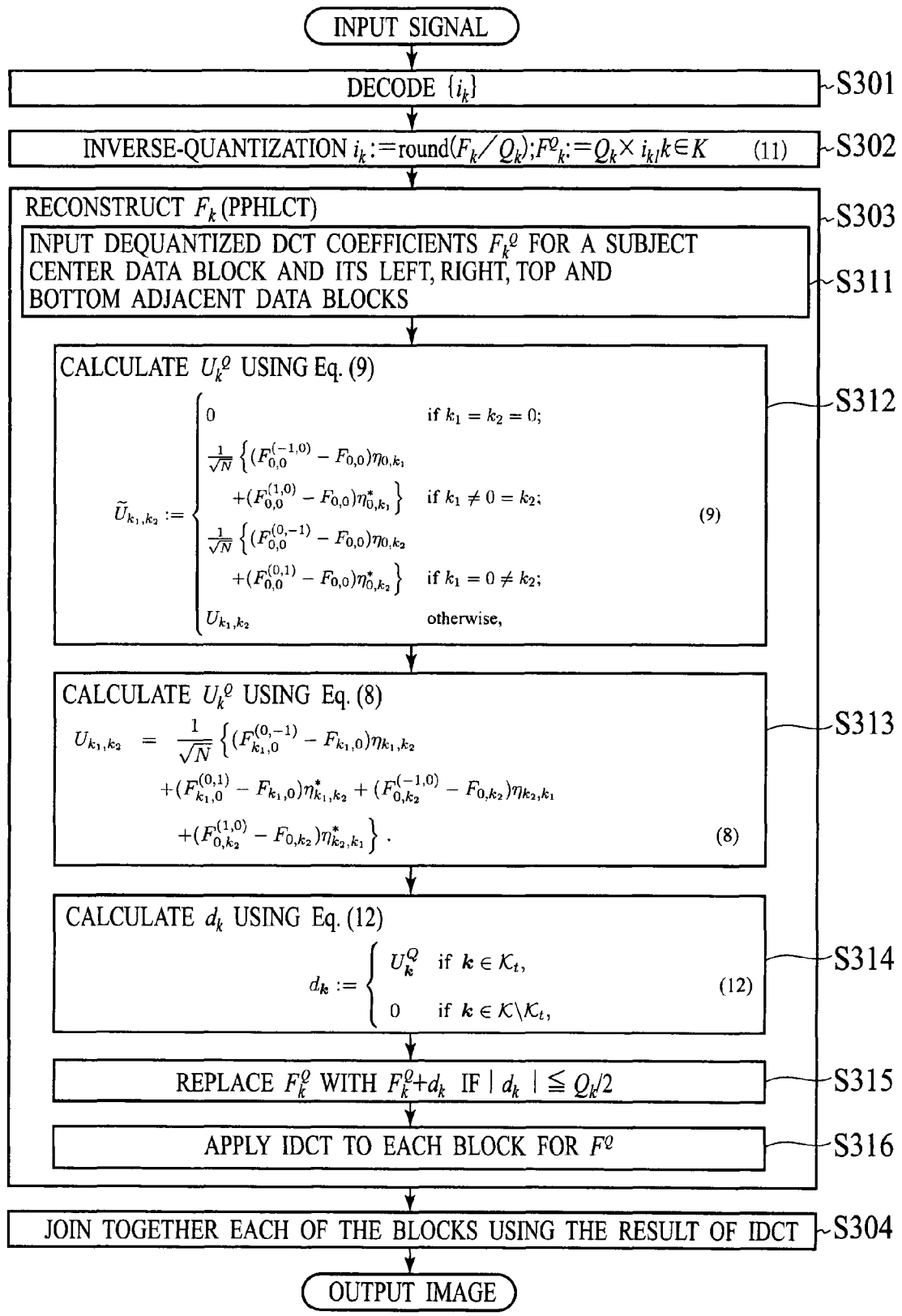
FIG. 15 is a flowchart illustrating a data decompression method using the PPHLCT circuit in the data compression/decompression system according to the second embodiment of the present invention.

A data decompression method using the PPHLCT circuit 36a according to the second embodiment of the present invention is described using the flowchart shown in FIG. 15. Note that the data decompression method given below is merely an example, and needless to say, implementation is possible by other various methods including this modified example.

(a) In step S301, the entropy decoding circuit 21 of the decoder 2P converts the compressed data in block units transferred via the receiving circuit 33 to variable length codes by referencing the Huffman codes stored in the receiving side Huffman code table storage unit 28. This generates decoded data in block units.

(b) In step S302, the dequantization circuit 22 of the decoder 2P dequantizes the decoded data $\{i_k\}$ in block units generated by the entropy decoding circuit 21 by referencing the quantization thresholds $Q_k$ stored in the transmitting side quantization table storage unit 29 indicated in Eq. (11), thereby generating the DCT coefficients $F_k^Q$ after dequantization of the input image. The DCT coefficients $F_k^Q$ after dequantization of the input image are transferred to the DCT coefficient input module 361 of the PPHLCT circuit 36a.

Figure 16:
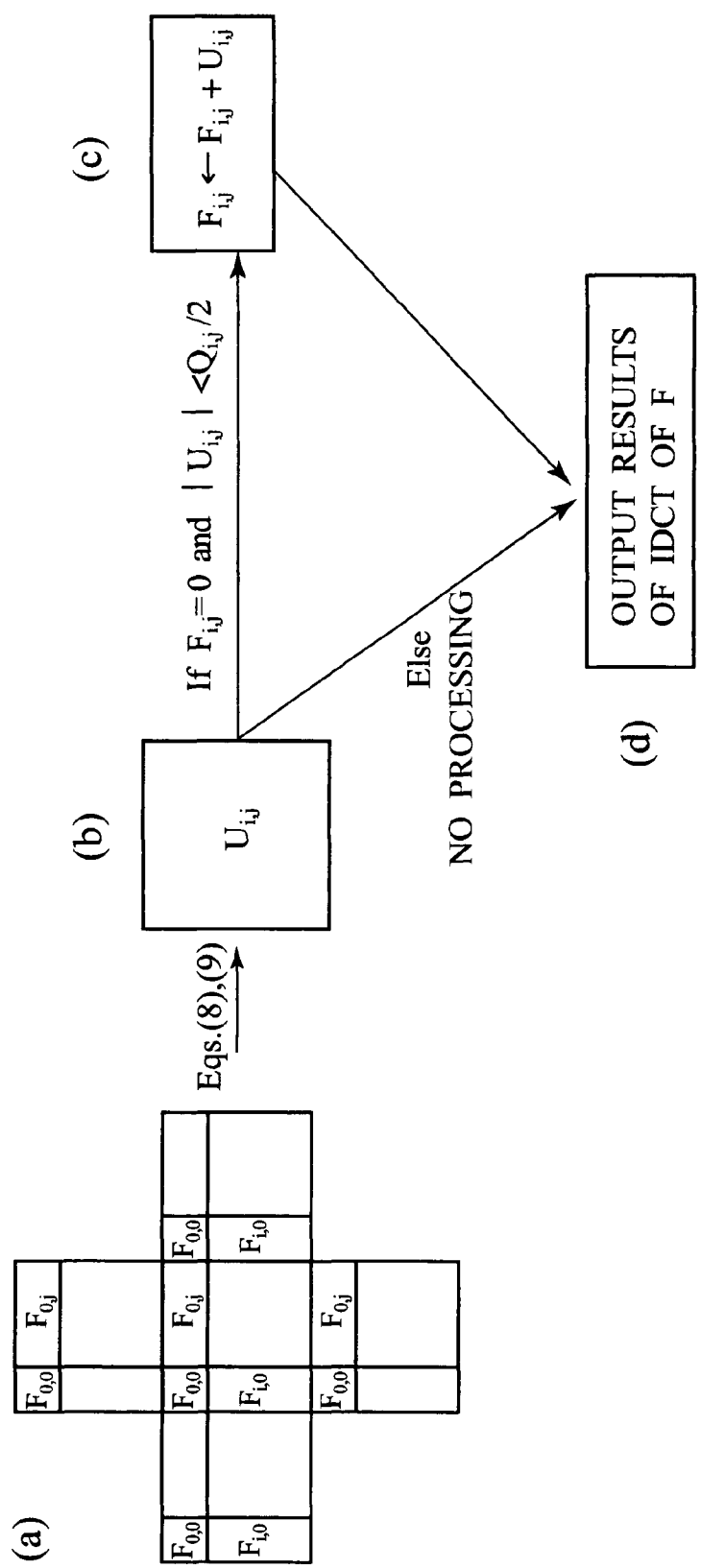
FIGS. 16(a) through 16(d) are schematic diagrams illustrating in detail the data decompression method according to the second embodiment of the present invention using five data blocks in correspondence with the flowchart of FIG. 15.
Figure 17:
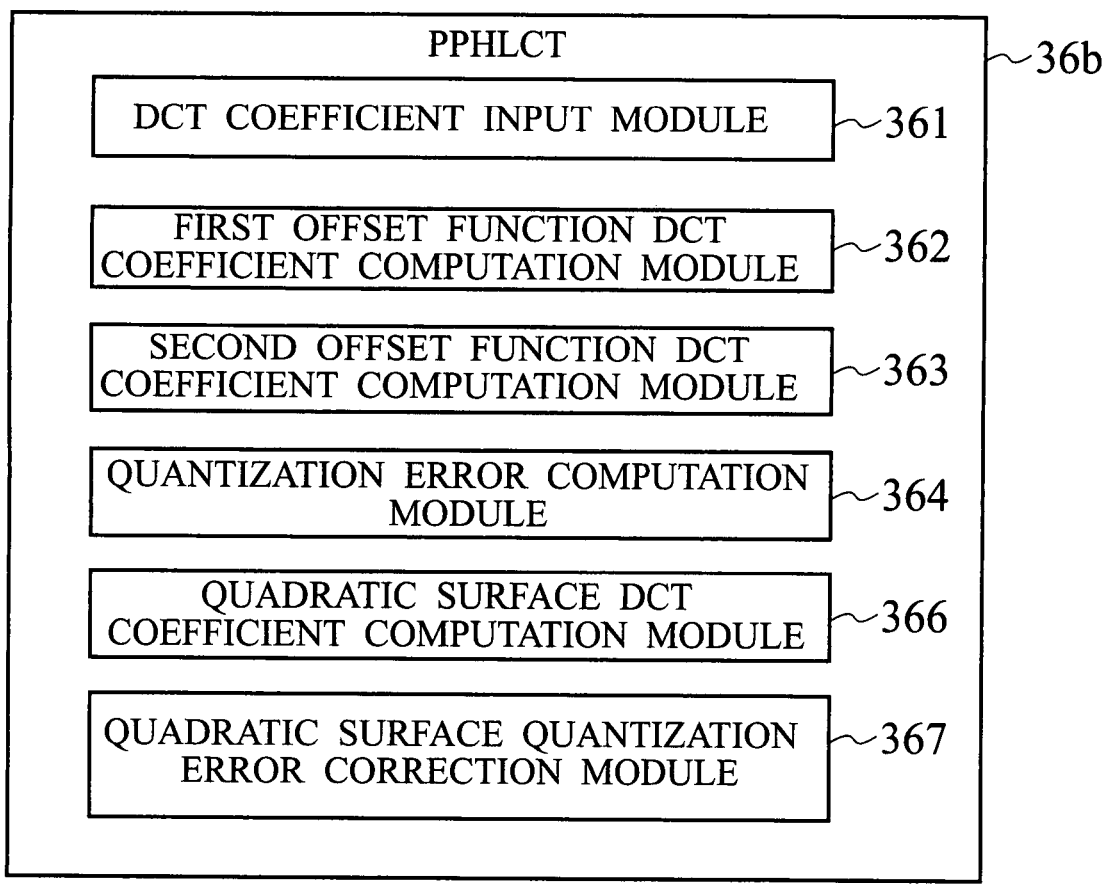
FIG. 17 is a block diagram illustrating a logical configuration of a partial mode PHLCT (PPHLCT) circuit in a data compression/decompression system according to a modified example of the second embodiment of the present invention.

(c) In step S311, the DCT coefficient input module 361 of the PPHLCT circuit 36a inputs the DCT coefficients $F_k^Q$ after subjecting the input image in each subject center data block and each of four data blocks adjacent to the subject center data block on the left, right, top, and bottom to dequantization, as shown in FIG. 16(a).

(d) In step S312, the first offset function DCT coefficient computation module 362 of the PPHLCT circuit 36a uses Eq. (9) to compute components in the first row and the first column of DCT coefficients $U_k^Q$ of the gradient offset function u from $V_{0,0}^Q$ ($=F_{0,0}^Q$).

(e) In step S313, the second offset function DCT coefficient computation module 363 of the PPHLCT circuit 36a uses Eq. (8) for the DCT coefficients $F^Q$ after dequantization of the input image shown in FIG. 16(a) to compute components $k_1-k_2>0$ of the DCT coefficients $U_k^Q$ of the gradient offset function u. In step S313, the computed components $k_1-k_2>0$ and the components in the first row and the first column computed in step S312 are then integrated as shown in FIG. 16(b).

(f) In step S314, the quantization error computation module 364 of the PPHLCT circuit 36a computes a quantization error dk using Eq. (12).

(g) Further, in step S315, the quantization error correction module 365 of the PPHLCT circuit 36a replaces the DCT coefficients $F_k^Q$ after dequantization of the input image with $F_k^Q + d_k$ as shown in FIG. 16(c) if the absolute value of $d_k$ is less than or equal to $Q_k/2$. If the absolute value of $d_k$ is less than $Q_k/2$, then the DCT coefficients $F_k^Q$ after dequantization of the input image are used as they are without any processing.

(h) In this manner, the PPHLCT circuit 36a of the decoder 2 subjects the DCT coefficients $F_k^Q$ after dequantization of the input image in each block to IDCT so as to estimate multivalued image data, and then in step S316, outputs the multivalued image data to the block joining circuit 24 of the decoder 2.

(i) In step S304, the block joining circuit 24 of the decoder 2P joins together each of the blocks as shown in FIG. 3 using the multivalued image data obtained as a result of IDCT. Each frame data joined together by the block joining circuit 24 is transferred to the output side frame memory 25.

Computational cost of the partial mode data compression/decompression system according to the second embodiment, in comparison to the full mode data compression/decompression system described in the first embodiment, includes a cost for computing the quantization error $d_k$. By Eq. (12), the computational cost for the quantization error $d_k$ is cost necessary for repeating comparison processing $3N^2$ times per block.

The series of data decompression processing shown in FIG. 15 may be executed by controlling the decoder 2P shown in FIG. 13 using an equivalent algorithm program to that shown in FIG. 15. This program should be stored in a program storage unit (not shown in the drawing) of a computer system comprising the decoder 2P according to the present invention. In addition, this program may be stored in a computer readable recording medium, and be read out from this recording medium and then stored in the program storage unit of the decoder 2P so that the series of data decompression processing according to the present invention can be carried out.

In other words, the data decompression program according to the second embodiment of the present invention makes the decoder 2P, which divides input data equally into plurality of block regions, decompresses compressed data resulting from compressing data of the input data of each of the block regions, and estimates the input data, execute a series of instructions including:

(a) an instruction to execute decoding and dequantization of the compressed data, and obtain a dequantized DCT coefficients $F^Q$ for each of the respective block regions;

(b) an instruction to compute DCT coefficients $U^Q$ of the gradient offset function, which offsets a gradient of an input signal in the subject block region, at the block boundaries between the subject block region and its adjacent block regions using the dequantized DCT coefficients $F^Q$;

(c) an instruction to compute a quantization error d from the DCT coefficients $U^Q$ of the gradient offset function;

(d) an instruction to correct the dequantized DCT coefficients $F^Q$ using the quantization error d and obtain better approximation of DCT coefficients of the input signals (make an approximate estimation of quantization error for the input signals);

(d) an instruction to recover an input signal for each of the respective block regions from the above-given better approximation of DCT coefficients of the input signals (approximately reconstructed DCT coefficients of the input signal); and (f) an instruction to estimate input data by joining together the input signals in respective block regions.

Here, 'computer readable recording medium' means a medium capable of recording programs such as a computer external memory unit, semiconductor memory, a magnetic disk, an optical disk, a magnet-optical disk, and a magnetic tape, as described with the data compression program according to the first embodiment. For example, the main unit of the decoder 2P may be structured so as to be connected internally or externally to a flexible disk apparatus (flexible disk drive) and an optical disk apparatus (optical disk drive). Furthermore, this program may be stored in the program storage unit via an information processing network such as the Internet.

Modified Example of Second Embodiment

A data compression/decompression system according to a modified example of the second embodiment, as with the data compression/decompression system according to the second embodiment, a 'partial mode' data compression/decompression system, which implements a method of estimating data lost through quantization by the transmitting terminal 5P transmitting compressed data encoded according to the JPEG standard to the receiving terminal 6P via the transmission channel 32, and applying inverse polyharmonic local cosine transform to only the receiving terminal 6P, or namely, improving a reconstructed image just by modifying processing on the decoder side.

As with the data compression/decompression system according to the modified example of the second embodiment, the receiving terminal 6P of the partial mode data compression/decompression system according to the modified example of the second embodiment includes a decoder 2P, which applies inverse polyharmonic local cosine transform, an output side frame memory 25, a display 27, a display circuit 26, a receiving circuit 33, a receiving side quantization table storage unit 29, and a receiving side Huffman code table storage unit 28; however, the decoder 2P, which applies inverse polyharmonic local cosine transform, differs from the data compression/decompression system shown in FIG. 13 in that it has a blocking artifact eliminating function.

'Blocking artifact' is an artifact generated at a block boundary of an image reconstructed through compression particularly at a low coding rate (bit rate), and is very prominent to an observer since it also appears in parts of the original image that should have been smooth. With the data compression/decompression system according to the modified example of the second embodiment, a method of adding a quadratic surface of the following equation to each of data blocks so as to reduce blocking artifact is provided:

[Eq. 23]

$$p(x, y) := (\alpha y - 1)(y - 1)\frac{\delta^{(1)}}{2} - (\alpha(1 - y) - 1)y\frac{\delta^{(2)}}{2} + \quad (13)$$
$$(\alpha x - 1)(x - 1)\frac{\delta^{(3)}}{2} - (\alpha(1 - x) - 1)x\frac{\delta^{(4)}}{2},$$

where
$\alpha = (6N^2)/(2N^2 + 1)$
and $$\delta^{(1)} = \frac{\sqrt{2}}{N} \sum_{k=0}^{N-1} \lambda_k \left( F_{0,k}^{(0,-1)Q} \cos\pi k - F_{0,k}^{Q} \right),$$

$$\delta^{(2)} = \frac{\sqrt{2}}{N} \sum_{k=0}^{N-1} \lambda_k \left( F_{0,k}^{(0,1)Q} - F_{0,k}^{Q} \cos\pi k \right),$$

$$\delta^{(3)} = \frac{\sqrt{2}}{N} \sum_{k=0}^{N-1} \lambda_k \left( F_{k,0}^{(-1,0)Q} - F_{k,0}^{Q} \cos\pi k \right),$$

$$\delta^{(4)} = \frac{\sqrt{2}}{N} \sum_{k=0}^{N-1} \lambda_k \left( F_{k,0}^{(1,0)Q} - F_{k,0}^{Q} \cos\pi k \right).$$

When a quadratic surface p(x,y) is added to adjacent data blocks, blocking artifact may be eliminated because values at the boundaries are averaged. DCT coefficients of the quadratic surface p is

[Eq. 24]

$$P_{k_1,k_2} = \begin{cases} 0 & \text{if } k_1 = k_2 = 0; \\ \sqrt{N} \left( \gamma_{k_1} \delta^{(3)} - \gamma_{k_1}^* \delta^{(4)} \right) & \text{if } k_1 \neq 0 = k_2; \\ \sqrt{N} \left( \gamma_{k_2} \delta^{(1)} - \gamma_{k_2}^* \delta^{(2)} \right) & \text{if } k_1 = 0 \neq k_2; \\ 0 & \text{otherwise,} \end{cases} \quad (14)$$

where $$\gamma_k := \lambda_k \sqrt{\frac{2}{N}} \sum_{i=0}^{N-1} \{(\alpha x_i - 1)(x_i - 1)\}\cos\pi k x_i,$$

$$\gamma_k^* := \lambda_k \sqrt{\frac{2}{N}} \sum_{i=0}^{N-1} \{(\alpha(1 - x_i) - 1)x_i\}\cos\pi k x_i.$$

In other words, the decoder 2P of the data compression/decompression system according to the modified example of the second embodiment includes an entropy decoding circuit 21, a dequantization circuit 22, a PPHLCT circuit 36b, and a block joining circuit 24, as with the data compression/decompression system according to the second embodiment; it, however, differs from the PPHLCT circuit 36 of the data compression/decompression system according to the second embodiment shown in FIG. 14 in that it includes a DCT coefficient input module 361, a first offset function DCT coefficient computation module 362, a second offset function DCT coefficient computation module 363, a quantization error computation module 364, a quadratic surface DCT coefficient computation module 366, and a quadratic surface quantization error correction module 367.

The imaging device 11, the signal processing circuit 12, and the input side frame memory 13 of the transmitting terminal 5P, and the display circuit 26, the display 27, and the output side frame memory 25 of the receiving terminal 6P can be the same as those in the data compression/decompression systems according to the first and the second embodiment, and thus duplicate descriptions are omitted.

Figure 18:
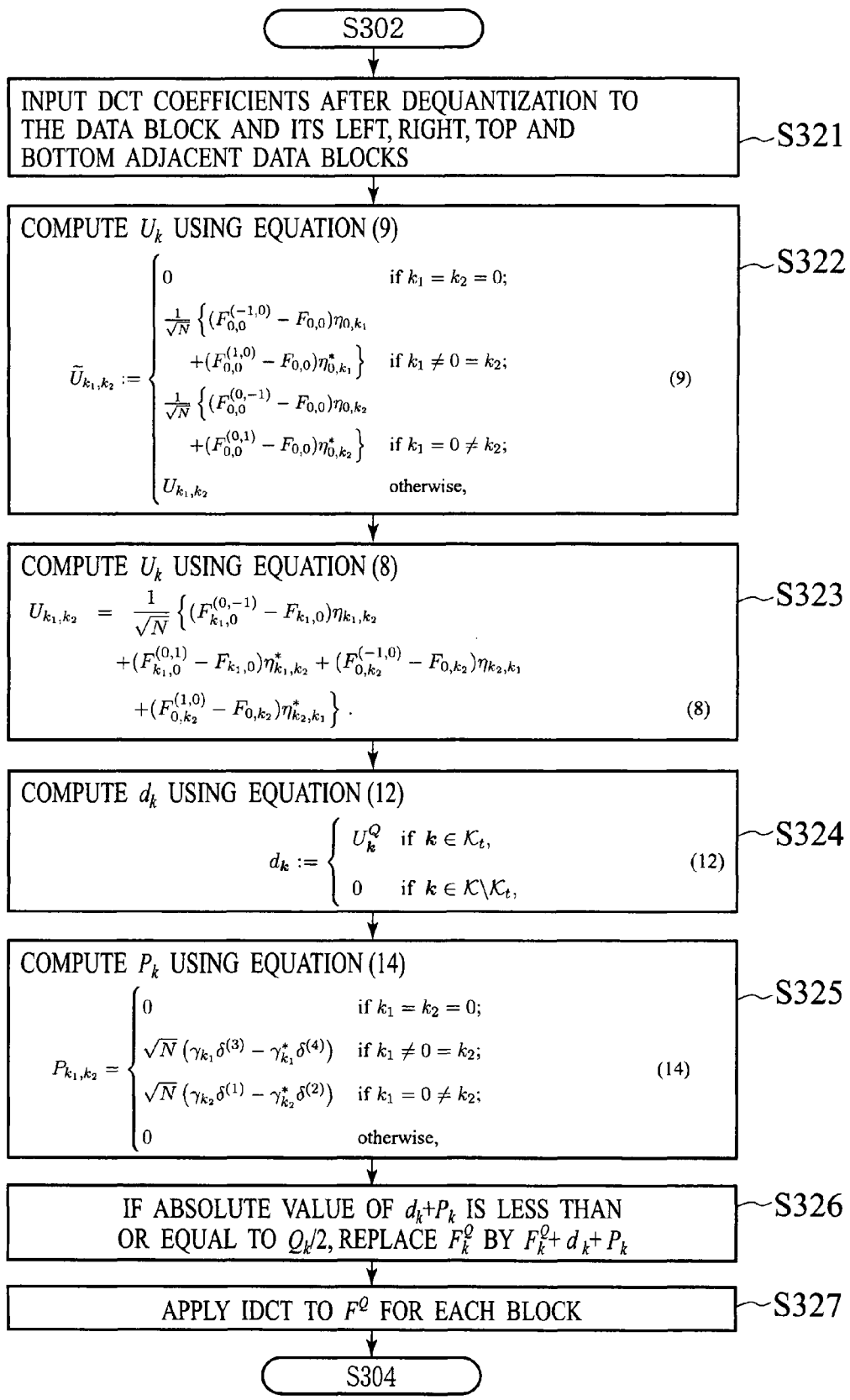
FIG. 18 is a flowchart illustrating a data decompression method using the PPHLCT circuit in the data compression/decompression system according to the modified example of the second embodiment of the present invention.

A data decompression method using the inverse PPHLCT circuit 36b according to the modified example of the second embodiment of the present invention is described using the flowchart shown in FIG. 18. Steps S301 and S302 are the same as those in the flowchart of FIG. 15, and thus duplicate descriptions are omitted. With the modified example of the second embodiment, estimation of DCT coefficients $F_k^Q$ after dequantization of the input image, which corresponds to step S303 in the flowchart shown in FIG. 15, namely processing after step S302 until just before step S304 is described.

Figure 19:
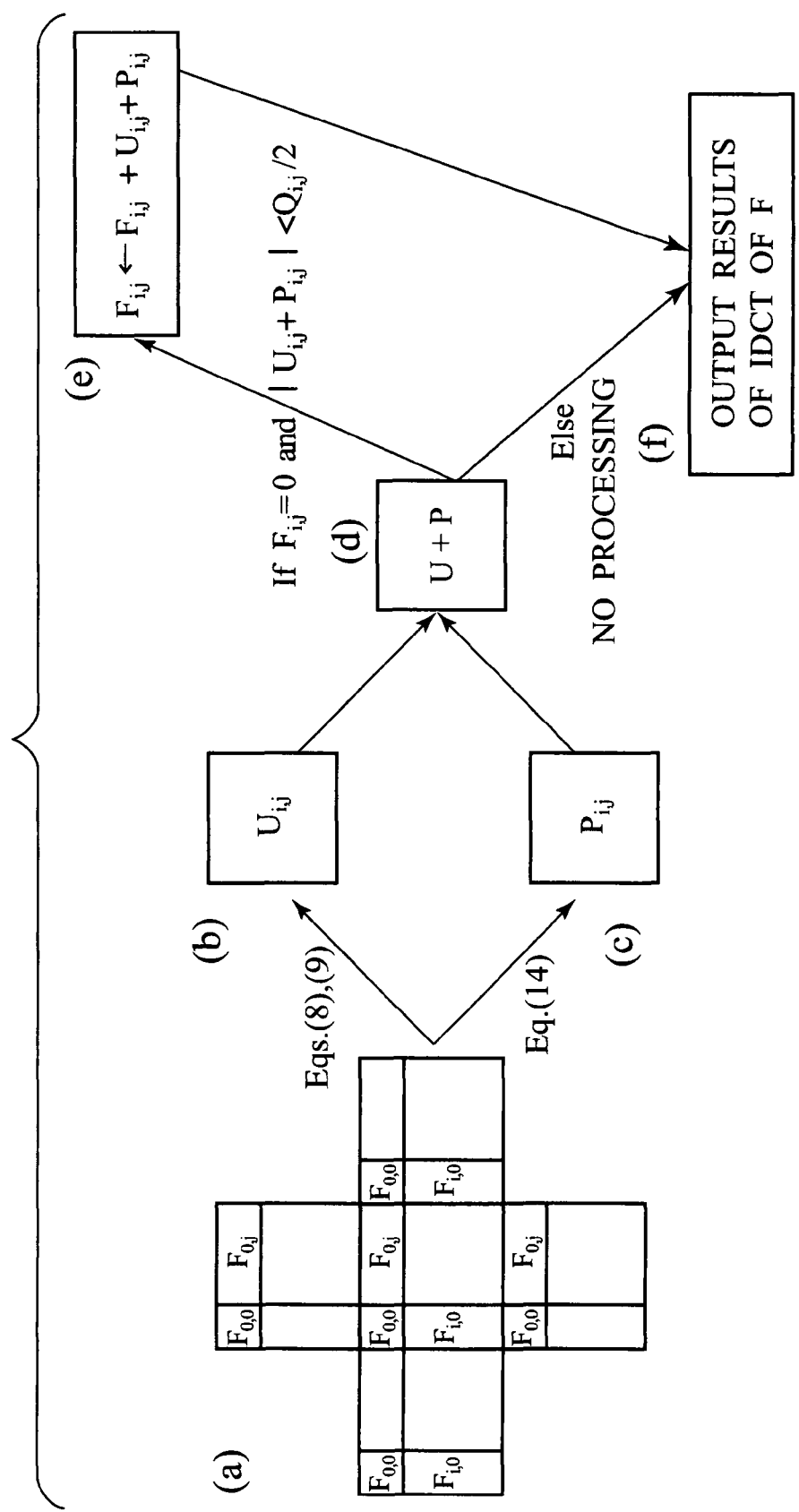
FIGS. 19(a) through 19(f) are schematic diagrams illustrating in detail the data decompression method according to the modified example of the second embodiment of the present invention using five data blocks in correspondence with the flowchart of FIG. 18.

(a) In step S321, the DCT coefficient input module 361 of the PPHLCT circuit 36b according to the modified example of the second embodiment inputs the DCT coefficients $F_k^Q$ after dequantization of the input image to a subject center data block and each of four data blocks adjacent to the subject center data block on the left, right, top, and bottom, as shown in FIG. 19(a).

(b) In step S322, the first offset function DCT coefficient computation module 232 of the PPHLCT circuit 36b uses Eq. (9) to compute components in the first row and the first column of DCT coefficients $U_k^Q$ of the gradient offset function u from $V_{0,0}^Q$ (=$F_{0,0}^Q$).

(c) In step S323, the second offset function DCT coefficient computation module 233 of the PPHLCT circuit 36b uses Eq. (8) for DCT coefficients $F^Q$ after dequantization of the input image shown in FIG. 19(a) so as to compute components $k_1$–$k_2$>0 in the DCT coefficients $U_k^Q$ of the gradient offset function u. In step S323, the computed components $k_1$–$k_2$>0 and the components in the first row and the first column computed in step S322 are then integrated as shown in FIG. 19(b).

(d) In step S324, the quantization error computation module 364 of the PPHLCT circuit 36b computes a quantization error $d_k$ using Eq. (12).

(e) In step S325, the quadratic surface DCT coefficient computation module 366 of the PPHLCT circuit 36b computes the DCT coefficients $P_k$ of the quadratic surface p as shown in FIG. 19(c) using Eq. (14). The quadratic surface DCT coefficient computation module 366 then adds the DCT coefficients $P_k$ of the quadratic surface p to the DCT coefficients $U_k^Q$ of the gradient offset function u, as shown in FIG. 19(d).

(f) Further, in step S326, the quadratic surface quantization error correction module 367 of the PPHLCT circuit 36b replaces the DCT coefficients $F_k^Q$ after dequantization of the input image with $F_k^Q+d_k+P_k$ as shown in FIG. 19(e) if the absolute value of $d_k+P_k$ is less than or equal to $Q_k/2$. If the absolute value of $d_k+P_k$ is less than $Q_k/2$, $U_k^Q+P_k$ can be employed as is without any processing, as shown in FIG. 19(f).

(g) In this manner, the PPHLCT circuit 36b of the decoder 2 applies in each block IDCT to the DCT coefficients $F_k^Q$ after dequantization of the input image to estimate multivalued image data, and then in step S327, outputs the multivalued image data to the block joining circuit 24 of the decoder 2.

The additional cost incurred by the data compression/decompression systems according to modified example of the second embodiment is cost necessary for computation of DCT coefficients $P_k$ of the quadratic surface p, and is evaluated based on O(N) per block.

The series of data decompression processing shown in FIG. 18 may be executed by controlling the decoder 2P shown in FIG. 13 using an equivalent algorithm program to that shown in FIG. 18. This program should be stored in a program storage unit (not shown in the drawing) of a computer system comprising the decoder 2P according to the present invention. In addition, this program may be stored in a computer readable recording medium, and be read out from this recording medium and then stored in the program storage unit of the decoder 2P so that the series of data decompression processing according to the present invention can be carried out.

In other words, the data decompression program according to the modified example of the second embodiment of the present invention makes the decoder 2P, which divides input data equally into plurality of block regions, decompresses compressed data resulting from compressing data of the input data of each of the block regions, and estimates the input data execute a series of instructions including:

(a) an instruction to execute decoding and dequantization of the compressed data, and obtain a dequantized DCT coefficients $F^Q$ for each of the respective block regions;

(b) an instruction to compute DCT coefficients $U^Q$ of the gradient offset function, which offsets a gradient of an input signal in the subject block region, at the block boundaries between the subject block region and its adjacent block regions, from the dequantized DCT coefficients $F^Q$;

(c) an instruction to compute a quantization error d from the DCT coefficients $U^Q$ of the gradient offset function;

(d) an instruction to add a quadratic surface, which reduces blocking artifact, to adjacent block regions, and compute DCT coefficients $P^Q$ of the quadratic surface;

(e) an instruction to correct the dequantized DCT coefficients $F^Q$ using the quantization error d and the DCT coefficients $P^Q$ of the quadratic surface, and obtain better approximation of DCT coefficients of the input signals (make an approximate estimation of quantization error for the input signals);

JPEG standard according to the conventional technology. Quantitative evaluation uses the following two types of measures:

(a) Peak Signal to Noise Ratio (PSNR):

'PSNR' is an error evaluation measure obtained through normalization of a squared error based on a peak value of an input signal, and is defined by the following equation:

[Eq. 25]

$$20\log_{10}(\max_{(x,y)\in \Omega}|f^Q(x,y)|/RMSE),$$

$\Omega$ in the above equation denotes a region representing an entire image, $f^Q$ denotes reconstructed image data, and RMSE (root mean-squared error) denotes a root mean-squared error between the original image and the reconstructed image. The unit is decibel (dB), and the greater the value, the better the results.

(b) Mean Structural Similarity (MSSIM):

'MSSIM' is an error evaluation measure focusing on a geometric structure characteristic to image data, namely one image generally being structured from a limited number of objects, and adding weight to local similarity between an original image and a reconstructed image. The greater the MSSIM value, the better the results, wherein the maximum value thereof is 1. Compared to PSNR, this gives closer results to the visual evaluation.

A luminance quantization table shown in Table 2 most normally used in the JPEG standard is employed as a necessary quantization table during quantization.

TABLE 2

|  | $k_2 = 0$ | $k_2 = 1$ | $k_2 = 2$ | $k_2 = 3$ | $k_2 = 4$ | $k_2 = 5$ | $k_2 = 6$ | $k_2 = 7$ |
| --- | --- | --- | --- | --- | --- | --- | --- | --- |
| $k_1 = 0$ | 16 | 11 | 10 | 16 | 24 | 40 | 51 | 61 |
| $k_1 = 1$ | 12 | 12 | 14 | 19 | 26 | 58 | 60 | 55 |
| $k_1 = 2$ | 14 | 13 | 16 | 24 | 40 | 57 | 69 | 56 |
| $k_1 = 3$ | 14 | 17 | 22 | 29 | 51 | 87 | 80 | 62 |
| $k_1 = 4$ | 18 | 22 | 37 | 56 | 68 | 109 | 103 | 77 |
| $k_1 = 5$ | 24 | 35 | 55 | 64 | 81 | 104 | 113 | 92 |
| $k_1 = 6$ | 49 | 64 | 78 | 87 | 103 | 121 | 120 | 101 |
| $k_1 = 7$ | 72 | 92 | 95 | 98 | 112 | 100 | 103 | 99 |

(f) an instruction to recover an input signal for each of the respective block regions from the above-given better approximation of DCT coefficients of the input signals (DCT coefficients of the approximately estimated input signals); and (g) an instruction to estimate input data by joining together the input signal for each of the respective block regions.

Here, 'computer readable recording medium' means a medium capable of recording programs such as a computer external memory unit, semiconductor memory, a magnetic disk, an optical disk, a magnet-optical disk, and a magnetic tape, as described with the data compression program according to the first embodiment.

The performance of the data compression/decompression system according to the first embodiment using full mode polyharmonic local cosine transform (PHLCT) and the data compression/decompression system according to the modified example of the second embodiment using partial mode polyharmonic local cosine transform (PPHLCT) having a blocking artifact eliminating function are evaluated through both quantitative and visual comparison to the performance of the data compression/decompression system based on the Furthermore, the Huffman coding algorithm is employed as the coding algorithm. The Lenna image shown in FIG. 20(a) and Barbara image shown in FIG. 20(b) are used as test original images. Lenna and Barbara are the original images generally used for performance evaluation of the image processing system.

FIG. 21(a) is a graph where abscissa represents coding rate (bit rate) while ordinate represents values of MSSIM for the original Lenna image, comparing the performance of the conventional technology (DCT) to those of the first embodiment (PHLCT) and the modified example of the second embodiment (PPHLCT). In FIG. 21(a) 'PHLCT' represents the performance of the data compression/decompression system according to the first embodiment, 'PPHLCT' represents the performance of the data compression/decompression system according to the modified example of the second embodiment, and 'DCT' represents the performance of the JPEG standard data compression/decompression system according to the conventional technology. This notation is the same as those in FIGS. 21(b), 22(a), 22(b), 23(a), and 23(b).

FIG. 21(b) is a graph where abscissa represents coding rate and ordinate represents the values of PSNR when using the original Lenna image, comparing the performance of the conventional technology (DCT) to those of the first embodiment (PHLCT) and the modified example of the second embodiment (PPHLCT). FIGS. 21(a) and 21(b) quantitatively evaluate the precision of the reconstructed image at the same coding rate for the original Lenna image using the first embodiment (PHLCT), the modified example of the second embodiment (PPHLCT) and the conventional technology (DCT).

FIG. 22(a) is a graph where abscissa represents coding rate (bit rate) while ordinate represents the values of MSSIM when using the original Barbara image, comparing the performance of the conventional technology (DCT) to those of the first embodiment (PHLCT) and the modified example of the second embodiment (PPHLCT). FIG. 22(b) is a graph where abscissa represents coding rate while ordinate represents the values of PSNR when using the original Barbara image, comparing the performance the conventional technology (DCT) to those of the first embodiment (PHLCT) and the modified example of the second embodiment (PPHLCT). FIGS. 22(a) and 22(b) quantitatively evaluate the precision of the reconstructed image at the same coding rate for the original Barbara image using the first embodiment (PHLCT), the modified example of the second embodiment (PPHLCT) and the conventional technology (DCT).

The following two points are read from results of FIGS. 21(a), 21(b), 22(a), and 22(b):
(a) Improvements in MSSIM and PSNR in the case of applying PHLCT are seen from the JPEG standard data compression/decompression system according to the conventional technology; and
(b) While there is hardly any improvement in the values of PSNR by applying PPHLCT from the JPEG standard data compression/decompression system according to the conventional technology, improvement in MSSIM is seen at the low coding rate from the JPEG standard data compression/decompression system according to the conventional technology.

FIG. 23(a) is a graph where abscissa represents the values of PSNR while ordinate represents the reduction rate of coding rate (compression rate) for DCT (JPEG standard) when using the original Lenna image, comparing the performance of the conventional technology (DCT) to those of the first embodiment (PHLCT) and the modified example of the second embodiment (PPHLCT). FIG. 23(b) is a graph where abscissa represents the values of PSNR while ordinate represents the reduction rate of coding rate (compression rate) for DCT (JPEG standard) when using the original Barbara image, comparing the performance of the conventional technology (DCT) to those of the first embodiment (PHLCT) and the modified example of the second embodiment (PPHLCT).

FIGS. 23(a) and 23(b) are diagrams showing the necessary coding rate (compression rate) in order for the reconstructed image to have equivalent precision in terms of PSNR in the case of using the first embodiment (PHLCT) and the modified example of the second embodiment (PPHLCT), as compared to the conventional technology (DCT). The higher the reduction rate, that much more data is saved. Units are displayed by percentage.

Figure 24:
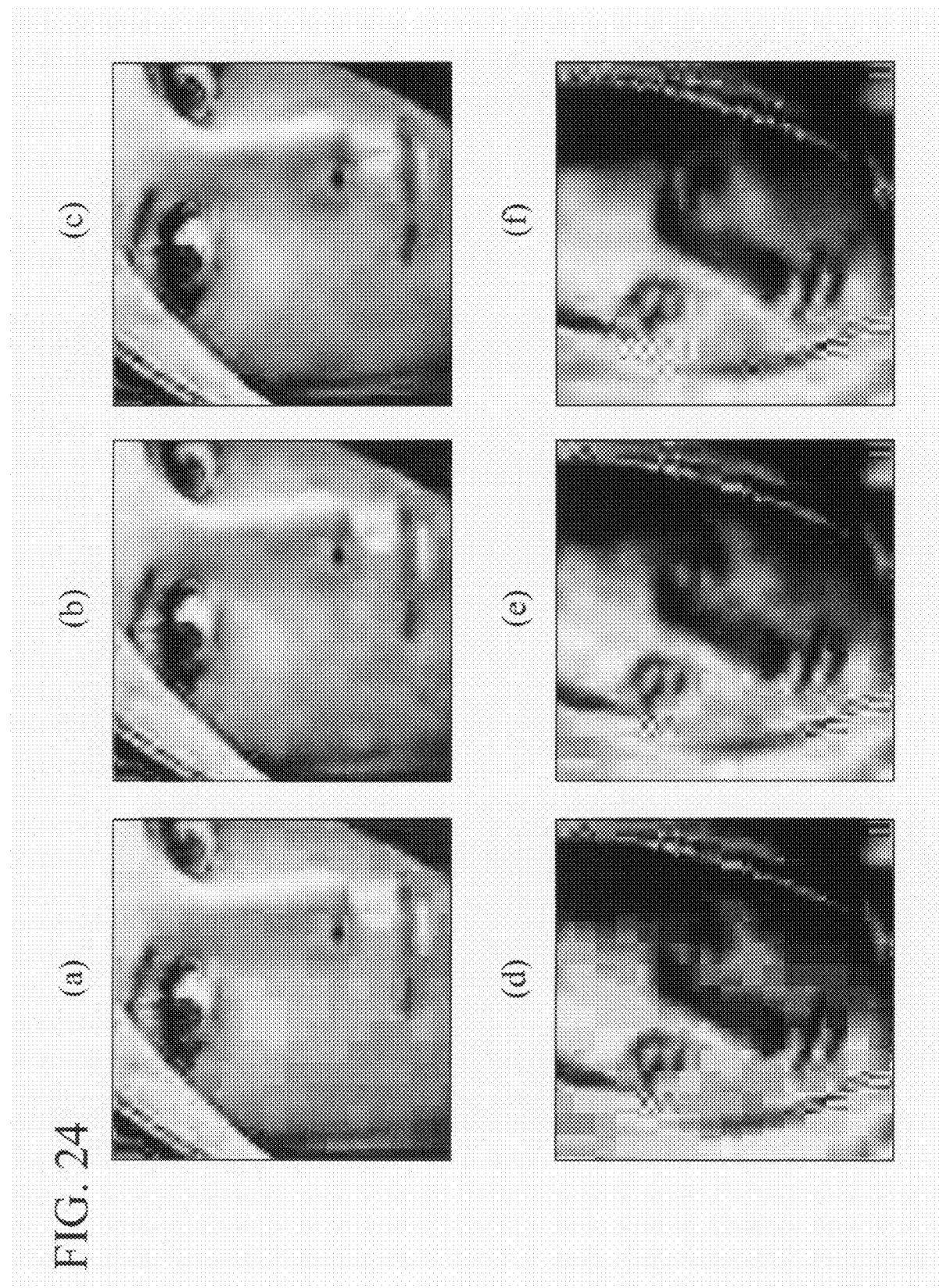
FIG. 24 shows examples of reconstructed images at a coding rate (compression rate) of 0.15 bpp.

Furthermore, reconstructed images at a coding rate (compression rate) of 0.15 bpp are given in FIGS. 24(a) through 24(f) for visual evaluation. FIG. 24(a) shows a reconstructed image at a PSNR of 28.70 dB when DCT based on the JPEG standard according to the conventional technology is applied, FIG. 24(b) shows a reconstructed image at a PSNR of 28.89 dB when the modified example of the second embodiment (PPHLCT) is applied, and FIG. 24(c) shows a reconstructed image at a PSNR of 29.50 dB when the first embodiment (PHLCT) is applied, in the case of the original Lenna image.

FIG. 24(d) shows a reconstructed image at a PSNR of 23.58 dB when the conventional DCT (based on the JPEG standard) is applied, FIG. 24(e) shows a reconstructed image at a PSNR of 23.70 dB when the modified example of the second embodiment (PPHLCT) is applied, and FIG. 24(f) shows a reconstructed image at a PSNR of 24.01 dB when the first embodiment (PHLCT) is applied, in the case of the original Barbara image.

FIGS. 24(a) through 24(f) are obtained by compressing the entire images of Lenna shown in FIG. 20(a) and Barbara shown in FIG. 20(b) at 0.15 bpp; however, in FIGS. 24(a) through 24(f), for visual comparison purposes, only a region of the image surrounding the face which most grabs the observer's attention is extracted and displayed instead of the entire image. Reduction in blocking artifact is clear, and effective results for the data compression/decompression systems according to the first and the second embodiment with respect to the JPEG standard data compression/decompression system according to the conventional technology can be confirmed even for visual evaluation.

Furthermore, reconstructed images at a coding rate (compression rate) of 0.3 bpp are given in FIGS. 25(a) through 25(f) for the same visual evaluation. FIG. 25(a) shows a reconstructed image at a PSNR of 32.22 dB when DCT based on the JPEG standard according to the conventional technology is applied, FIG. 25(b) shows a reconstructed image at a PSNR of 32.36 dB when the modified example of the second embodiment (PPHLCT) is applied, and FIG. 25(c) shows a reconstructed image at a PSNR of 32.801 dB when the first embodiment (PHLCT) is applied, in the case of the original Lenna image.

On the other hand, FIG. 25(d) shows a reconstructed image at a PSNR of 25.66 dB when the conventional DCT (based on the JPEG standard) is applied, FIG. 25(e) shows a reconstructed image at a PSNR of 25.70 dB when the modified example of the second embodiment (PPHLCT) is applied, and FIG. 25(f) shows a reconstructed image at a PSNR of 26.06 dB when the first embodiment (PHLCT) is applied, in the case of the original Barbara image.

FIGS. 25(a) through 25(f) are obtained by compressing the entire images of Lenna shown in FIG. 20(a) and Barbara shown in FIG. 20(b) at 0.3 bpp; however, in FIGS. 25(a) through 25(f), for visual comparison purposes, only a region of the image surrounding the face which most grabs the observer's attention is extracted and displayed instead of the entire image. Reduction in blocking artifact is clear, and effective results for the data compression/decompression systems according to the first and the second embodiment with respect to the JPEG standard data compression/decompression system according to the conventional technology can be confirmed even for visual evaluation.

Third Embodiment

A method for improving an image compression effect using a solution to Poisson's equation with the gradient of an original image at a block boundary used as a boundary condition has been described with the data compression/decompression systems according to the first and the second embodiment. With the data compression/decompression system and method according to the first and the second embodiment, computational costs were low, and the algorithms used there were comparatively simple due to use of approximate solutions to Poisson's equation under boundary conditions determined from only the components in the first row and first column of the DCT coefficients.

On the other hand, a data compression/decompression system according to a third embodiment provides a data compression/decompression method using derivative matching local cosine transform (DMLCT), which utilizes components of a higher order in addition to the components in the first row and first column. While computational cost increases and algorithms become complicated in comparison to the cases when only using the components in the first row and the first column, it is confirmed by numerical experiments that better compression effect can be attained.

Figure 26:
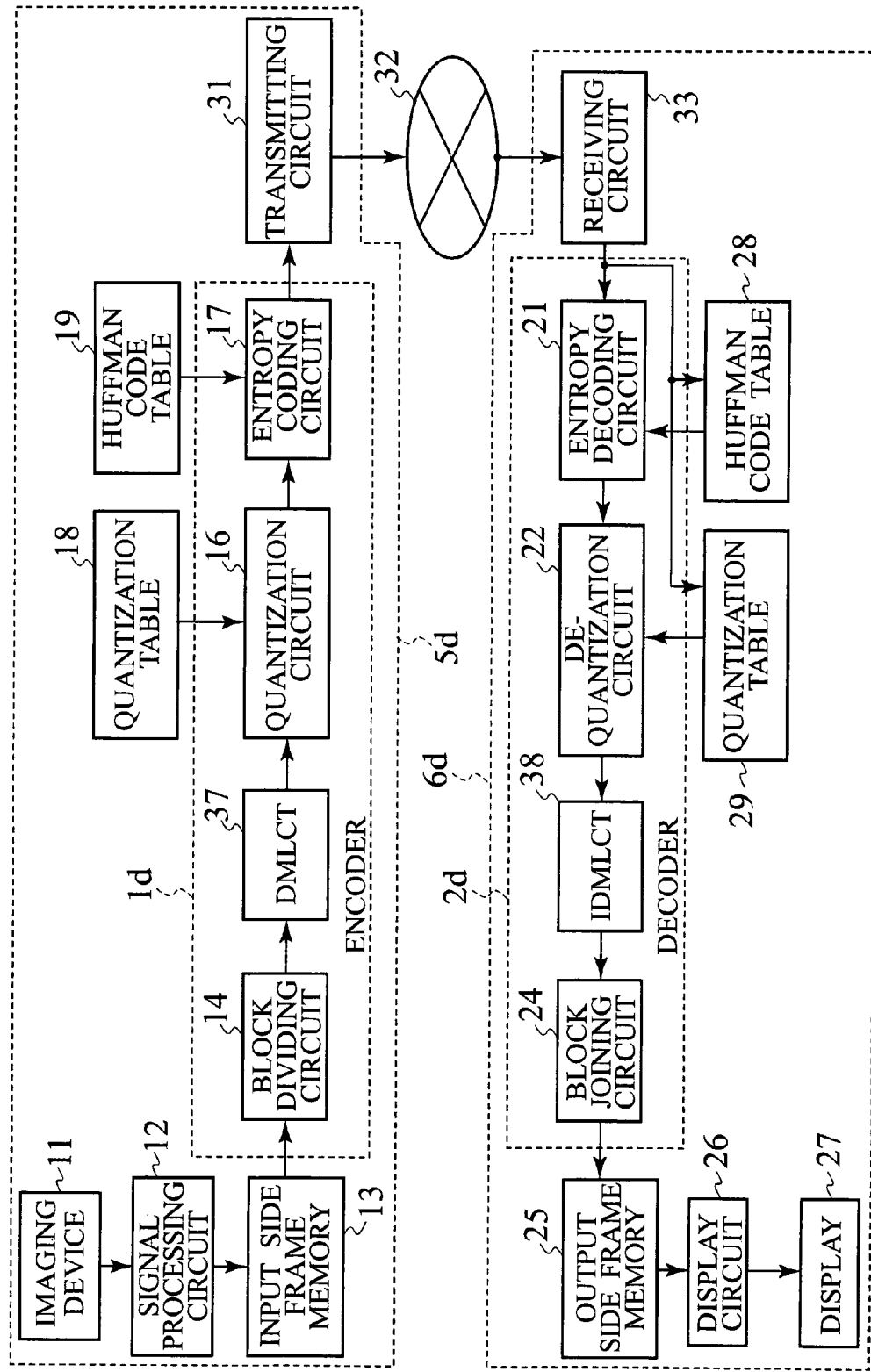
FIG. 26 is a block diagram schematically illustrating a data compression/decompression system according to a third embodiment of the present invention.

In other words, as shown in FIG. 26, the data compression/decompression system according to the third embodiment of the present invention has a basic structure including a transmitting terminal 5d, a transmission channel 32, which transmits compressed data sent from the transmitting terminal 5d, and a receiving terminal 6d, which receives the compressed data sent from the transmitting terminal 5d via the transmission channel 32, decompresses this compressed data, and then displays the decompressed image data, which is the same as with the data compression/decompression system according to the first embodiment.

The transmitting terminal 5d differs from the data compression/decompression system according to the first embodiment in that it includes an encoder 1d, which uses derivative matching local cosine transform (DMLCT), an imaging device 11, a signal processing circuit 12, an input side frame memory 13, a transmitting circuit 31, a transmitting side quantization table storage unit 18, and a transmitting side Huffman code table storage unit 19. The encoder 1d using the DMLCT includes a block dividing circuit 14, a DMLCT circuit 37, a quantization circuit 16, and an entropy coding circuit 17.

The receiving terminal 6d differs from the data compression/decompression system according to the first embodiment in that it includes a decoder 2d, which uses inverse derivative matching local cosine transform (IDMLCT), an output side frame memory 25, a display 27, a display circuit 26, a receiving circuit 33, a receiving side quantization table storage unit 29, and a receiving side Huffman code table storage unit 28. The decoder 2d using the IDMLCT includes an entropy decoding circuit 21, a dequantization circuit 22, an IDMLCT circuit 38, and a block joining circuit 24.

The imaging device 11, the signal processing circuit 12, and the input side frame memory 13 of the transmitting terminal 5d, and the display circuit 26, the display 27, and the output side frame memory 25 of the receiving terminal 6d can be the same as those in the data compression/decompression systems according to the first and the second embodiment, and thus duplicate descriptions are omitted.

In FIG. 26, each frame image data read out from the input side frame memory 13 is transferred to the encoder 1d. In the encoder 1d, the block dividing circuit 14 divides the image data of a single frame to a plurality of blocks of 8×8 pixels defined by the JPEG method (see FIG. 4), and the DMLCT circuit 37 compresses multivalued image data of each of the blocks. In other words, the DMLCT circuit 37 includes a one-dimensional DMLCT computation module 371, and a tensor product computation module 372. The one-dimensional DMLCT computation module 371 includes an input image DCT coefficient computation module (input signal DCT coefficient computation module) 711, an upper bound setting module 712, a first residual computation module 713, and a second residual computation module 714. The DMLCT circuit 37 captures image data of a single frame block by block as shown in FIG. 3 from the block dividing circuit 14, and executes derivative matching local cosine transform (DMLCT) on that image data (details of the DMLCT circuit 37 are given later.)

The quantization circuit 16 quantizes DCT coefficients of a residual V=F−U, which is provided from the DMLCT circuit 37, by referencing quantization thresholds stored in the transmitting side quantization table storage unit 18. The quantization coefficients obtained by the quantization circuit 16 are retrieved in a scanning order called the zigzag scan, and input to the entropy coding circuit 17. The entropy coding circuit 17 converts the DCT coefficients quantized by the quantization circuit 16 to variable length codes by referencing the Huffman codes stored in the transmitting side Huffman code table storage unit 19, generating compressed data in block units. The compressed data in block units generated by the entropy coding circuit 17 is transferred to the transmission channel 32 via the transmitting circuit 31.

The compressed data sent from the transmitting terminal 5d via the transmission channel 32 is received by the receiving circuit 33 of the receiving terminal 6d. The compressed data input via the receiving circuit 33 is transferred to the entropy decoding circuit 21 of the decoder 2d using the IDMLCT. The entropy decoding circuit 21 converts the compressed data in block units transferred via the receiving circuit 33 to variable length codes by referencing the Huffman codes stored in the receiving side Huffman code table storage unit 28, thereby generating decoded data in block units. The dequantization circuit 22 dequantizes the decoded data in block units generated by the entropy decoding circuit 21 by referencing the quantization thresholds stored in the transmitting side quantization table storage unit 29, thereby generating the DCT coefficients.

The IDMLCT circuit 38 includes a tensor expansion module 381, and a one-dimensional IDMLCT computation module 382. The one-dimensional IDMLCT computation module 382 includes a one-dimensional block residual input module 821, a first interpolating polynomial DCT coefficient computation module 822, a second interpolating polynomial DCT coefficient computation module 823, and an input image DCT coefficient computation approximation/reconstruction module 824. The IDMLCT circuit 38 subjects DCT coefficients generated by the dequantization circuit 22 to inverse derivative matching local cosine transform (IDMLCT) (details of the IDMLCT circuit 38 are given later.) The decoded data in block units having been subjected to inverse derivative matching local cosine transform by the IDMLCT circuit 38 is joined together by the block joining circuit 24, providing frame data.

Each frame data joined together by the block joining circuit 24 is transferred to the output side frame memory 25. The output side frame memory 25 writes and stores each frame image data transferred from the decoder 2d. The display circuit 26 generates an image signal from each frame image data transferred from the decoder 2d, and then displays that image signal as the subject image on the display 27.

Before describing the DMLCT circuit 37 and the IDMLCT circuit 38, a data compression/decompression method for a one-dimensional signal processed by the one-dimensional DMLCT computation module 371 of the DMLCT circuit 37 and the one-dimensional IDMLCT computation module 382 of the IDMLCT circuit 38 is described first. Concerning two-dimensional signals, namely image compression, a tensor product is computed according to an image compression method for one-dimensional signals and processed by the tensor product computation module 372 of the DMLCT circuit 37. Furthermore, concerning image decompression of two-dimensional signals, the tensor product is expanded using the image compression method for one-dimensional signals by the tensor expansion module 381 of the IDMLCT circuit 38.

First, for description of making a mathematical formula used for processing by the one-dimensional DMLCT computation module 371 and the one-dimensional IDMLCT computation module 382, a sufficiently smooth input signal function f(x) defined on the interval [0,1] is considered now. The one-dimensional DCT coefficients in the input signal function f(x) on the interval [0,1] are given by the following equation:

[Eq. 26]

$$F_k = \sqrt{\frac{2}{N}} \sum_{l=0}^{N-1} f\left(\frac{2l+1}{2N}\right) \cos\left(\pi k \frac{2l+1}{2N}\right), k = 0, 1, \ldots, N-1. \quad (15)$$

Assuming that the term in the series on the right hand side is a numerical integral of f(x) cos (πkx) for N sampling points on the interval [0,1],

[Eq. 27]

$$F_k = \sqrt{2N} \int_0^1 f(x) \cos \pi k x \, dx + O(N^{-3}), k = 0, 1, \ldots, N-1.$$

Furthermore, when k is greater than 0, the following equation is derived through application of a partial integral on the right side:

[Eq. 28]

$$F_k = \sqrt{2N} \int_0^1 f(x) \cos \pi k x \, dx + O(N^{-3})$$
$$= -\frac{\sqrt{2N}}{\pi k} \left\{ \int_0^1 \frac{df}{dx}(x) \sin \pi k x \, dx - [f(x) \sin \pi k x]_0^1 \right\} + O(N^{-3})$$
$$= -\frac{\sqrt{2N}}{\pi k} \int_0^1 \frac{df}{dx}(x) \sin \pi k x \, dx + O(N^{-3}),$$

$$k = 1, \ldots, N-1.$$

With the data compression/decompression systems according to the first and the second embodiment, considering only the endpoints of a gradient offset function u(x) for the input signal function f(x), improvement in the compression effect is attempted using the fact that convergence rate of DCT coefficients of a residual v(x)=f(x)−u(x)

[Eq. 29]

$$V_k = -\frac{\sqrt{2N}}{\pi k} \int_0^1 \frac{dv}{dx}(x) \sin \pi k x \, dx + O(N^{-3}), \quad (16)$$
$$k = 1, \ldots, N-1$$

is $O(k^{-4})$. The data compression/decompression methods according to the first and the second embodiment are very effective as methods for avoiding the Gibbs phenomenon near the endpoints; however, on the other hand, evaluation formula 16 for the residual DCT coefficients $V_k$ indicates that the value of the residual DCT coefficients $V_k$ greatly depends on the behavior of dv/dx(x) within the interval, not only at the endpoints.

With the data compression/decompression system according to the third embodiment, even at n number of nodes including both equidistant endpoints on the interval [0,1],

[Eq. 30]

$$x_{n,i} := \frac{i}{n-1}, i = 0, \ldots, n-1,$$

an interpolating polynomial u(x) of degree n offsetting a gradient of the input signal function f(x) or satisfying the conditions

[Eq. 31]

$$\frac{du}{dx}(x_{n,i}) = \frac{df}{dx}(x_{n,i}), i = 0, \ldots, n-1. \quad (17)$$

of the form

[Eq. 32]

$$u(x) = \sum_{i=0}^{n-1} \frac{df}{dx}(x_{n,i}) L_{n,i}(x) + c, \quad (18)$$

is used. c, the second term on the right hand side of Eq. (18) is an arbitrary constant, and Li(x) in the first term on the right hand side is a primitive function of an i-th Lagrange polynomial.

[Eq. 33]

$$L_{n,i}(x) := \int \frac{\prod_{j=0(j\neq i)}^{n-1}(x - x_{n,j})}{\prod_{j=0(j\neq i)}^{n-1}(x_{n,i} - x_{n,j})} dx$$

The compression effect of the data compression/decompression system according to the third embodiment depends on approximation accuracy of an interpolating polynomial u(x). While a strict measure of precision is difficult, existence of ξ(x) belonging to (0, 1) satisfying

[Eq. 34]

$$V_k = -\frac{\sqrt{2N}}{\pi k} \int_0^1 \frac{d(f-u)}{dx}(x) \sin \pi k x \, dx + O(N^{-3})$$
$$= -\frac{\sqrt{2N}}{\pi k} \cdot \frac{1}{n!} \int_0^1 \prod_{i=0}^{n-1}(x - x_{n,i}) \frac{d^{n+1} f}{dx^{n+1}}(\xi(x))$$
$$\sin \pi k x \, dx + O(N^{-3}).$$

is easily derived.

As in the discussions of the data compression/decompression systems according to the first and the second embodiment, DCT coefficients $U_k(k>0)$ of the interpolating polynomial u(x) are necessary for actually configuring the residual DCT coefficients $V_k$. The DCT coefficients $U_k$ of the interpolating polynomial u(x) are provided by the following equation using the definitional Eq. (18) of the function u(x):

[Eq. 35]

$$U_k = \sqrt{\frac{2}{N}} \sum_{l=0}^{N-1} \left\{ \sum_{i=0}^{n-1} \frac{df}{dx}(x_{n,i}) L_{n,i}\left(\frac{2l+1}{2N}\right) \right\} \cos\left(\pi k \frac{2l+1}{2N}\right) \quad (19)$$

$$= \sum_{i=0}^{n-1} \frac{df}{dx}(x_{n,i}) \left\{ \sqrt{\frac{2}{N}} \sum_{l=0}^{N-1} L_{n,i}\left(\frac{2l+1}{2N}\right) \cos\left(\pi k \frac{2l+1}{2N}\right) \right\}$$

$$= \sum_{i=0}^{n-1} w_{k,n,i} \frac{df}{dx}(x_{n,i}), \, k = 1, \ldots, N-1,$$

where $$w_{k,n,i} := \sqrt{\frac{2}{N}} \sum_{l=0}^{N-1} L_{n,i}\left(\frac{2l+1}{2N}\right) \cos\left(\pi k \frac{2l+1}{2N}\right). \quad (20)$$

The values of coefficients $w_{k,n,i}$ shown in Eq. (20) can be computed independently from the input signal function f(x). For computation of derivative $df/dx(x_{n,i})$ at a node $x_{n,i}$, finite difference of the input signal function f(x) is applied, as described below. First, the domain of the input signal function f(x) is extended from [0,1] to [−1,2]. In other words, the input signal function f(x) is defined not only in the interval [0,1] but also in the surrounding area. Accordingly, $x_{n,i}$ is redefined by the following equation:

[Eq. 36]

$$x_{n,i} := \frac{i}{n-1}, \, i = -1, 0, \ldots, n-1, n.$$

Finite difference approximation is applied in computation of the derivative at the node.

[Eq. 37]

$$\frac{df}{dx}(x_{n,i}) \simeq (n-1)\left\{ f\left(\frac{x_{n,i}+x_{n,i+1}}{2}\right) - f\left(\frac{x_{n,i-1}+x_{n,i}}{2}\right) \right\} \quad (21)$$

$$= (n-1)\left\{ f\left(\frac{2i+1}{2(n-1)}\right) - f\left(\frac{2i-1}{2(n-1)}\right) \right\},$$

$$i = 0, \ldots, n-1.$$

If the DCT coefficients $F_k$ are used here,

[Eq. 38]

$$f\left(\frac{2i \pm 1}{2(n-1)}\right) = \sqrt{\frac{2}{N}} \sum_{k=0}^{N-1} \lambda_k F_k \cos\left(\pi k \frac{2i \pm 1}{2(n-1)}\right) \quad (22)$$

$$= \sqrt{\frac{2}{N}} \sum_{k=0}^{n-2} \lambda_k F_k \cos\left(\pi k \frac{2i \pm 1}{2(n-1)}\right) +$$

$$\sqrt{\frac{2}{N}} \sum_{k=n}^{N-1} \lambda_k F_k \cos\left(\pi k \frac{2i \pm 1}{2(n-1)}\right).$$

To derive the last equality, if k=n−1, then we clearly have

[Eq. 39]

$$\cos\left(\pi k \frac{2i \pm 1}{2(n-1)}\right) = \cos\left(x \frac{2i \pm 1}{2}\right) = 0, \, \forall i \in \mathbb{Z}.$$

With the data compression/decompression system according to the third embodiment, only DCT coefficients of low orders are focused on, and Eq. (22) is approximated in the following manner:

[Eq. 40]

$$f\left(\frac{2i \pm 1}{2(n-1)}\right) \simeq \sqrt{\frac{2}{N}} \sum_{k=0}^{n-2} \lambda_k F_k \cos\left(\pi k \frac{2i \pm 1}{2(n-1)}\right). \quad (23)$$

In other words,

[Eq. 41]

$$\frac{df}{dx}(x_{n,i}) \simeq \quad (24)$$

$$(n-1)\sqrt{\frac{2}{N}} \sum_{k=0}^{n-2} \lambda_k \left( F_k \cos\left(\pi k \frac{1}{2(n-1)}\right) - F_k^{(-1)} \cos\left(\pi k \frac{-1}{2(n-1)}\right) \right) \quad \text{if } i = 0,$$

$$(n-1)\sqrt{\frac{2}{N}} \sum_{k=0}^{n-2} \lambda_k F_k \left( \cos\left(\pi k \frac{2i+1}{2(n-1)}\right) - \cos\left(\pi k \frac{2i-1}{2(n-1)}\right) \right) \quad \text{if } i = 1, \ldots, n-2,$$

$$(n-1)\sqrt{\frac{2}{N}} \sum_{k=0}^{n-2} \lambda_k \left( F_k^{(1)} \cos\left(\pi k \frac{2(n-1)+1}{2(n-1)}\right) - F_k \cos\left(\pi k \frac{2(n-1)-1}{2(n-1)}\right) \right) \quad \text{if } i = n-1,$$

determined from $F_0, \ldots, F_{n-2}$ as approximate values in Eq. (21) is used; where, $F_k$ (−1) and $F_k$ (1) are the DCT coefficients of the input signal function f(x) on the intervals [−1,0] and [1,2], respectively. Furthermore, by substituting Eq. (24) for Eq. (19), the following approximate expression of the DCT coefficients $U_k$ in the interpolating polynomial u(x) is obtained in the following manner:

[Eq. 42]

$$U_k \simeq U_k^{(n)} := (n-1)\sqrt{\frac{2}{N}} \left\{ w_{k,n,0} \sum_{j=0}^{n-2} \lambda_j \left( F_j \cos\left(\pi j \frac{1}{2(n-1)}\right) - F_j^{(-1)} \cos\left(\pi j \frac{-1}{2(n-1)}\right)\right) + \right.$$

$$\sum_{i=0}^{n-2} w_{k,n,i} \sum_{j=0}^{n-2} \lambda_i F_j \left( \cos\left(\pi j \frac{2i+1}{2(n-1)}\right) - \cos\left(\pi j \frac{2i-1}{2(n-1)}\right)\right) + w_{k,n,n-1} \sum_{j=0}^{n-2} \lambda_j \left( F_j^{(1)} \cos\left(\lambda j \frac{2(n-1)+1}{2(n-1)}\right) - \right.$$

$$\left. \left. F_j \cos\left(\pi j \frac{2(n-1)-1}{2(n-1)}\right)\right)\right\}$$

$$= (n-1)\sqrt{\frac{2}{N}} \sum_{j=0}^{n-2} \lambda_j \left\{ w_{k,n,0} \cos\left(\frac{\pi j}{2(n-1)}\right)(F_j - F_j^{(-1)}) - 2\sin\left(\frac{\pi j}{2(n-1)}\right) \sum_{i=1}^{n-2} w_{k,n,i} \sin\left(\frac{\pi i j}{(n-1)}\right) F_j + \right.$$

$$\left. w_{k,n,n-1}(-1)^j \cos\left(\frac{\pi j}{2(n-1)}\right)(F_j^{(1)} - F_j) \right\}$$

$$= \sum_{j=0}^{n-2} \{W_{k,n,j}^{(a)}(F_j - F_j^{(-1)}) + W_{k,n,j}^{(b)} F_j + W_{k,n,j}^{(c)}(F_j^{(1)} - F_j)\},$$

where $$W_{k,n,j}^{(a)} = (n-1)\sqrt{\frac{2}{N}} \lambda_j w_{k,n,0} \cos\left(\frac{\pi j}{2(n-1)}\right),$$

$$W_{k,n,j}^{(b)} = -2(n-1)\sqrt{\frac{2}{N}} \lambda_j \sin\left(\frac{\pi j}{2(n-1)}\right) \sum_{i=1}^{n-2} w_{k,n,i} \sin\left(\frac{\pi i j}{(n-1)}\right),$$

$$W_{k,n,j}^{(c)} = (n-1)\sqrt{\frac{2}{N}} \lambda_j w_{k,n,n-1}(-1)^j \cos\left(\frac{\pi j}{2(n-1)}\right).$$

Clearly, coefficients $W^{(a)}_{k,n,j}$ and $W^{(b)}_{k,n,j}$ and $W^{(c)}_{k,n,j}$ can be computed independently of the input signal function f(x).

Figure 28:
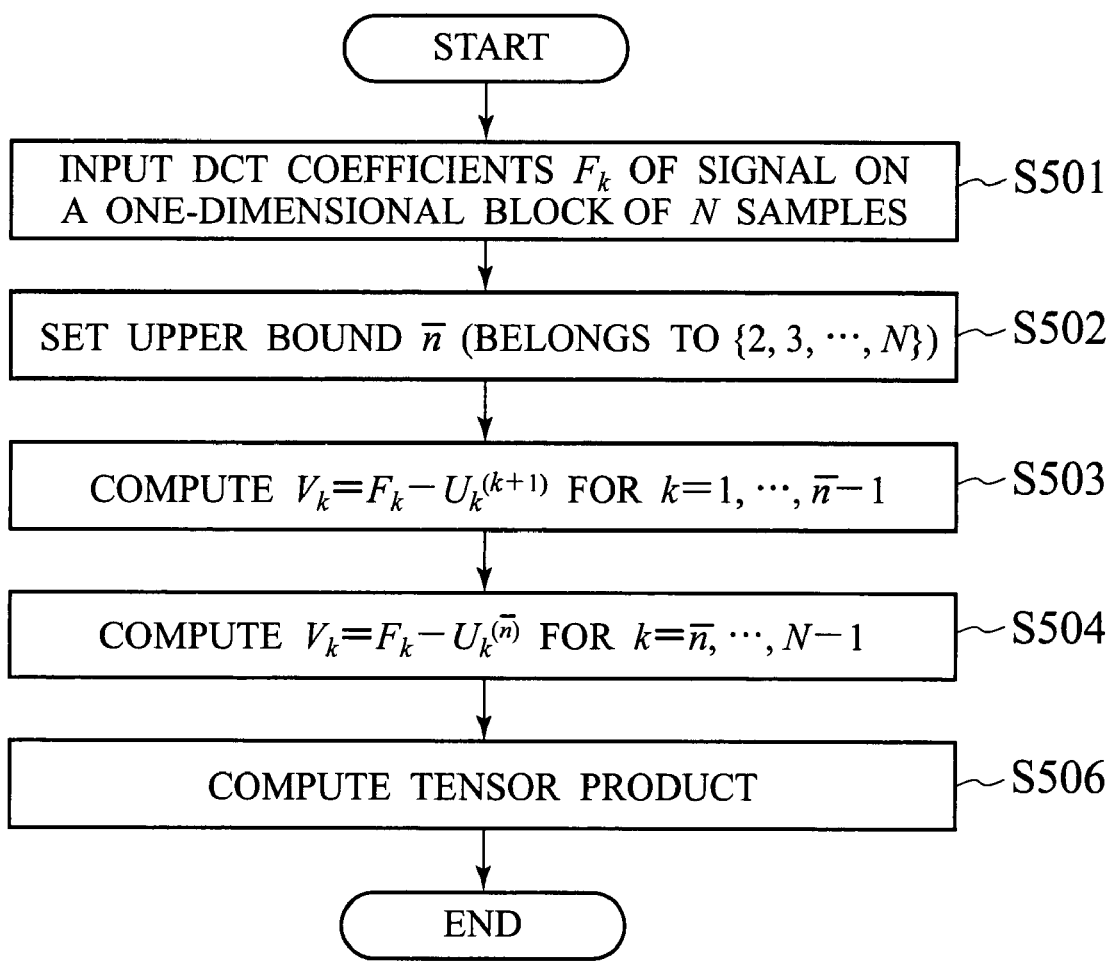
FIG. 28 is a flowchart illustrating a data compression method using the DMLCT circuit in the data compression/decompression system according to the third embodiment of the present invention.

A data compression method using the DMLCT circuit 37 according to the third embodiment of the present invention is described using the flowchart shown in FIG. 28. Note that the data compression method given below is merely an example, and needless to say, implementation is possible by other various methods including this modified example.

Figure 29:
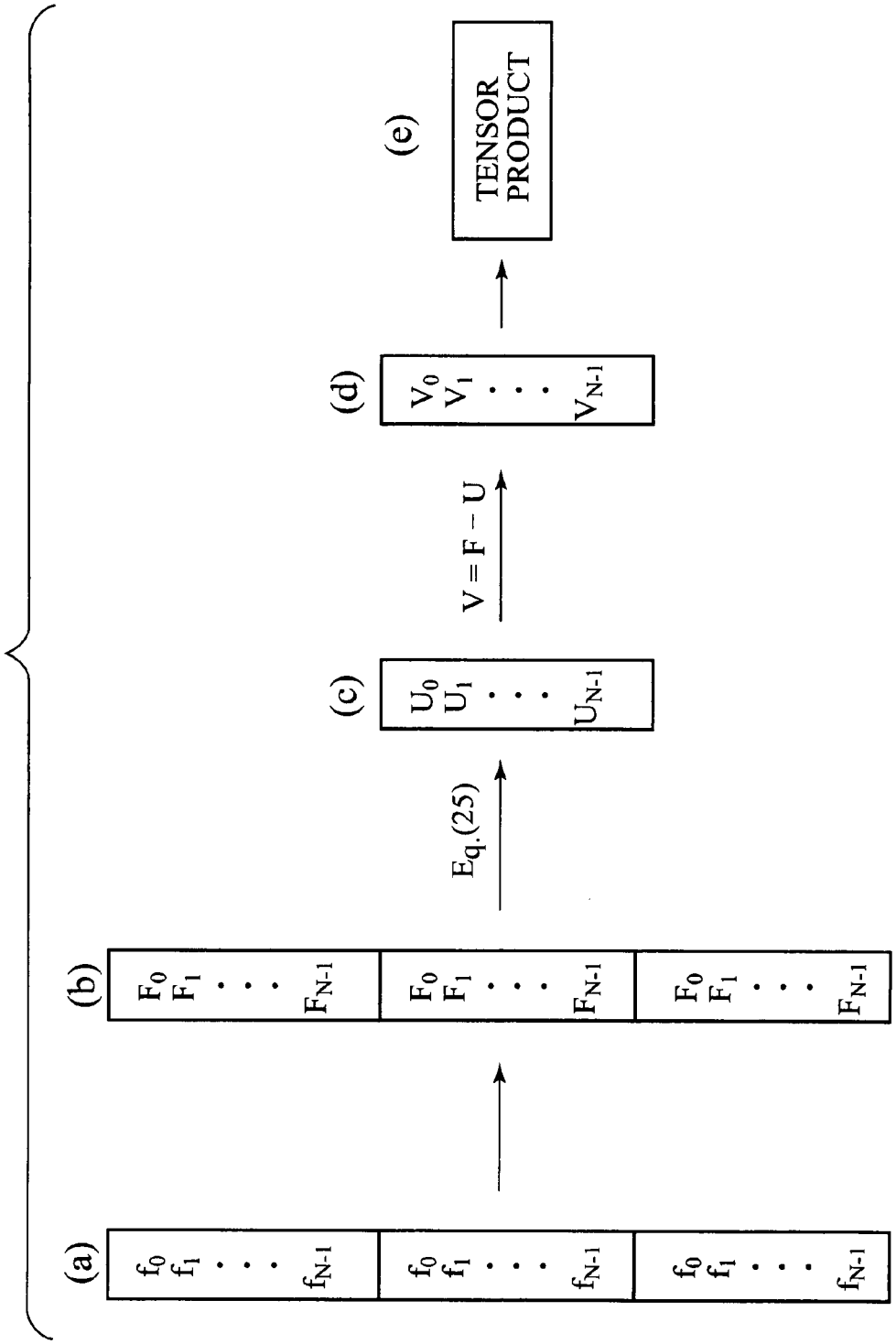
FIGS. 29(a) through 29(e) are schematic diagrams illustrating in detail the data compression method according to the third embodiment of the present invention using three one-dimensional data blocks in correspondence with the flowchart of FIG. 28.

(a) In step S501, the one-dimensional DMLCT computation module 371 of the DMLCT circuit 37 inputs a signal to a one-dimensional subject center data block and each of two one-dimensional data blocks adjacent to the one-dimensional subject center data block above and below, as shown in FIG. 29(*a*). DCT is applied to each of the one-dimensional data blocks, and an input image DCT coefficients (input signal DCT coefficients) F is computed for the one-dimensional subject center data block and each of the two one-dimensional data blocks adjacent to the one-dimensional subject center data block above and below, as shown in FIG. 29(*b*).

(b) In step S502, the upper bound setting module 712 sets an upper bound n (bar) to the number of nodes n. An upper bound n (bar) is set because, experimentally, an effective n should not be very large, and the computational cost becomes excessive as n increases. Note that in this specification, n (bar) denotes

[Eq. 43]

$$\bar{n}$$

(c) The first residual computation module 713 of the DMLCT circuit 37 finds DCT coefficients $U_k$ in the interpolating polynomial u(x), as shown in FIG. 29(*c*), using Eq. (25). In step S503, for

[Eq. 44]

$$k=1, \ldots, \bar{n}-1$$

a residual, as shown in FIG. 29(*c*), is computed using:

[Eq. 45]

$$V_k = F_k - U_k^{(k+1)}$$

(d) Then, in step S504, for

[Eq. 46]

$$k=\bar{n}, \ldots, N-1$$

the second residual computation module 714 of the DMLCT circuit 37 computes the residual:

[Eq. 47]

$$V_k = F_k - U_k^{(\bar{n})}$$

(e) In step S506, the tensor product computation module 372 of the DMLCT circuit 37 computes two-dimensional DCT using the tensor product, as shown in FIG. 29(*e*). The computation of the two-dimensional DCT in step S506 can be implemented by further applying one-dimensional DCT horizontally to one-dimensional DCT coefficients resulting from applying one-dimensional DCT to an input two-dimensional signal vertically, as shown in FIG. 29(*b*). On the other hand, when one-dimensional DCT is applied horizontally, the computation can be implemented by further applying one-dimensional DCT vertically to resulting one-dimensional DCT coefficients. The residual V=F−U shown in FIG. 29(e) is output to the quantization circuit 16 of the encoder 1d.

(f) Quantization processing and coding by the quantization circuit 16 and the entropy coding circuit 17, respectively, are the same as with the data compression method according to the first embodiment, and thus duplicate descriptions are omitted. The compressed data in block units generated by the entropy coding circuit 17 is transferred to the transmission channel 32 via the transmitting circuit 31.

The series of data compression processing shown in FIG. 28 can be executed by controlling the encoder 1d shown in FIG. 1 using an equivalent algorithm program to that shown in FIG. 28. This program should be stored in a program storage unit (not shown in the drawing) of a computer system comprising the encoder 1d according to the present invention. In addition, this program can be stored in a computer readable recording medium, and be read out from this recording medium and stored in the program storage unit of the encoder 1d so that the series of data compression processing of the present invention can be carried out. Here, 'computer readable recording medium' means a medium capable of recording programs such as a computer external memory unit, semiconductor memory, a magnetic disk, an optical disk, a magnet-optical disk, and a magnetic tape. For example, the main unit of the encoder 1d may be structured so as to be connected internally or externally to a flexible disk apparatus (flexible disk drive) and an optical disk apparatus (optical disk drive). A flexible disk is loaded into the flexible disk drive, or a CD-ROM into an optical disk drive via a loading slot, and then a predetermined read-out operation is performed, thereby allowing installation of programs stored in these recording media into the program storage unit comprising the encoder 1d. Furthermore, this program may be stored in the program storage unit via an information processing network such as the Internet.

Figure 30:
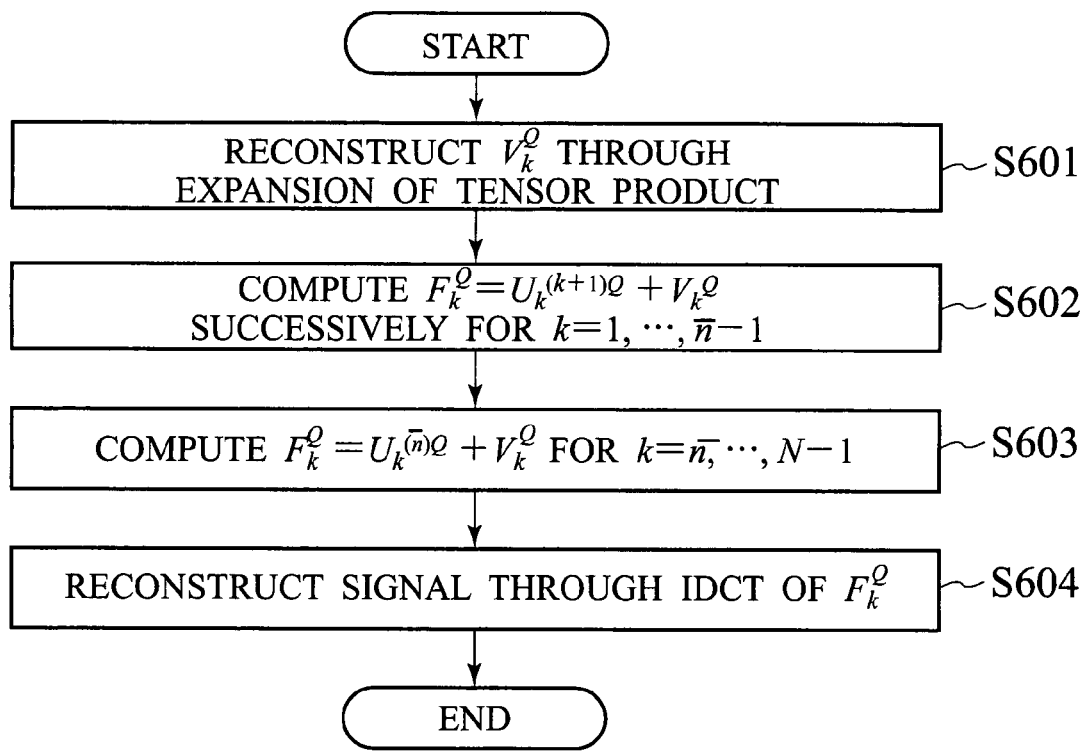
FIG. 30 is a flowchart illustrating a data decompression method using the IDMLCT circuit in the data compression/decompression system according to the third embodiment of the present invention.

A data decompression method using the IDMLCT circuit 38 according to the third embodiment of the present invention is described using the flowchart shown in FIG. 30. Note that the data decompression method given below is merely an example, and needless to say, implementation is possible by other various methods including this modified example.

(a) Quantization Processing and coding in the entropy decoding circuit 21 and the dequantization circuit 22 of the decoder 2d, respectively, are the same as with the data compression method according to the first embodiment, and thus duplicate descriptions are omitted. The approximate version $V_k^Q$ of a residual V is transferred to the tensor expansion module 381 of the IDMLCT circuit 38.

Figure 31:
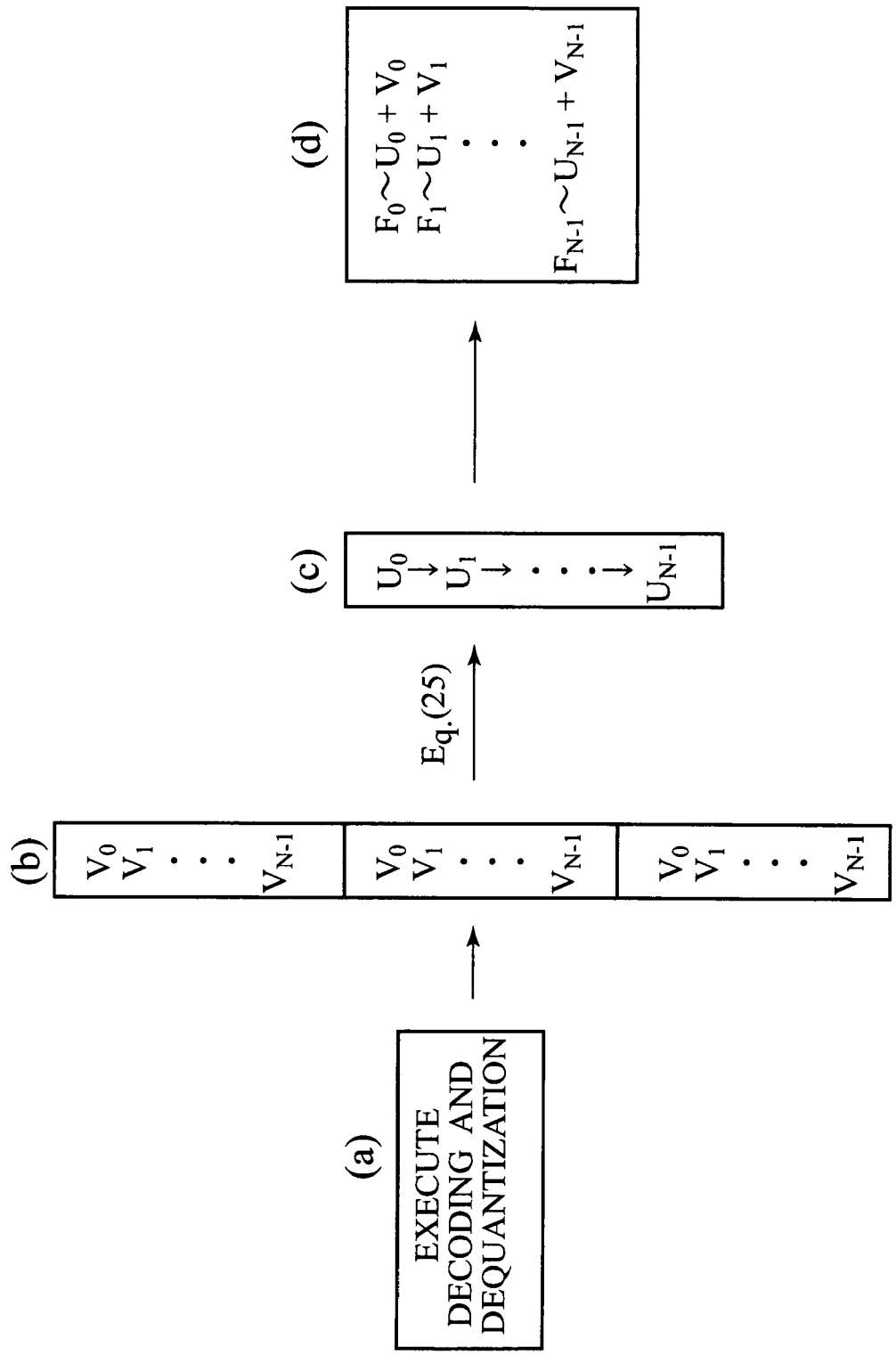
FIGS. 31(a) through 31(d) are schematic diagrams illustrating in detail the data decompression method according to the third embodiment of the present invention using three one-dimensional data blocks in correspondence with the flowchart of FIG. 30.

(b) In step S601, the tensor expansion module 381 of the IDMLCT circuit 38 expands one-dimensional residuals $V_k^Q$ from a residual $V_k^Q$ of the two-dimensional tensor product in FIG. 31(a).

The residuals $V_k$ expanded one-dimensionally are put at locations of respective pixels in a one-dimensional subject center data block and each of two one-dimensional data blocks adjacent to the one-dimensional subject center data block above and below, as shown in FIG. 31(b).

(c) The first interpolating polynomial DCT coefficient computation module 822 of the IDMLCT circuit 38 finds DCT coefficients $U_k^{(-)Q}$ in the interpolating polynomial u(x), as shown in FIG. 31(c), using Eq. (25). $U_k^{(n)Q}$ results from replacing $F_k$ by $F_k^Q$ in Eq. (25). Then, in step S602, for

[Eq. 48]

$$k=1,\ldots,\bar{n}-1$$

[Eq. 49]

$$F_k^Q = U_k^{(k-1)Q} + V_k^Q|$$

is computed sequentially as shown in FIG. 31(d). Therefore, successive reconstruction

[Eq. 50]

$$F_2^Q = U_2^{(3)Q} + V_2^Q,$$

$$F_1^Q = U_1^{(2)Q} + V_1^Q,$$

$$\ldots,$$

$$F_{\bar{n}-1}^Q = U_{\bar{n}-1}^{(\bar{n})Q} + V_{\bar{n}-1}^Q$$

is possible.

(d) Then, in step S603, for

[Eq. 51]

$$k=\bar{n},\ldots,N-1$$

second interpolating polynomial DCT coefficient computation module 823 of the IDMLCT circuit 38 computes:

[Eq. 52]

$$F_k^Q = U_k^{(\bar{n})Q} + V_k^Q|$$

(e) Furthermore, in step S604, the input image DCT coefficient approximation/reconstruction module 824 applies IDCT to each block for $F_k^Q$ to reconstruct multivalued image data.

(f) The block joining circuit 24 of the decoder 2d joins together each of the blocks using the multivalued image data obtained as a result of IDCT. Each frame data joined together by the block joining circuit 24 is transferred to the output side frame memory 25.

The series of data compression processing shown in FIG. 30 may be executed by controlling the decoder 2d shown in FIG. 26 using an equivalent algorithm program to that shown in FIG. 30. This program should be stored in a program storage unit (not shown in the drawing) of a computer system comprising the decoder 2d according to the present invention. In addition, this program may be stored in a computer readable recording medium, and be read out from this recording medium and stored in the program storage unit of the decoder 2d so that the series of data compression processing of the present invention can be carried out. Here, 'computer readable recording medium' means a medium capable of recording programs such as a computer external memory unit, semiconductor memory, a magnetic disk, an optical disk, a magnet-optical disk, and a magnetic tape. For example, the main unit of the decoder 2d may be structured so as to be connected internally or externally to a flexible disk apparatus (flexible disk drive) and an optical disk apparatus (optical disk drive). A flexible disk is loaded into the flexible disk drive, or a CD-ROM into an optical disk drive via a loading slot, and then a predetermined read-out operation is performed, thereby allowing installation of programs stored in these recording media into the program storage unit configuring the decoder 2d. Furthermore, this program may be stored in the program storage unit via an information processing network such as the Internet.

The performance of the data compression/decompression system according to the third embodiment is compared to that of the data compression/decompression system according to the first embodiment when using the solution to Poisson's equation. FIG. 32(a) is graph where ordinate represents the PSNR while abscissa represents the reduction rate of coding rate (compression rate) for the data compression/decompression system according to the first embodiment (PHLCT) and the compression/decompression system according to the third embodiment (DMLCT) when using the original Lenna image. FIG. 32(b) is a graph where ordinate represents PSNR while abscissa represents the reduction rate of coding rate (compression rate) for the data compression/decompression system according to the first embodiment (PHLCT) and the compression/decompression system according to the third embodiment (DMLCT) when using the original Barbara image. Upper bound n (bar) for the number of nodes n for the compression/decompression system according to the third embodiment is notated as DMLCT(n) in FIGS. 32(a) and 32(b) for the three cases of n (bar)=2, 3, and 4. Compared to the data compression/decompression system according to the first embodiment (PHLCT), the compression/decompression system according to the third embodiment (DMLCT) has high computational costs and complicated algorithms; however, implementation of higher compression effect can be confirmed.

Other Embodiments

As described above, the present invention is described according to the first through the third embodiment; however, it should not be perceived that descriptions and drawings forming a part of this disclosure are not intended to limit the spirit and scope of the present invention. Various alternative embodiments, working examples, and operational techniques will become apparent from this disclosure for those skills in the art.

Compression/decompression technology for still images using the JPEG algorithm have been exemplified in the description of the first through the third embodiment given above; however, needless to say, the present invention is not limited to the compression/decompression technology for still images, and may also be applied to compression/decompression technology for moving images using the MPEG algorithm and related algorithms. Furthermore, the present invention is not limited to the compression/decompression technology for images, and may also be applied to compression/decompression technology for audio data ranging from hi-fi audio to telephone voice. The compression/decompression technology for audio data should be able to compress and decompress one-dimensional data since audio frequencies should be taken into consideration.

Structures including transmitting terminals 5, 5P, and 5d, a transmission channel 32, which transmit compressed data sent from the transmitting terminals 5, 5P, and 5d, and receiving terminals 6, 6P, and 6d, which receive the compressed data sent from the transmitting terminal 5, 5P and 5d via the transmission channel 32, decompress this compressed data, and display the decompressed image data, are described in the first through the third embodiment; however, it may be an electronic device housing the encoders 1, 1p, and 1d and the decoders 2, 2p, and 2d in the same unit as an electronic still camera.

Figure 33:
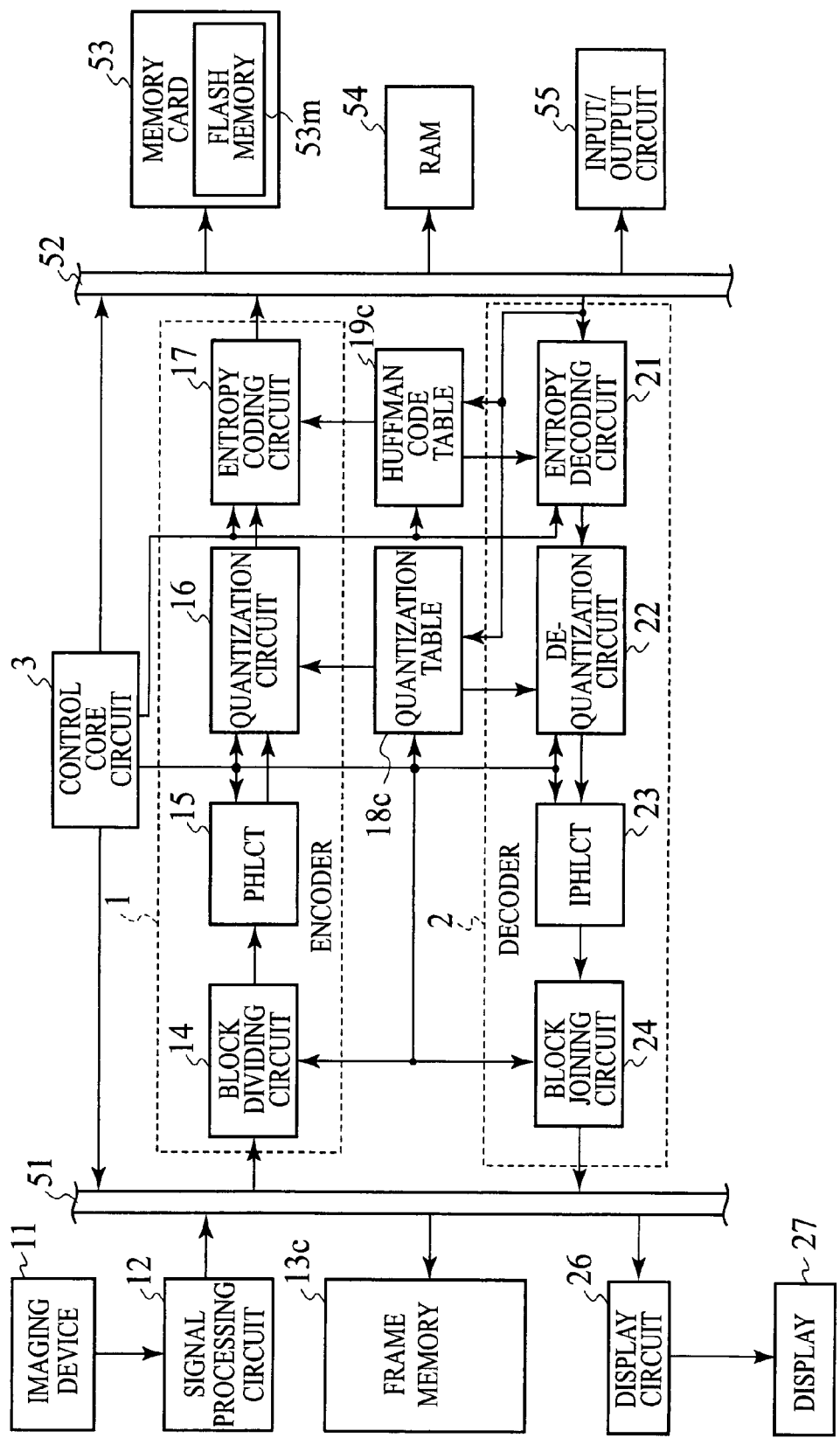
FIG. 33 is a block diagram schematically illustrating a data compression/decompression system according to another embodiment of the present invention.

As shown in FIG. 33, an electronic device (electronic still camera) according to another embodiment of the present invention is constituted by an encoder 1 using the JPEG method, a decoder 2, a control core circuit 3, an imaging device 11, a signal processing circuit 12, frame memory (first memory unit) 13c, a display 27, a display circuit 26, a memory card (second memory unit) 53, RAM 54, an input/output circuit 55, and data buses 51 and 52. A configuration where at least a part of the encoder 1, the decoder 2, the control core circuit 3, the signal processing circuit 12, the frame memory (first memory unit) 13c, the display circuit 26, the data buses 51 and 52, and the RAM 54 is integrated onto a single semiconductor chip is possible.

As with the data compression/decompression system according to the first embodiment, the encoder 1 includes a block dividing circuit 14, a PHLCT circuit 15, a quantization circuit 16, and an entropy coding circuit 17, and the decoder 2 includes an entropy decoding circuit 21, a dequantization circuit 22, an inverse PHLCT (IPHLCT) circuit 23, and a block joining circuit 24.

The imaging device 11, the signal processing circuit 12, the frame memory (first memory unit) 13c, the display circuit 26, and the display 27 are basically the same as with the data compression/decompression system according to the first embodiment; however, each frame image data generated by the signal processing circuit 12 is transferred to at least either the frame memory (first memory unit) 13c or the display circuit 26 via the data bus 51. The display circuit 26 generates an image signal from each frame image data transferred from the data bus 51. The display 27 displays the image signal generated by the display circuit 26 as the subject image. The frame memory (first memory unit) 13c is constituted by rewritable semiconductor memory (SDRAM, DRAM, and random DRAM, for example), and writes in and stores the image data for each frame transferred via the data bus 51, then reading out the stored image data frame by frame. Each frame image data read out from the frame memory (first memory unit) 13c is transferred to the encoder 1 via the data bus 51. In the encoder 1, the block dividing circuit 14 divides the image data of a single frame into a plurality of macro blocks defined by the JPEG method, performs compression and decompression for each of the respective blocks.

While detailed configuration of the PHLCT circuit 15 is omitted from the drawing, it includes an input image DCT coefficient computation module (input signal DCT coefficient computation module) 151, a first offset function DCT coefficient computation module 152, a second offset function DCT coefficient computation module 153, and a residual computation module 154, captures the image data of a single frame block by block from the block dividing circuit 14, executes polyharmonic local cosine transform (PHLCT) on that image data, and outputs $V_k$ of residual V=F−U, as with the compression/decompression system according to the first embodiment. The quantization circuit 16 and the entropy coding circuit 17 perform quantization and coding by referencing quantization thresholds stored in a quantization table stored in the RAM 18c and Huffman codes stored in a Huffman table stored in the RAM 19c, as with the compression/decompression system according to the first embodiment. The compressed data in block units generated by the entropy coding circuit 17 is transferred to at least either the memory card (second memory unit) 53 or the input-output circuit 55 via the data bus 52. The memory card (second memory unit) 53 is detachably loaded into the electronic still camera, and flash memory 53m is provided within the memory card (second memory unit) 53. The flash memory 53m writes and stores each compressed frame data transferred via the data bus 52, reads out the stored compressed data frame by frame, and then transfers it to the data bus 52. The input/output circuit 55 outputs each compressed frame data transferred via the data bus 52 to an external device such as an external display, a personal computer, and a printer connected to the electronic still camera, and transfers the compressed data input from the external device to the data bus 52.

The compressed data read from the memory card (second memory unit) 53 and the compressed data input via the input/output circuit 55 are transferred to the entropy decoding circuit 21 of the decoder 2 via the data bus 52. The entropy decoding circuit 21 converts the compressed data in block units transferred via the data bus 52 into variable length codes by referencing the Huffman codes stored in the RAM 19c, thereby generating decoded data in block units. The dequantization circuit 22 dequantizes the decoded data in block units generated by the entropy decoding circuit 21 by referencing the quantization thresholds stored in the quantization table in the RAM 18c, thereby generating approximate residual $V_k^Q$ of the residual V=F−U after quantization-dequantization process. The inverse PHLCT circuit 23 executes two-dimensional inverse polyharmonic local cosine transform (IPHLCT) to the dequantized, approximate residual $V_k^Q$ generated by the dequantization circuit 22. The decoded data in block units having been subjected to IPHLCT by the inverse PHLCT circuit 23 is joined together by the block joining circuit 24, becoming frame data. Each frame data joined together by the block joining circuit 24 is transferred to the frame memory (first memory unit) 13c via the data bus 51. The frame memory (first memory unit) 13c then writes and stores the each frame image data transferred from the inverse PHLCT circuit 23 via the data bus 51. In addition, the display circuit 26 generates an image signal from each frame image data transferred from the decoder 2 via the data bus 51, and then displays that image signal as the subject image on the display 27.

Note that the configuration of the electronic still camera may be a partial mode data compression/decompression system basing the encoder 1 on the JPEG standard, and only applying inverse polyharmonic local cosine transform to the decoder 2.

Figure 34:
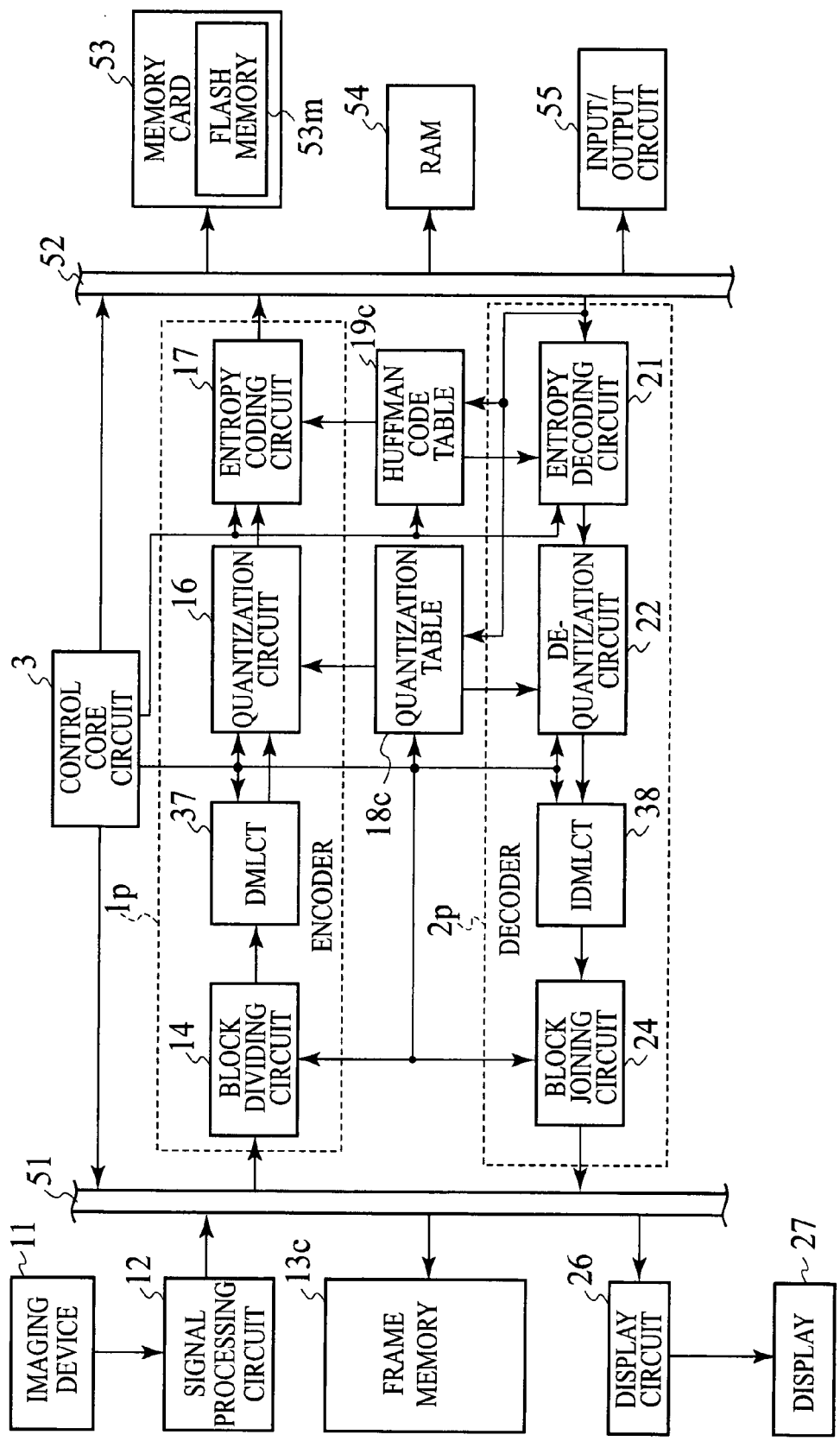
FIG. 34 is a block diagram schematically illustrating a data compression/decompression system according to yet another embodiment of the present invention.

As shown in FIG. 34, an electronic still camera according to yet another embodiment of the present invention is constituted by an encoder 1d using derivative matching local cosine transform (DMLCT), a decoder 2d using inverse derivative matching local cosine transform (IDMLCT), a control core circuit 3, an imaging device 11, a signal processing circuit 12, frame memory (first memory unit) 13c, a display 27, a display circuit 26, a memory card (second memory unit) 53, RAM 54, an input/output circuit 55, and data buses 51 and 52.

As with the data compression/decompression system according to the third embodiment, the encoder 1d includes a block dividing circuit 14, a DMLCT circuit 37, a quantization circuit 16, and an entropy coding circuit 17, and the decoder 2d includes an entropy decoding circuit 21, a dequantization circuit 22, an IDMLCT circuit 38, and a block joining circuit 24. Details of the DMLCT circuit 37 and the IDMLCT circuit 38 are as described with the data compression/decompression system according to the third embodiment, and descriptions of detailed configurations thereof and other configurations shown in block diagrams are understandable from the description of the electronic still camera shown in FIG. 33, and thus duplicate descriptions are omitted. Compared to the case of the PHLCT/IPHLCT method using the solution to Poisson's equation shown in FIG. 33, a configuration using the DMLCT circuit 37 and the IDMLCT circuit 38, as shown in FIG. 34, has high computation costs and complicated algorithms, but may provide a greater compression effect.

Needless to say, as such, the present invention includes a variety of embodiments or the like not disclosed herein. Therefore, the technical scope of the present invention should be defined by only inventive descriptions according to the claims, which is appropriate according to the aforementioned descriptions.

INDUSTRIAL APPLICABILITY

The electronic device, the data compression method, the data decompression method, the data compression program, and the data decompression program of the present invention are applicable to Internet and intranet related industries including the manufacturing industry of electronic devices such as videophones and Internet telephones using compression/decompression processing technology for various data including image data and audio data.

In addition, the electronic device, the data compression method, the data decompression method, the data compression program, and the data decompression program of the present invention are applicable to the multimedia industry such as movies and DVDs, and the electronics industry such as mobile phones, copying machines, facsimiles, and printers using compression/decompression processing technology for various data including image data and audio data.

The invention claimed is:

1. A data compression method to be executed in a processor of a data compression apparatus, by dividing input data equally into a plurality of block regions, for compressing the input data, the method comprising:
via the processor, computing DCT coefficients of an input signal in each subject block region and its adjacent block regions in the plurality of block regions;
via the processor, computing DCT coefficients of a gradient offset function, which offsets the gradient of the input signal at a block boundary between each subject block region and its adjacent block regions from the DCT coefficients of the input signal;
via the processor, computing a residual of the DCT coefficients of the input signal and the DCT coefficients of the gradient offset function; and
via the processor, obtaining compressed data by quantizing and encoding the residual.

2. The data compression method of claim 1, wherein the gradient offset function is provided by a solution corresponding to a minimal value of a mean squared curvature integral within the block regions.

3. The data compression method of claim 1, wherein the gradient offset function is provided by an approximated solution to Neumann boundary value problem to Poisson's equation at a boundary of the block regions.

4. The data compression method of claim 1, wherein the gradient offset function offsets a gradient at the block boundary and gradient of the input signal at a sampling point within the block regions.

5. A data decompression method to be executed in a processor of a data decompression apparatus, by dividing input data equally into a plurality of block regions, for decompressing compressed data, which results from compressing the input data of each block region, so as to reconstruct the input data, the method comprising:
via the processor, executing decoding and dequantization of the compressed data, and obtaining dequantized DCT coefficients of each block region;
via the processor, computing DCT coefficients of a gradient offset function, which offsets the gradient of an input signal at a block boundary between each subject block region and its adjacent block regions, using the dequantized DCT coefficients;
via the processor, adding the DCT coefficients of the gradient offset function to the dequantized DCT coefficients and approximately reconstructing the DCT coefficients of the input signal;
via the processor, recovering an input signal for each of the respective block regions using the approximately reconstructed DCT coefficients of the input signal; and
via the processor, joining together the input signal for each of the respective block regions to reconstruct input data.

6. A data decompression method to be executed in a processor of a data decompression apparatus, by dividing input data equally into a plurality of block regions, for decompressing compressed data, which results from compressing the input data of each of the block regions, so as to estimate the input data, the method comprising:

via the processor, executing decoding and dequantization of the compressed data, and obtaining dequantized DCT coefficients of each of the respective block regions;

via the processor, computing DCT coefficients of a gradient offset function, which offsets the gradient of an input signal at a block boundary between each subject block region and its adjacent block regions, using the dequantized DCT coefficients;

via the processor, computing a quantization error using the DCT coefficients of the gradient offset function;

via the processor, correcting the dequantized DCT coefficients using the quantization error, and making an approximate estimation of DCT coefficients of the input signal;

via the processor, recovering an input signal for each of the respective block regions from the approximately reconstructed DCT coefficients of the input signal; and via the processor, joining together the input signal for each of the respective block regions to reconstruct input data.

7. A data decompression method to be executed in a processor of a data decompression apparatus, by dividing input data equally into a plurality of block regions, for decompressing compressed data, which results from compressing the input data of each of the respective block regions, so as to estimate the input data, the method comprising:

via the processor, executing decoding and dequantization of the compressed data, and obtaining dequantized DCT coefficients of each of the respective block regions;

via the processor, computing DCT coefficients of a gradient offset function, which offsets the gradient of an input signal of the subject block region, at a block boundary between each subject block region and its adjacent block regions, using the dequantized DCT coefficients;

via the processor, computing a quantization error using the DCT coefficients of the gradient offset function;

via the processor, adding a quadratic surface, which reduces blocking artifact, to adjacent block regions and computing DCT coefficients of the quadratic surface;

via the processor, correcting the dequantized DCT coefficients using the quantization error and the DCT coefficients of the quadratic surface, and approximately reconstructing the DCT coefficients of the input signal;

via the processor, recovering an input signal for each of the block regions using the approximately reconstructed DCT coefficients of the input signal; and via the processor, joining together the input signal for each of the respective block regions to reconstruct input data.

8. An electronic device, by dividing input data equally into a plurality of block regions, for compressing the input data, comprising:

an input signal DCT coefficient computation module configured to compute DCT coefficients of an input signal in each subject block region and its adjacent block regions in the plurality of block regions;

an offset function DCT coefficient computation module configured to compute DCT coefficients of a gradient offset function, which offsets the gradient of the input signal at a block boundary between each subject block region and its adjacent block regions using the DCT coefficients of the input signal;

a residual computation module configured to compute a residual of the DCT coefficients of the input signal and the DCT coefficients of the gradient offset function;

a quantization circuit configured to obtain compressed data by quantizing and encoding the residual; and a coding circuit configured to encode the compressed data.

9. The electronic device of claim 8, wherein the gradient offset function is provided by a solution corresponding to a minimal value of a mean squared curvature integral within the block regions.

10. The electronic device of claim 8, wherein the gradient offset function is provided by an approximated solution to Neumann boundary value problem to Poisson's equation at a boundary of the block regions.

11. The electronic device of claim 8, wherein the gradient offset function offsets a gradient at the block boundary and the gradient of the input signal at a sampling point within the block regions.

12. An electronic device, by dividing input data equally into a plurality of block regions, for decompressing compressed data, which results from compressing the input data of each of the block regions, so as to reconstruct the input data, comprising:

a decoding circuit configured to decode the compressed data;

a dequantization circuit configured to execute dequantization of the decoded compressed data, and to obtain dequantized DCT coefficients in each block region;

a DCT coefficient input module configured to receive the dequantized DCT coefficients to a subject block region and its adjacent block regions, respectively;

an offset function DCT coefficient computation module configured to compute DCT coefficients of a gradient offset function, which offsets the gradient of an input signal in the subject block region, at a block boundary between each subject block region and its adjacent block regions, using the dequantized DCT coefficients;

an input signal DCT coefficient approximation/reconstruction module, adding the DCT coefficients of the gradient offset function to the dequantized DCT coefficients, configured to approximately reconstruct DCT coefficients of the input signal; and a block joining circuit, recovering an input signal in each of the block regions using the approximately reconstructed DCT coefficients of the input signal, configured to join together the input signal in each block regions to reconstruct the input data.

13. An electronic device, by dividing input data equally into a plurality of block regions, for decompressing compressed data, which results from compressing the input data of each of the block regions, so as to estimate the input data, comprising:

a decoding circuit configured to decode the compressed data;

a dequantization circuit configured to execute dequantization of the decoded compressed data, and to obtain dequantized DCT coefficients of each of the respective block regions;

a DCT coefficient input module configured to receive the dequantized DCT coefficients to a subject block region and its adjacent block regions, respectively;

an offset function DCT coefficient computation module configured to compute DCT coefficients of a gradient offset function, which offsets the gradient of an input signal in the subject block region, at a block boundary between the subject block region and its adjacent block regions, using the dequantized DCT coefficients;

a quantization error computation module configured to compute a quantization error using the DCT coefficients of the gradient offset function;

a quantization error correction module configured to correct the dequantized DCT coefficients using the quantization error, and to make an approximate estimation of DCT coefficients of the input signal; and a block joining circuit, recovering an input signal for each of the block regions using the approximately estimated DCT coefficients of the input signal, configured to join together the input signal in each block region to estimate the input data.

14. An electronic device, by dividing input data equally into a plurality of block regions, for decompressing compressed data, which results from compressing the input data of each of the block regions, so as to estimate the input data, comprising:

a decoding circuit configured to decode the compressed data;

a dequantization circuit configured to execute dequantization of the decoded compressed data, and to obtain dequantized DCT coefficients of each of the respective block regions;

a DCT coefficient input module configured to receive the dequantized DCT coefficients to a subject block region and its adjacent block regions, respectively;

an offset function DCT coefficient computation module configured to compute DCT coefficients of a gradient offset function, which offsets the gradient of an input signal in the subject block region, at a block boundary between each subject block region and its adjacent block regions, using the dequantized DCT coefficients;

a quantization error computation module configured to compute a quantization error using the DCT coefficients of the gradient offset function;

a quadratic surface DCT coefficient computation module, adding a quadratic surface reducing blocking artifact to the adjacent block regions, configured to compute DCT coefficients of the quadratic surface;

a quadratic surface quantization error correction module configured to correct the dequantized DCT coefficients using the quantization error and the DCT coefficients of the quadratic surface, and to approximately estimate DCT coefficients of the input signal;

a module configured to recover an input signal for each of the respective block regions from the approximately estimated DCT coefficients of the input signal; and a block joining circuit, recovering an input signal for each of the block regions using the approximately estimated DCT coefficients of the input signal, configured to join together the input signal for each of the respective block regions to estimate the input data.

15. An electronic device, comprising:

a first memory unit configured to store input data;

a block dividing circuit configured to divide input data read out from the first memory unit equally into a plurality of block regions;

an input signal DCT coefficient computation module configured to compute DCT coefficients of an input signal in each subject block region and its adjacent block regions in the plurality of block regions;

an offset function DCT coefficient computation module configured to compute DCT coefficients of a gradient offset function, which offsets the gradient of the input signal at a block boundary between each subject block region and its adjacent block regions from the DCT coefficients of the input signal;

a residual computation module configured to compute a residual of the DCT coefficients of the input signal and the DCT coefficients of the gradient offset function;

a quantization circuit configured to obtain compressed data by quantizing and encoding the residual;

a coding circuit configured to encode the compressed data;

a second memory unit configured to store the encoded, compressed data;

a decoding circuit configured to decode the compressed data read out from the second memory unit;

a dequantization circuit configured to execute dequantization of the decoded compressed data, and to obtain dequantized DCT coefficients of each of the respective block regions;

a DCT coefficient input module configured to receive the dequantized DCT coefficients to a subject block region and its adjacent block regions, respectively;

an offset function DCT coefficient computation module configured to compute DCT coefficients of a gradient offset function, which offsets the gradient of the input signal in the subject block region, at a block boundary between each subject block region and its adjacent block regions, using the dequantized DCT coefficients;

an input signal DCT coefficient approximation/reconstruction module, adding the DCT coefficients of the gradient offset function to the dequantized DCT coefficients, configured to approximately reconstruct DCT coefficients of the input signal; and a block joining circuit, recovering an input signal for each of the block regions from the approximately reconstructed DCT coefficients of the input signal, configured to join together the input signal for each of the respective block regions to reconstruct the input data.

16. A data compression product, comprising:

a computer-readable medium; and non-transitory, computer-readable code stored on said computer-readable medium, which non-transitory, computer-readable code is effective to cause a processor of an encoder to execute a series of instructions to compress input data by dividing the input data equally into a plurality of block regions, the series of instructions being effective to cause the processor to compute DCT coefficients of an input signal in each subject block region and its adjacent block regions in the plurality of block regions;

compute DCT coefficients of a gradient offset function, which offsets the gradient of the input signal at a block boundary between each subject block region and its adjacent block regions using the DCT coefficients of the input signal;

compute a residual of the DCT coefficients of the input signal and the DCT coefficients of the gradient offset function; and obtain compressed data by quantizing and encoding the residual.

17. A data decompression compression product, comprising:

a computer-readable medium; and non-transitory, computer-readable code stored on said computer-readable medium, which non-transitory, computer-readable code is effective to cause a processor of a decoder to execute a series of instructions to decompress input data by dividing the input data equally into a plurality of block regions and by decompressing compressed data, the series of instructions being effective to cause the processor to execute decoding and dequantization of the compressed data, and obtain dequantized DCT coefficients of each of the respective block regions;

compute DCT coefficients of a gradient offset function, which offsets a gradient of an input signal in the subject block region, at a block boundary between each subject block region and its adjacent block regions, using the dequantized DCT coefficients;

add the DCT coefficients of the gradient offset function to the dequantized DCT coefficients and approximately reconstruct DCT coefficients of the input signal;

recover an input signal for each of the respective block regions from the approximately reconstructed DCT coefficients of the input signal; and join together the input signal in each of the respective block regions to reconstruct input data.

18. A data decompression compression product, comprising:

a computer-readable medium; and non-transitory, computer-readable code stored on said computer-readable medium, which non-transitory, computer-readable code is effective to cause a processor of a decoder to execute a series of instructions to estimate input data by dividing the input data equally into a plurality of block regions and by decompressing compressed data, the series of instructions being effective to cause the processor to execute decoding and dequantization of the compressed data, and obtain dequantized DCT coefficients of each of the respective block regions;

compute DCT coefficients of a gradient offset function, which offsets the gradient of an input signal in the subject block region, at a block boundary between the subject block region and its adjacent block regions, using the dequantized DCT coefficients;

compute a quantization error from the DCT coefficients $U^Q$ of the gradient offset function;

correct the dequantized DCT coefficients using the quantization error, and make an approximate estimation of DCT coefficients of the input signal;

recover an input signal for each of the respective block regions from the approximately estimated DCT coefficients of the input signal; and join together the input signal in each of the respective block regions to estimate the input data.

19. A data decompression product, comprising:

a computer-readable medium; and non-transitory, computer-readable code stored on said computer-readable medium, which non-transitory, computer-readable code is effective to cause a processor of a decoder to execute a series of instructions to estimate input data by dividing the input data equally into a plurality of block regions and by decompressing compressed data, the series of instructions being effective to cause the processor to execute decoding and dequantization of the compressed data, and obtain dequantized DCT coefficients of each of the respective block regions;

compute DCT coefficients of a gradient offset function, which offsets the gradient of an input signal in the subject block region, at a block boundary between each subject block region and its adjacent block regions, using the dequantized DCT coefficients;

compute a quantization error from the DCT coefficients $U^Q$ of the gradient offset function;

add a quadratic surface, which reduces blocking artifact, to adjacent block regions, and compute DCT coefficients of the quadratic surface;

correct the dequantized DCT coefficients using the quantization error and the DCT coefficients of the quadratic surface, and approximately estimate DCT coefficients of the input signal;

recover an input signal for each of the respective block regions from the approximately estimated DCT coefficients of the input signal; and join together the input signal in each of the respective block regions to estimate the input data.

* * * * *